INVENTORS
FRANK REGINALD SAXBY
& RONALD PRITCHARD
BY
THEIR ATTORNEYS

INVENTORS
FRANK REGINALD SAXBY
& RONALD PRITCHARD

THEIR ATTORNEYS

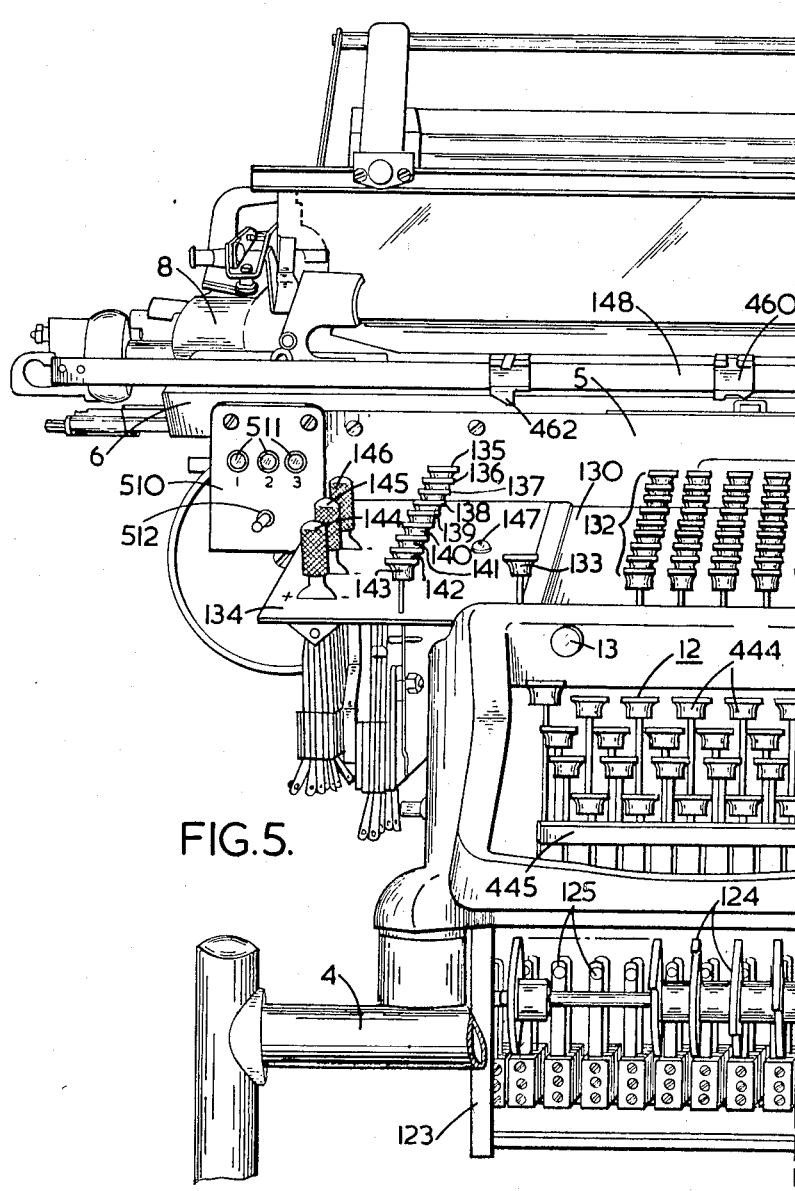

INVENTORS
FRANK REGINALD SAXBY
& RONALD PRITCHARD
BY Earl Beust
Richard Van Buren
THEIR ATTORNEYS

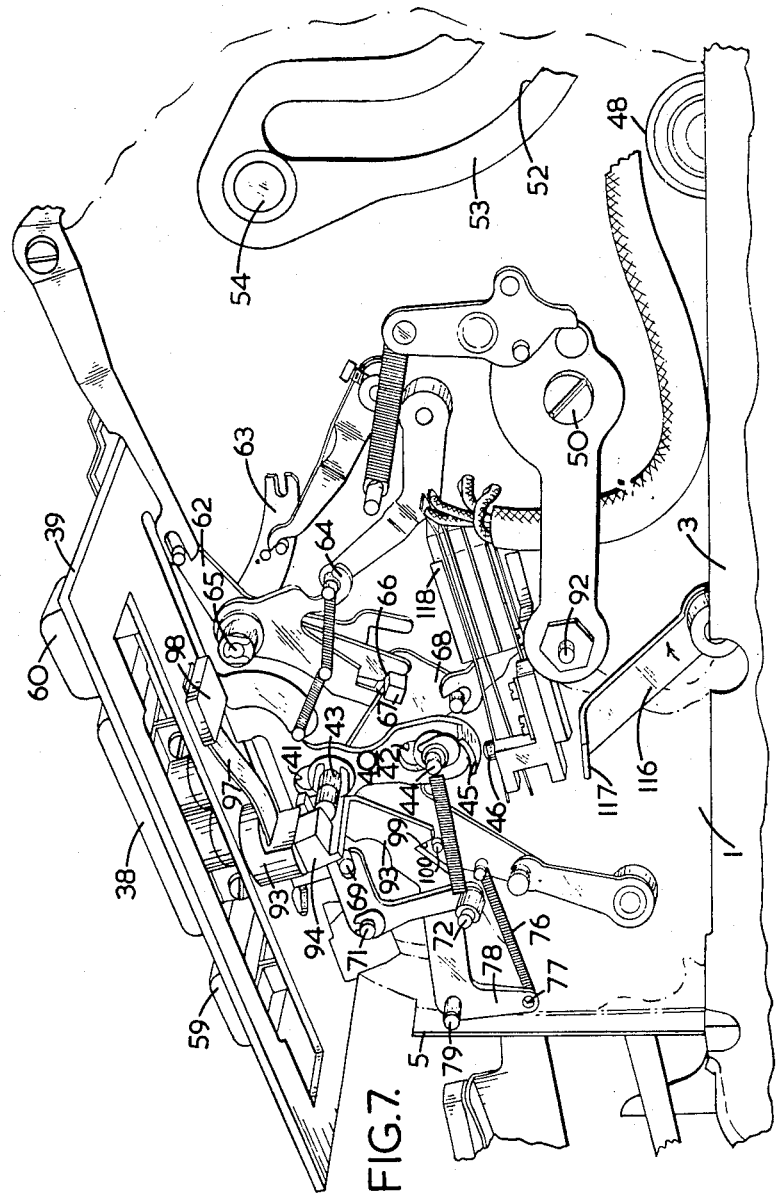

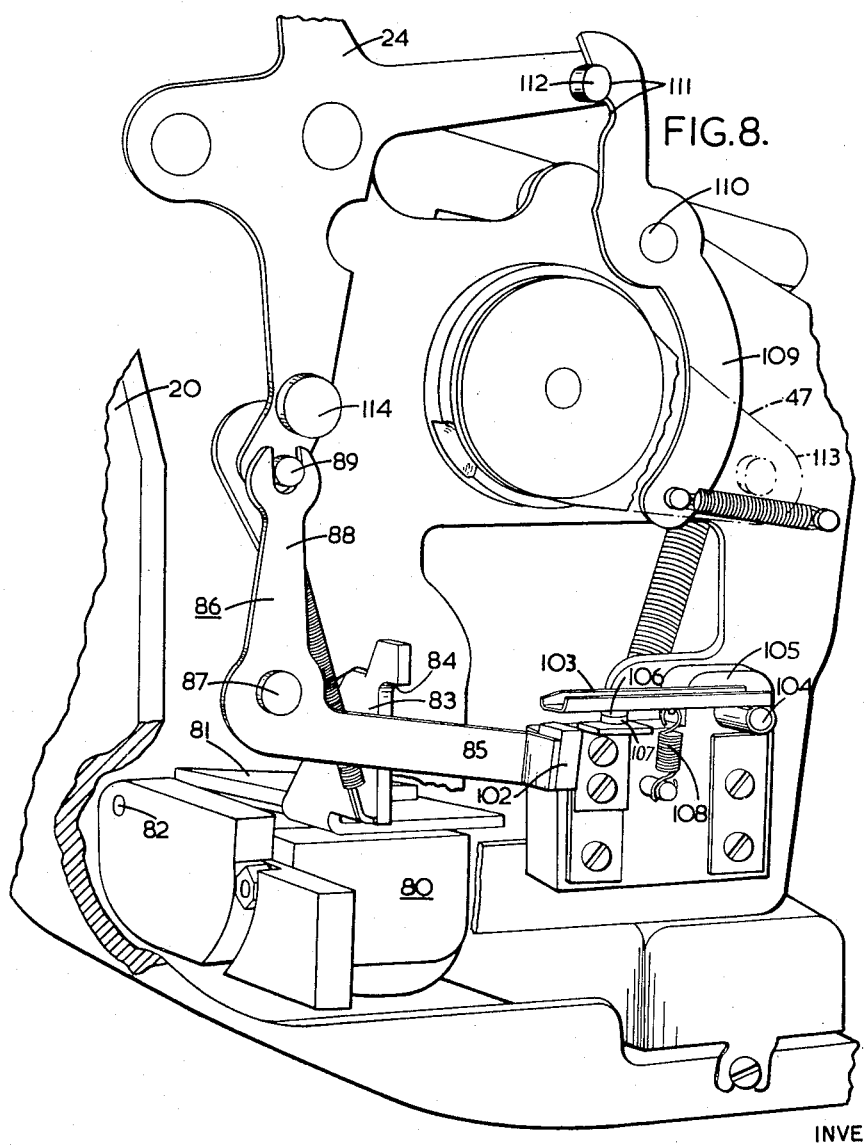

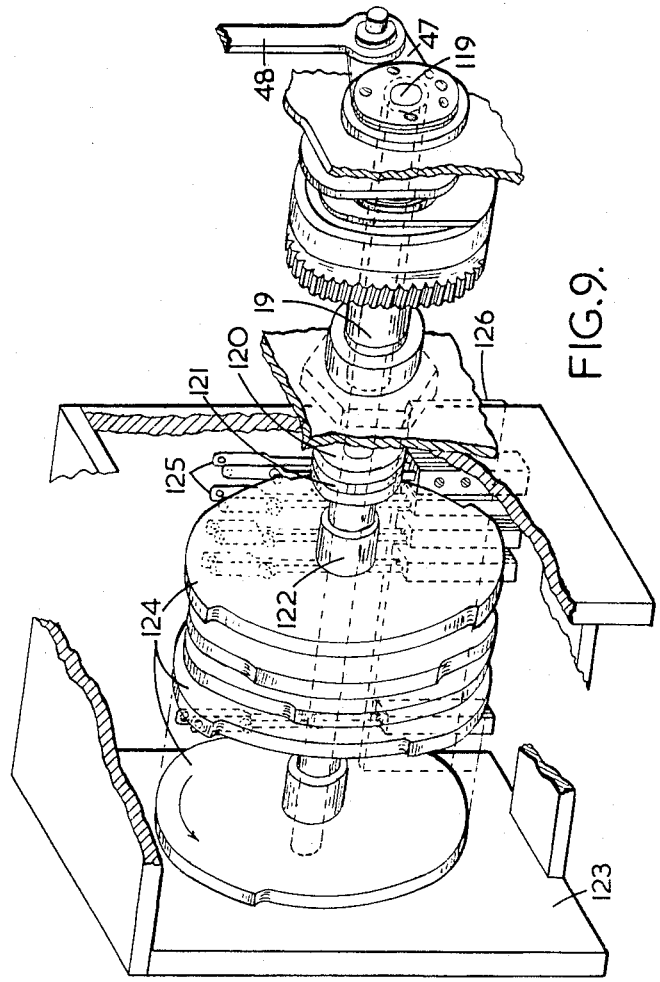

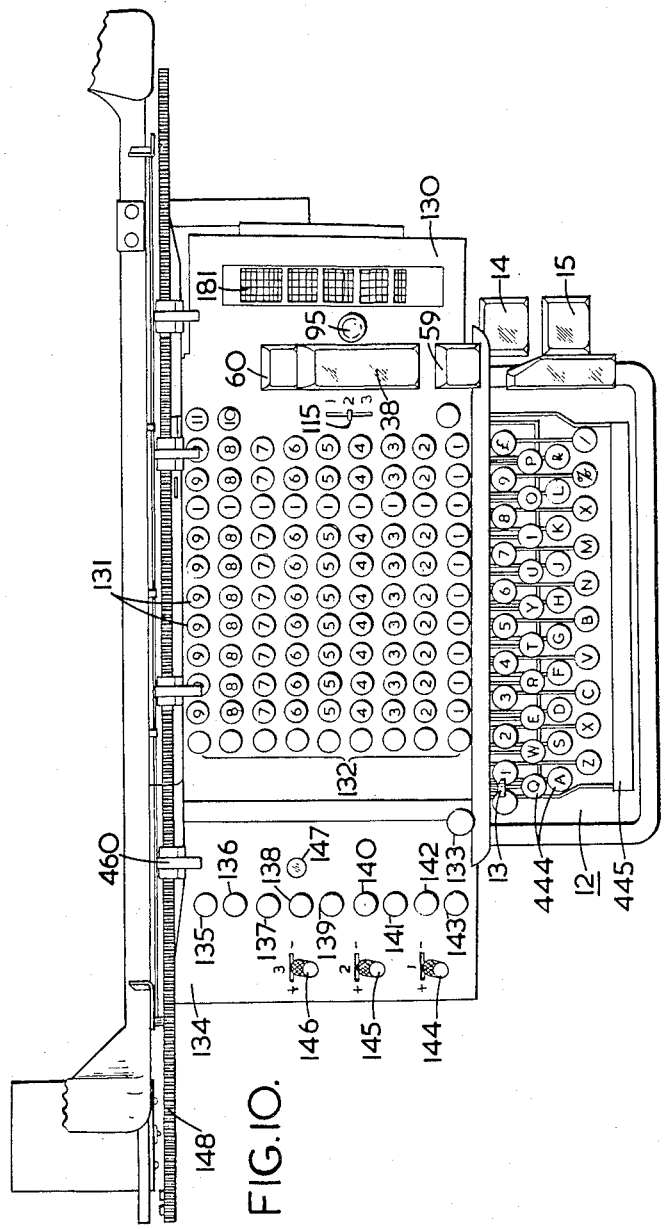

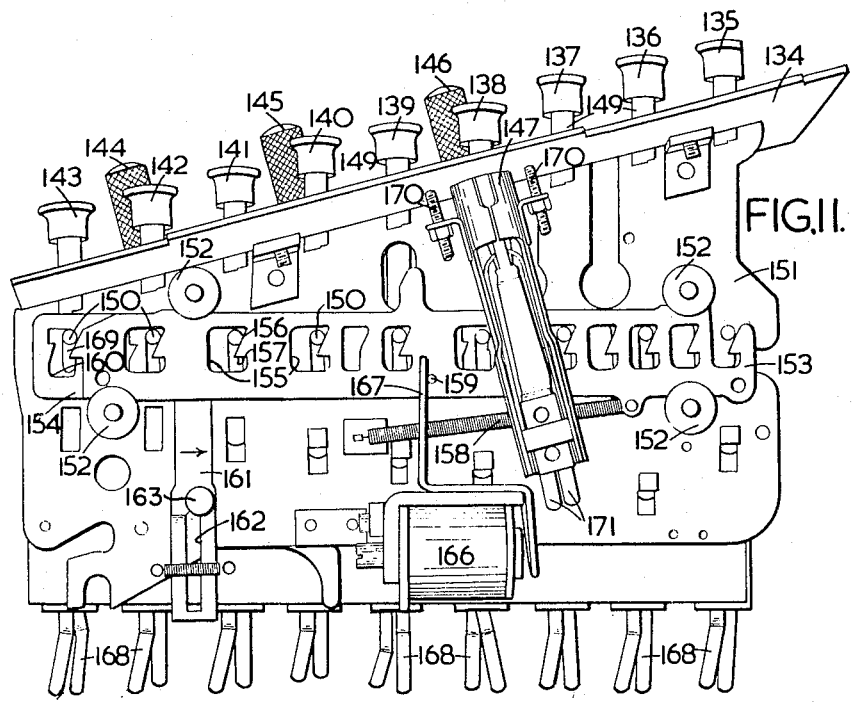

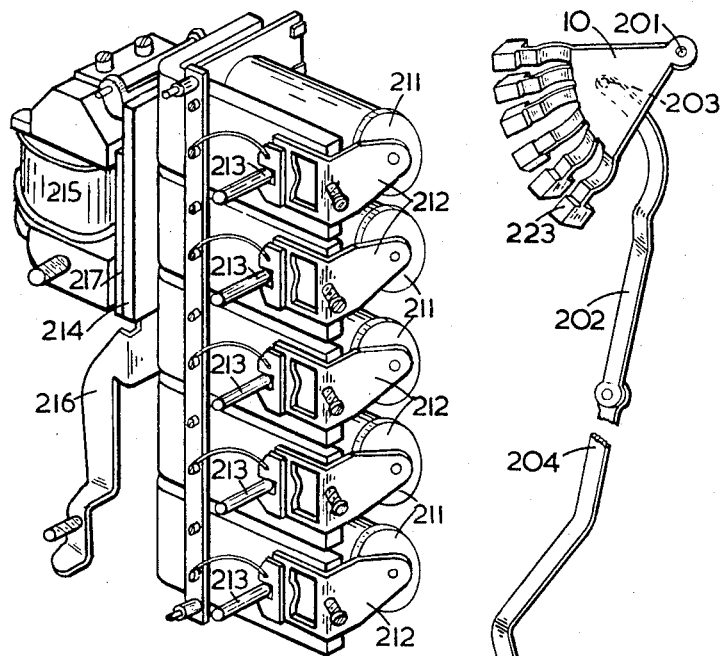
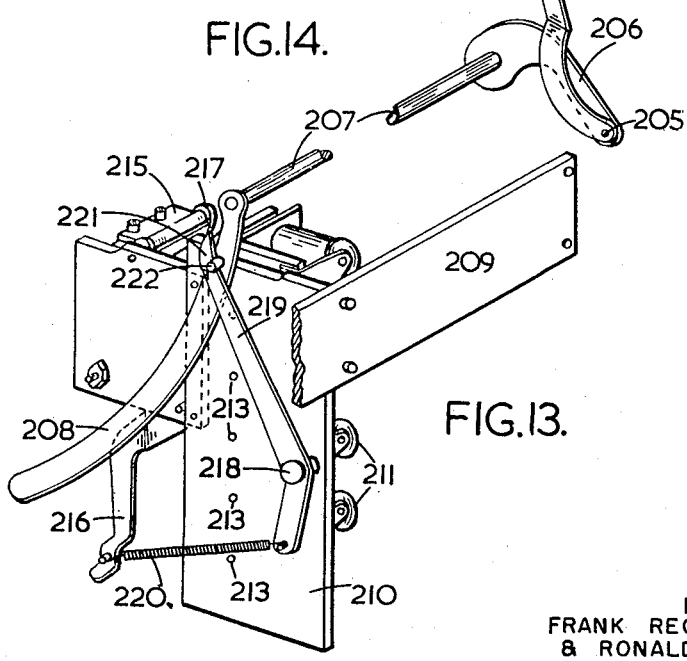

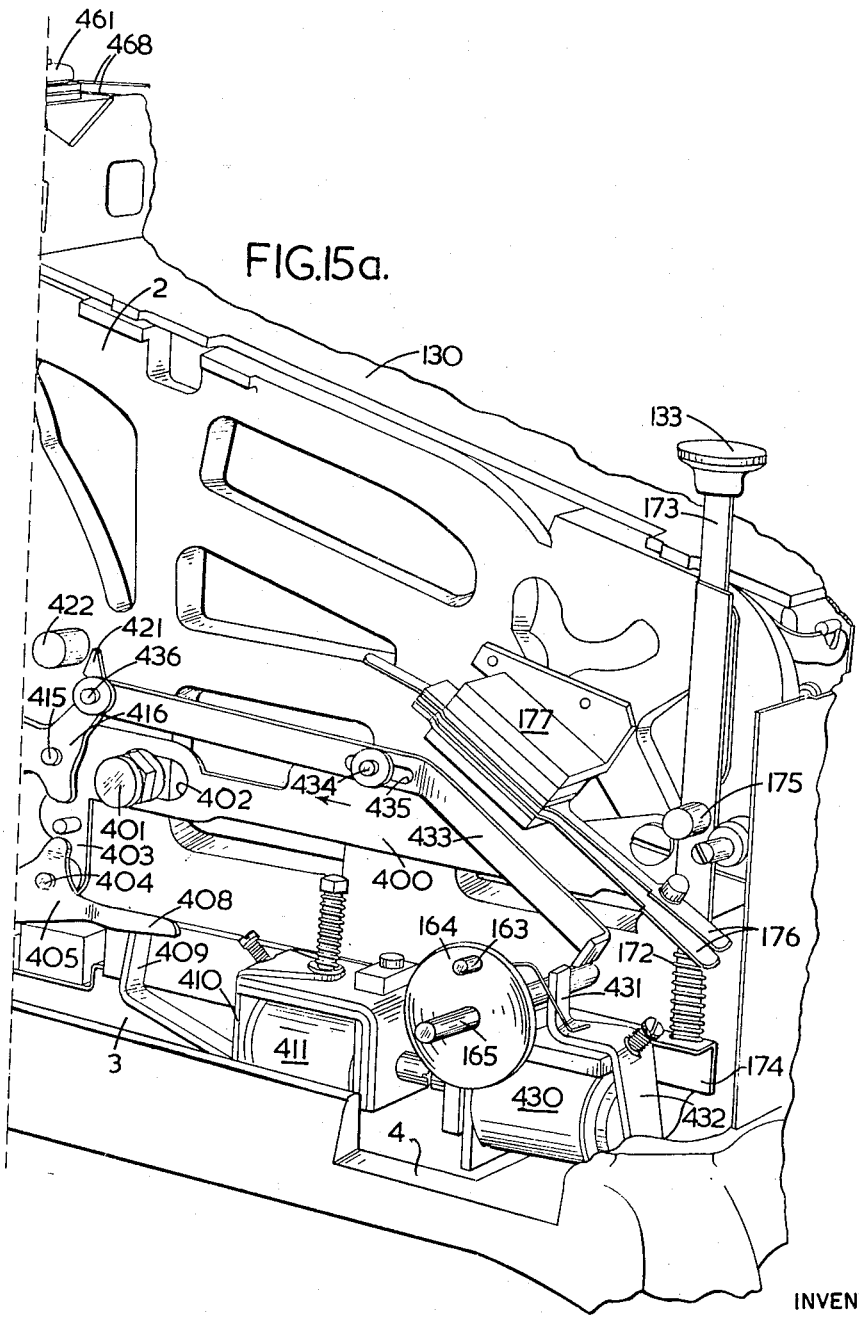

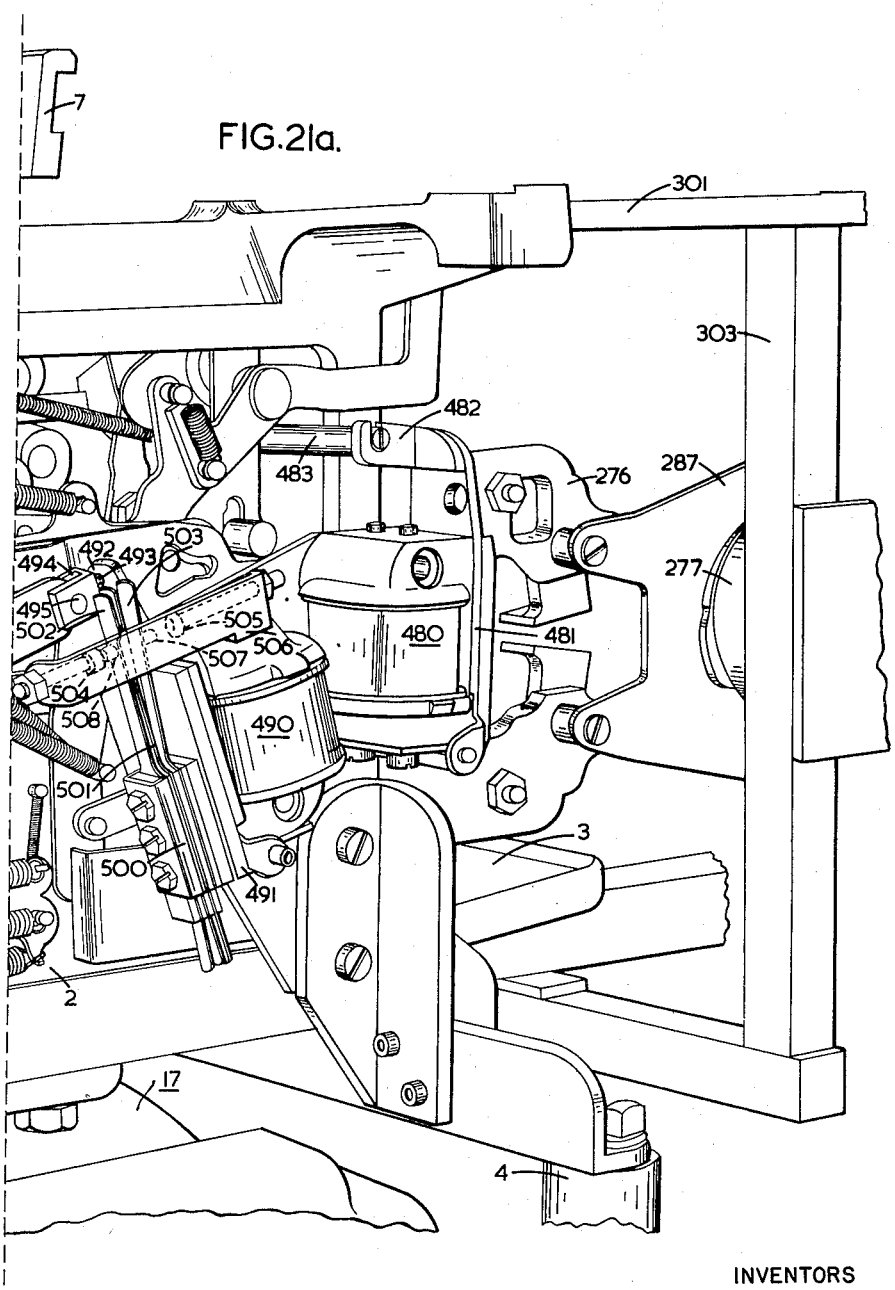

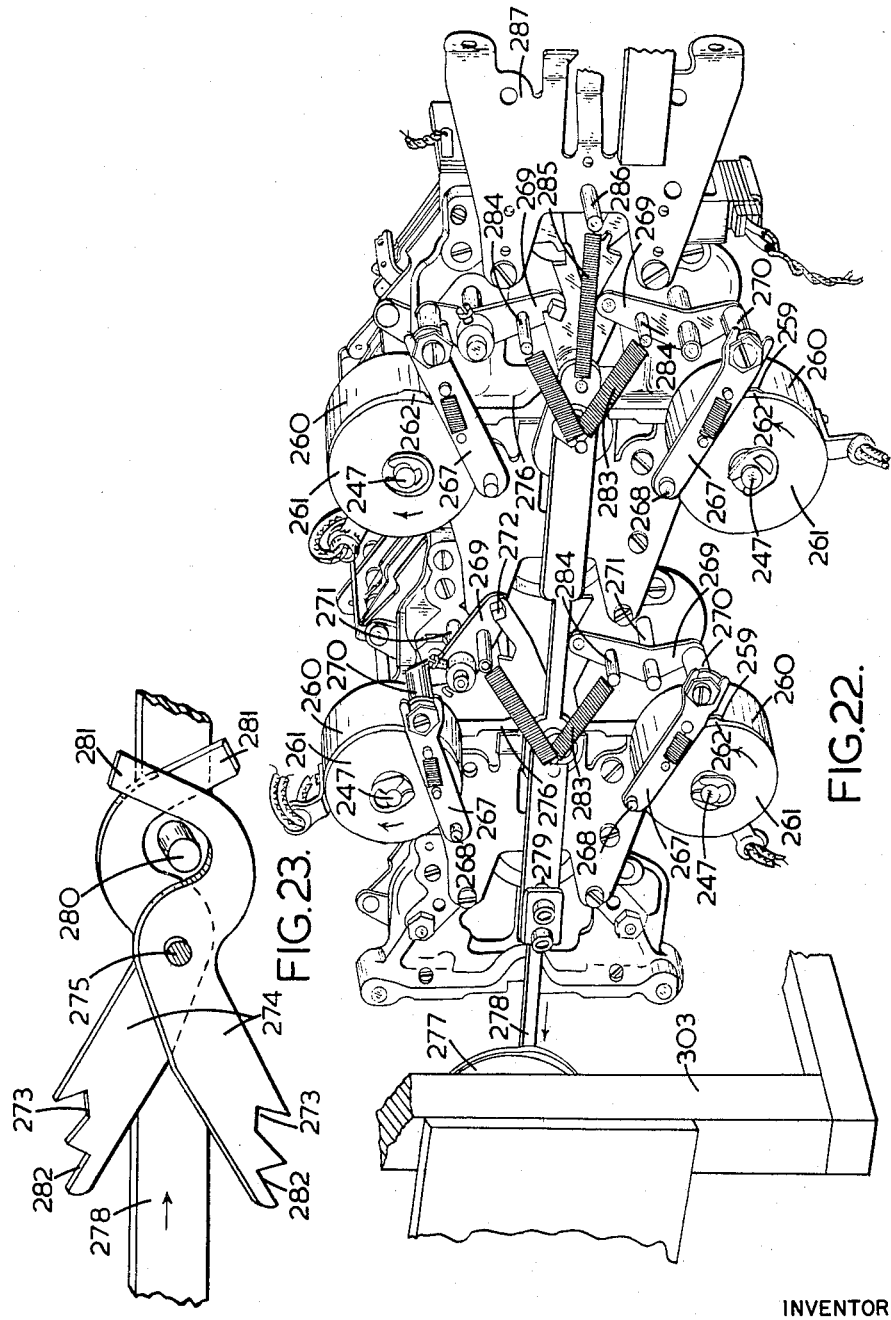

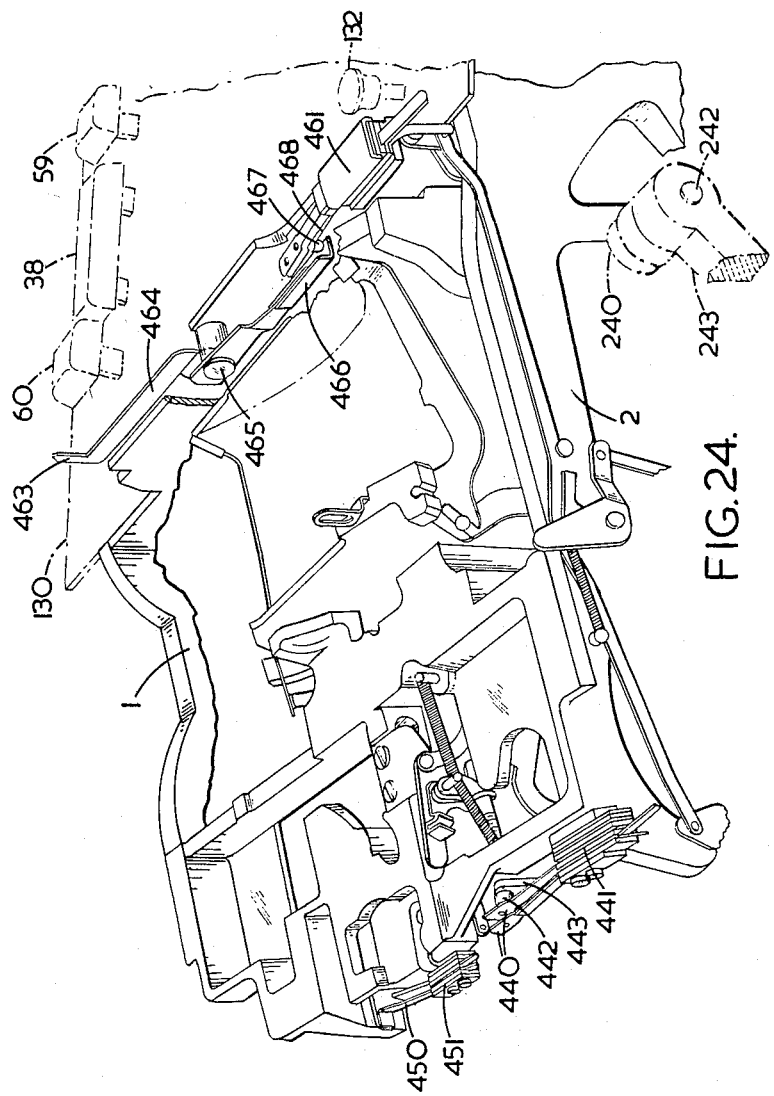

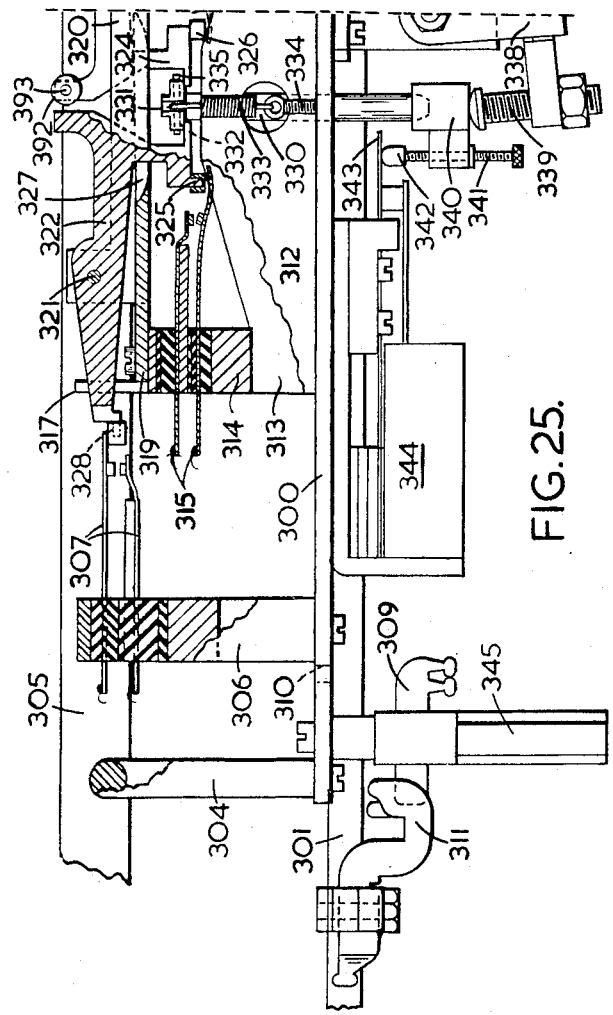

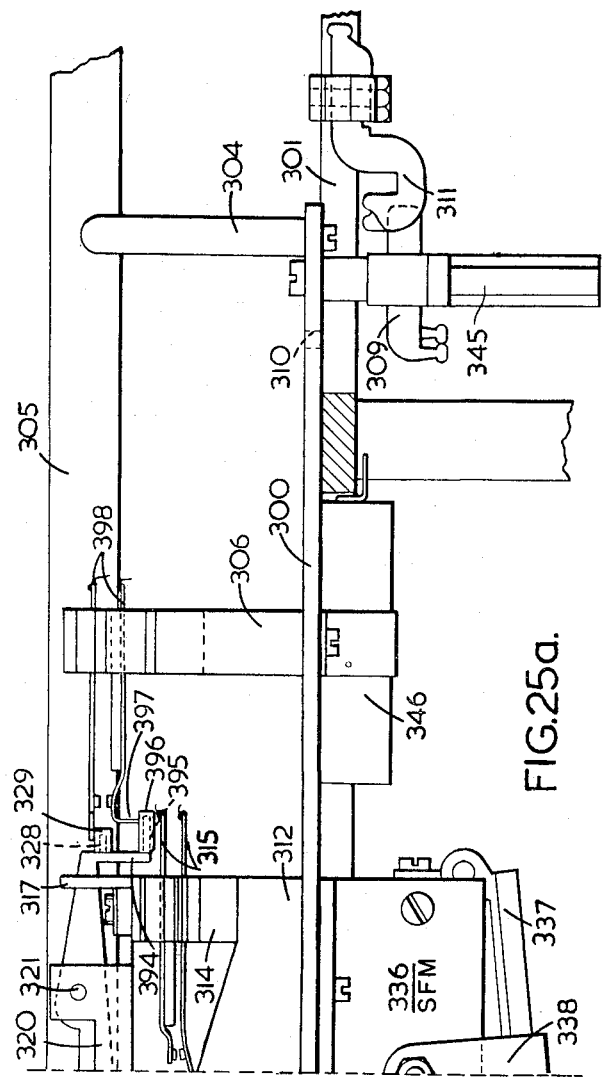

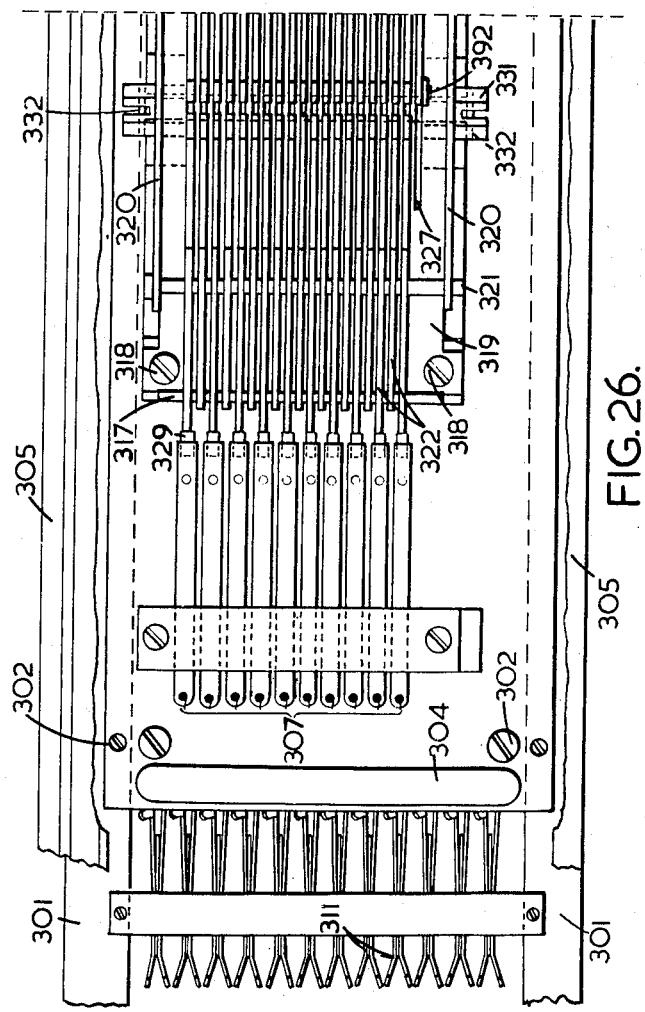

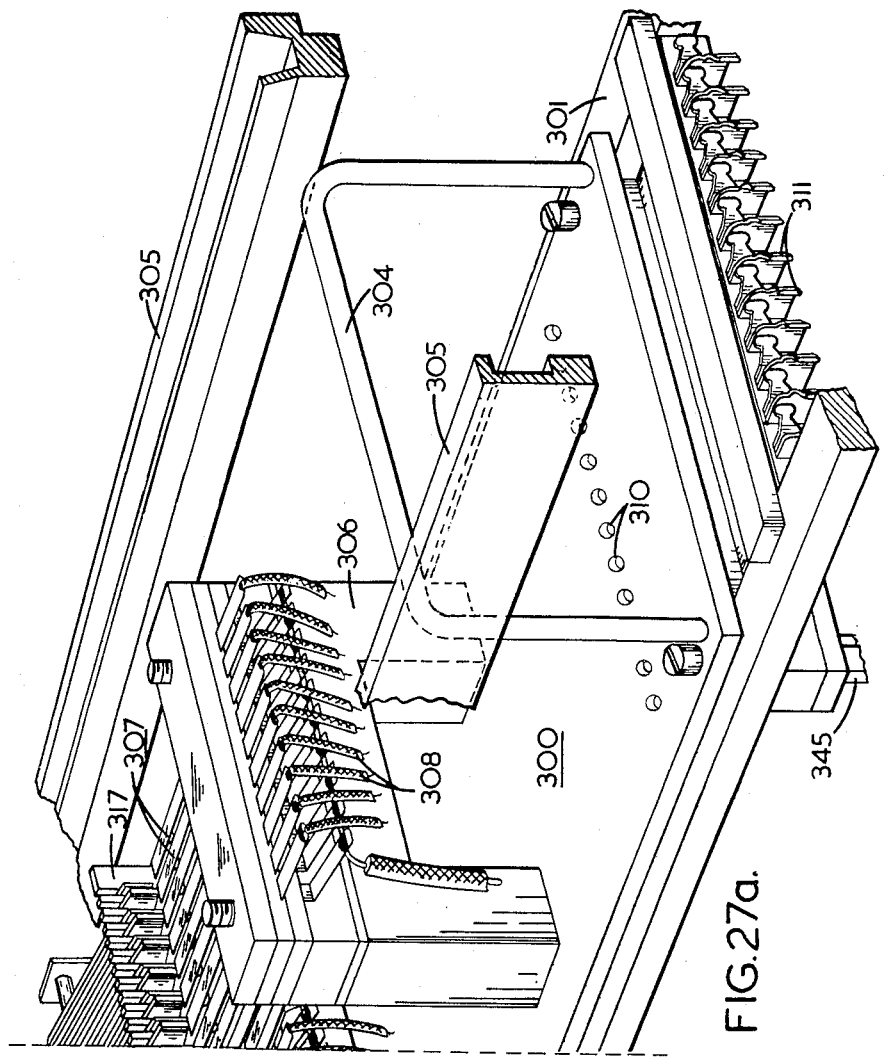

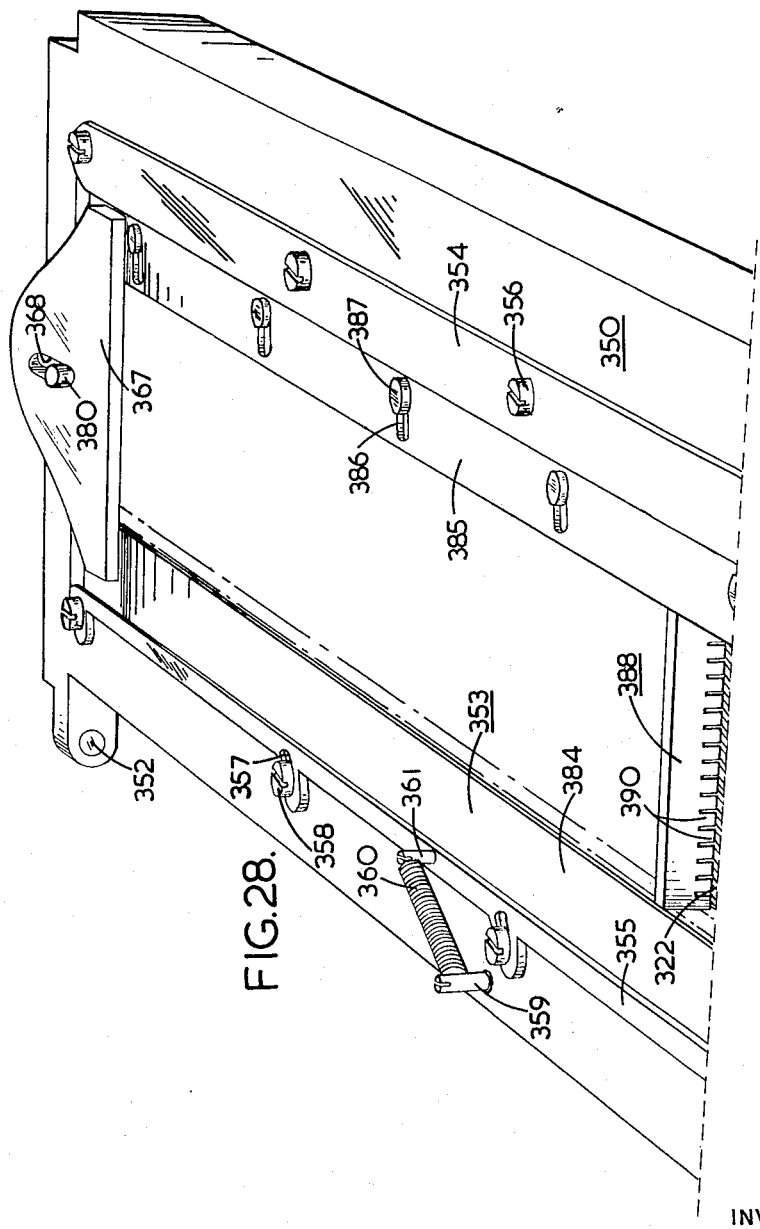

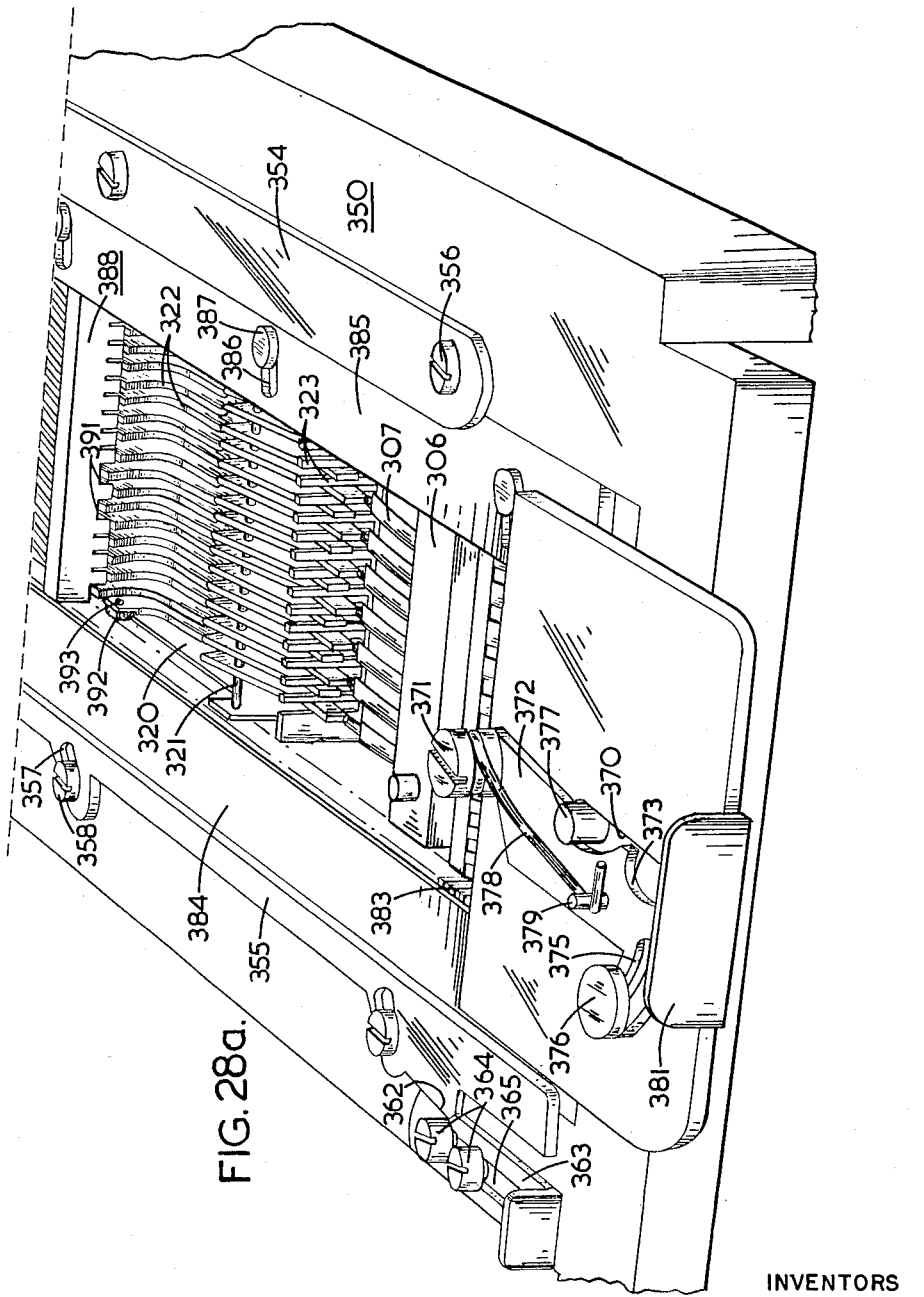

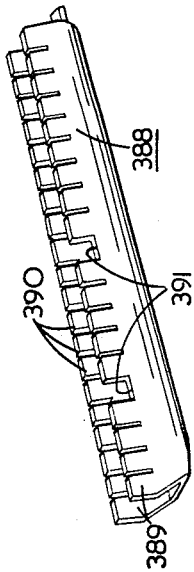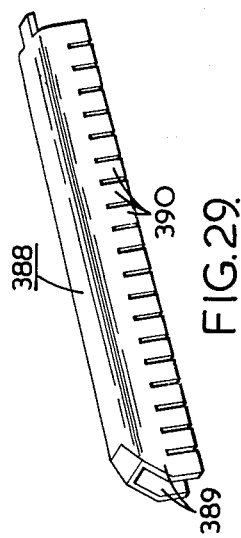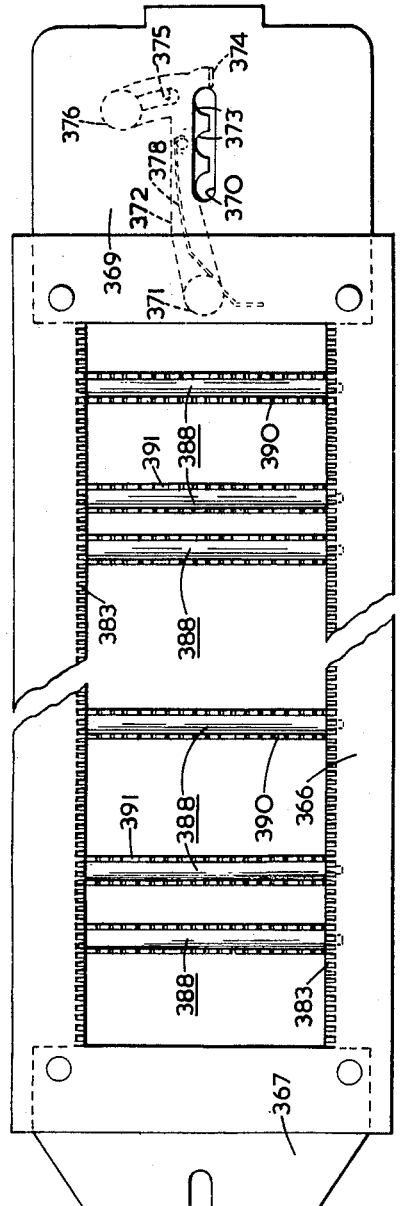

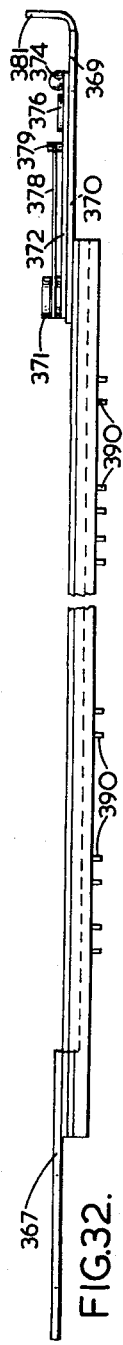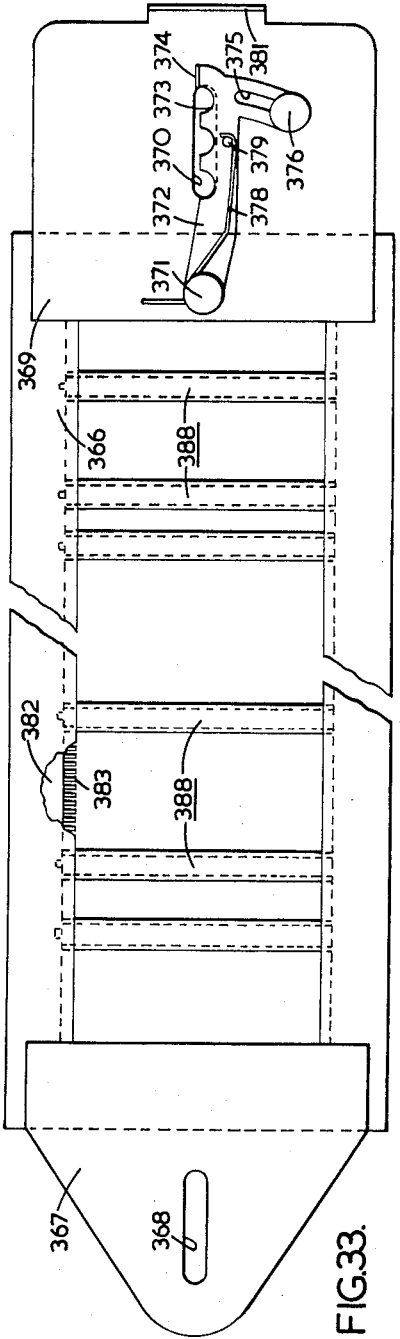

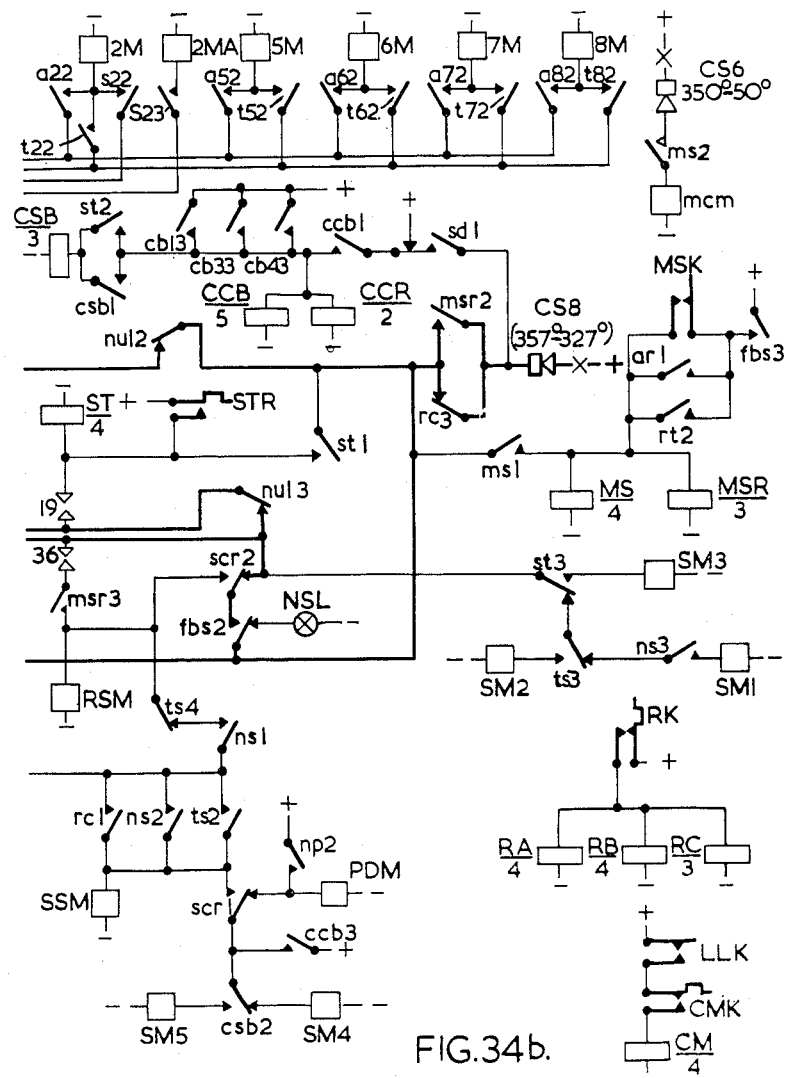
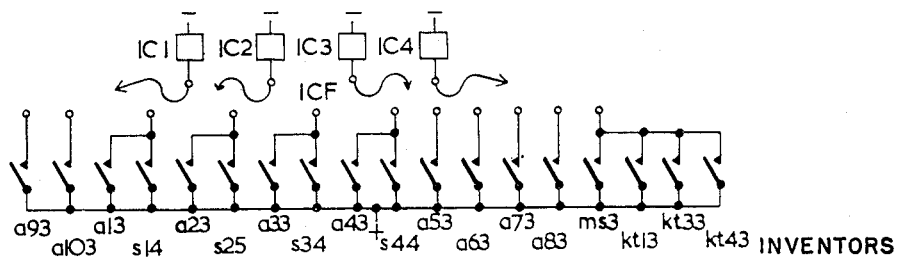
FIG.34b.

2,714,985

ELECTROMAGNETICALLY OPERATED TOTALIZER CONTROL MECHANISM FOR ACCOUNTING MACHINES

Frank Reginald Saxby, Eastcote, Ruislip, and Ronald Pritchard, Ickenham, Uxbridge, England, assignors to The National Cash Register Company, Dayton, Ohio, a corporation of Maryland Application November 13, 1952, Serial No. 320,176

9 Claims. (Cl. 235—60.48)

This invention relates to improvements in accounting and similar machines and is particularly directed to electrically-operated and -controlled means for initiating and controlling the operation and the various functions of said machines.

Stated in general terms, the instant invention is incorporated in a calculating or accounting machine of well-known design, having a plurality of add-subtract totalizers, actuators for entering positive or negative amounts in the totalizers and for taking totals therefrom, amount keys for controlling the positioning of the actuators in adding and subtracting operations, control keys for controlling the functions of the totalizers, printing means positioned by the actuators for making a printed record of the amounts entered into or taken from the totalizers, and a laterally-shiftable traveling carriage movable to various columnar positions for presenting different portions of record material to the printing means.

The general object of the present invention is to provide a machine of the class referred to above with electrical means for initiating and controlling the operation and functions thereof, in contradistinction to the usual mechanical means for initiating and controlling said operation and functions.

Another object is the provision of normally operable means to initiate operation of the electrical means in various types of operations of the machine.

Still another object is the provision of means controlled by the traveling carriage in predetermined columnar positions thereof to initiate operation of the electrical means in all types of operations and to select and condition the totalizers for various functions.

A further object of the present invention is to provide electromagnetically-operated clutches for controlling the engagement and disengagement of the totalizers and the actuators, and to further provide means to control the operation of the clutches to cause the totalizers and the actuators to be engaged and disengaged in proper timing to effect the required function.

Another object is to provide an electromagnetically-operated clutch and controlling means therefor to condition the transfer mechanism of each add-subtract totalizer for a subtract operation.

A further object is to provide relays to control the energization and operation of the electromagnets for the clutches, and to further provide means including control elements for rendering the relays operable.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a diagrammatic front elevation of the machine.

Figs. 2 and 2a together constitute a perspective plan view of the machine.

Figs. 3 and 3a together constitute a diagrammatic view of the right-hand side of the machine.

Figs. 4 and 4a together constitute a diagrammatic view of the left-hand side of the machine.

Figs. 5 and 5a together constitute a slightly more detailed view of the front of the machine.

Fig. 7 is a perspective view of Fig. 6.

Fig. 8 is a perspective view of the motor, partly in section.

Fig. 9 is a detailed perspective view of the cam shaft driving mechanism of the machine.

Fig. 10 is a plan view of the keyboard of the machine.

Fig. 11 is a side elevation of the control key panel.

Fig. 12 is a perspective view of the item counter actuating mechanism.

Fig. 13 is a perspective view of the actuating mechanism for the symbol sector.

Fig. 14 is a perspective view of the actuating mechanism shown in Fig. 13.

Figure 15:
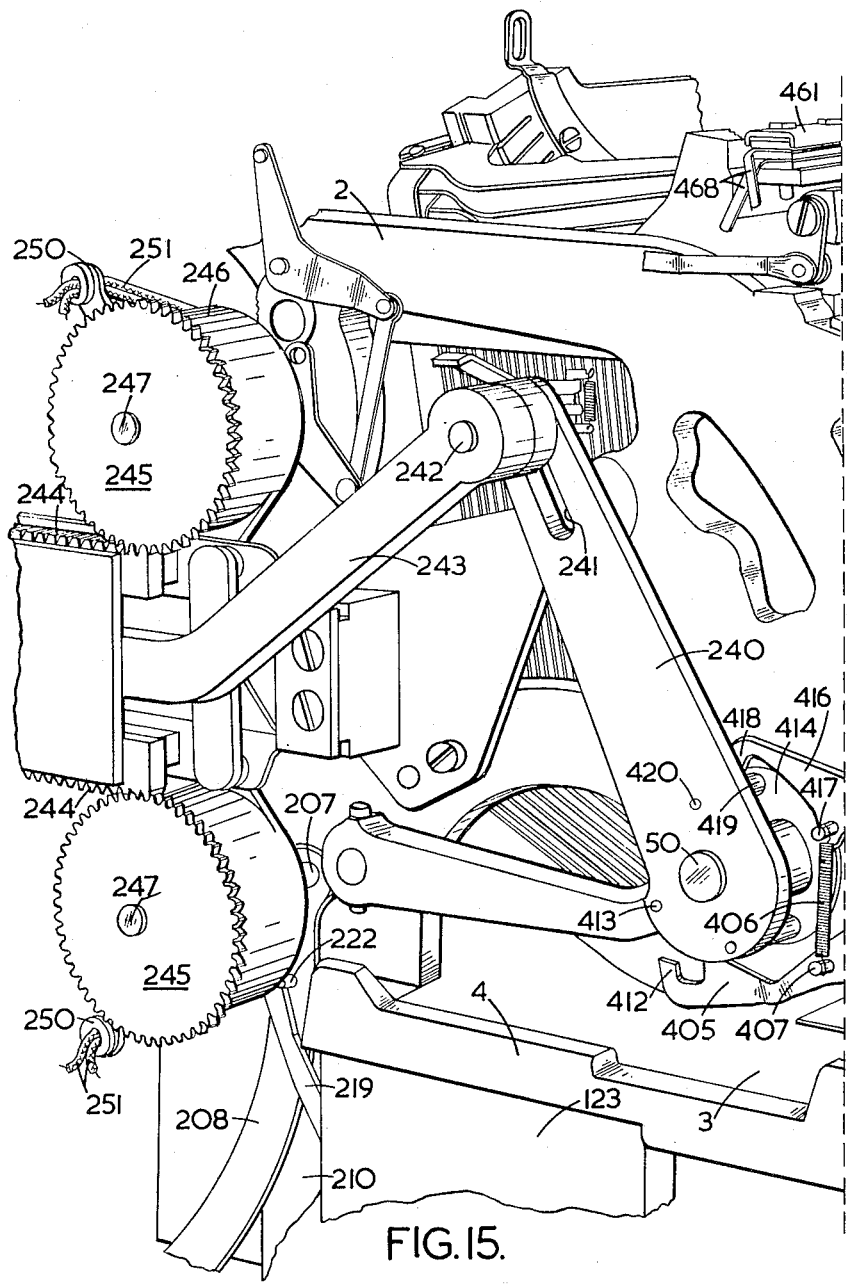

Figs. 15 and 15a together constitute a perspective view of a portion of the left-hand side of the machine, showing the crank arm and rack for actuating the accumulator clutches.

Figure 16:
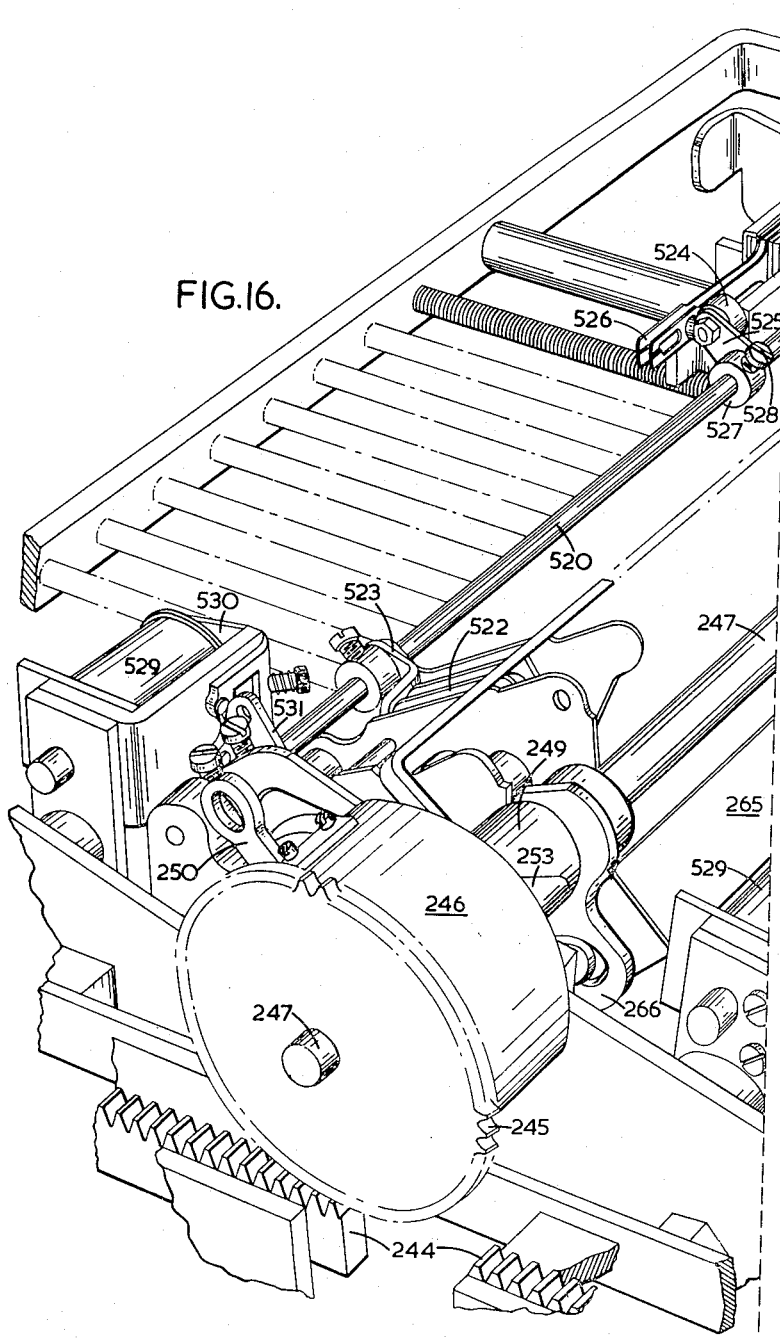
Figure 16A:
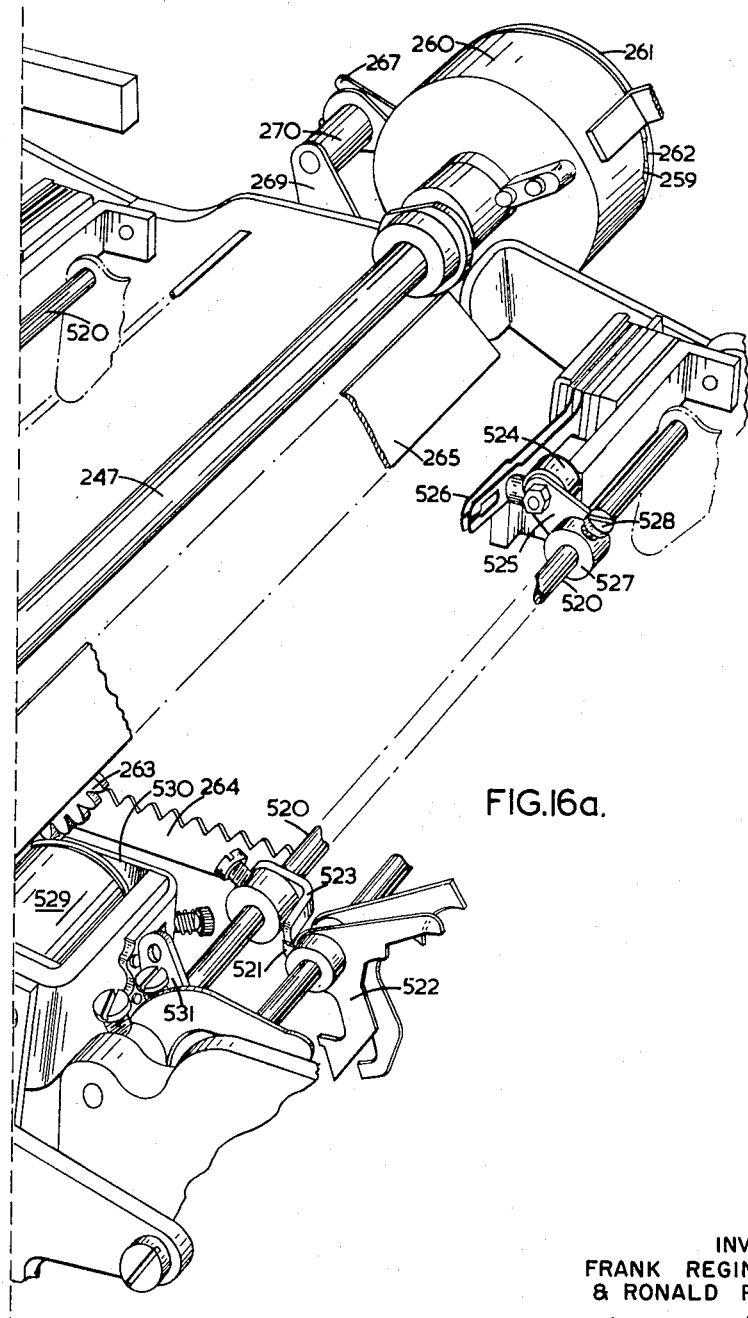

Figs. 16 and 16a together constitute a perspective view of an accumulator clutch and its actuating mechanism, showing its location in respect to the remainder of the machine.

Figure 17:
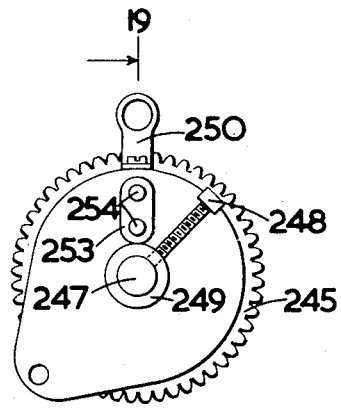

Fig. 17 is an end elevation of an accumulator operating clutch.

Figure 18:
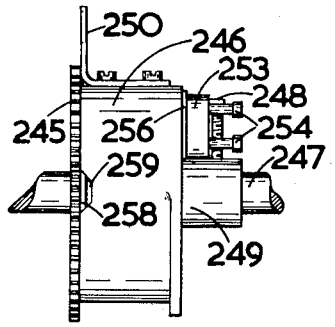

Fig. 18 is a side elevation of Fig. 17.

Figure 19:
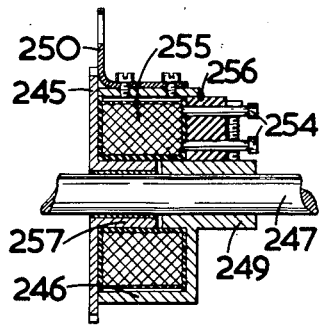

Fig. 19 is a section taken on the line 19—19 of Fig. 17.

Figure 20:
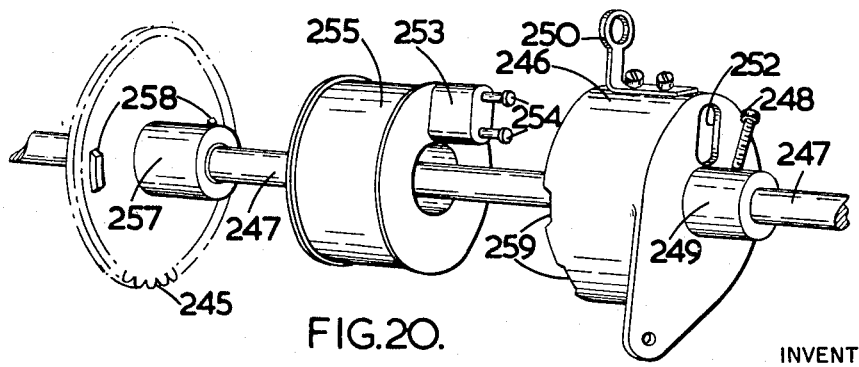

Fig. 20 is a disassembled perspective view of an accumulator-operating clutch and associated shaft.

Figure 21:
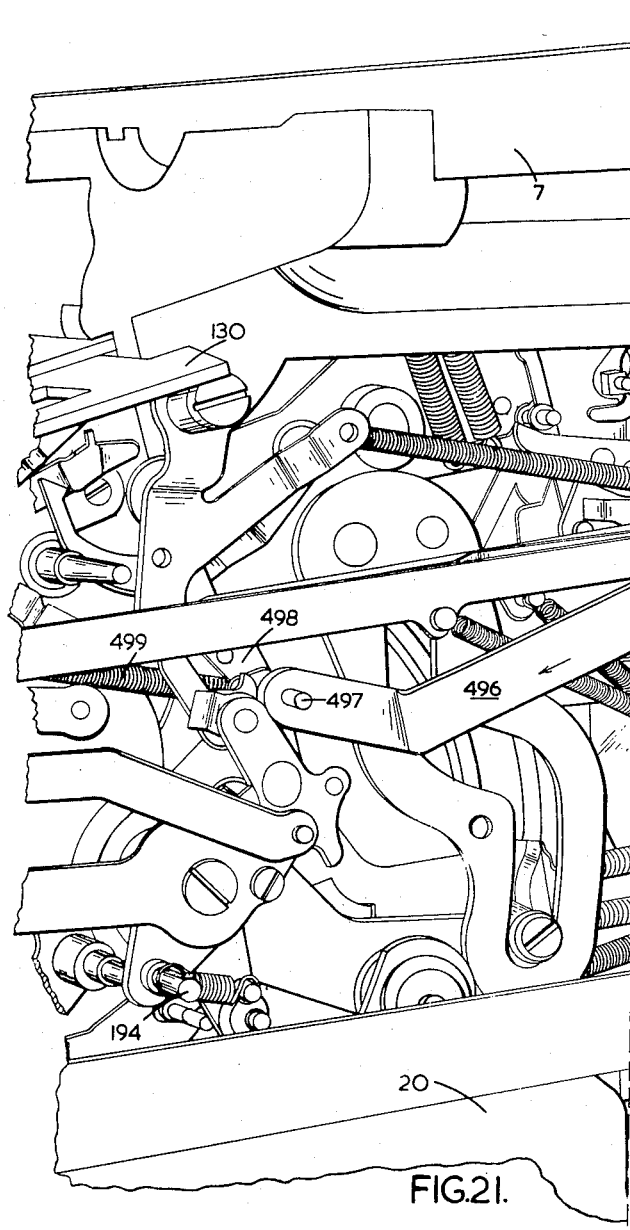

Figs. 21 and 21a together constitute a perspective view of a portion of the right-hand side of the machine, showing the mechanism and magnets for disabling the printer group and for shifting the ribbon.

Fig. 22 is a perspective view of the subtract accumulator clutches.

Fig. 23 is a detail view of a portion of Fig. 22 in perspective.

Fig. 24 is a perspective plan view of the rear portion of the machine, showing the spring sets employed for synchronizing the operation of the form bar, for automatically releasing the sensing field when it is desired to use the typewriter, and for automatically disabling the sensing field when it is desired to vary the position of the carriage.

Figs. 25 and 25a together constitute a side elevation, partly in section, of the sensing field assembly.

Figure 26A:
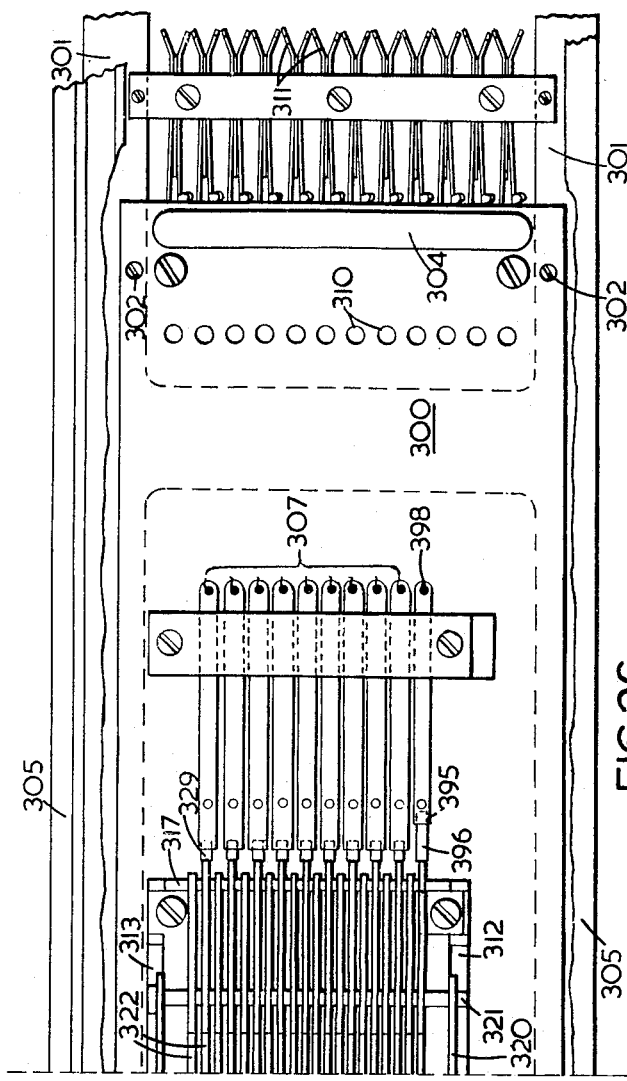

Figs. 26 and 26a together constitute a plan view of the sensing field assembly.

Figure 27:
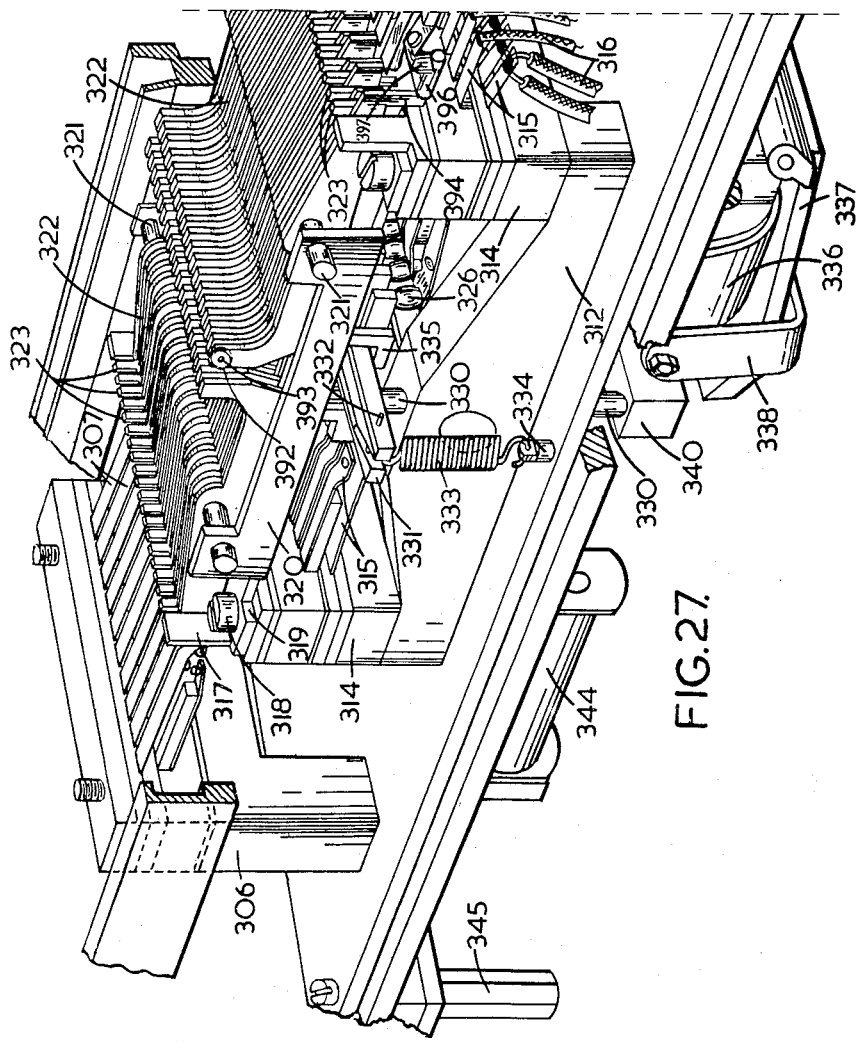

Figs. 27 and 27a together constitute a perspective view of the sensing field assembly.

Figs. 28 and 28a together constitute a perspective view of the selector carriage, showing its position in relation to the sensing field.

Fig. 29 is a perspective view of a selector bar.

Fig. 30 is an under side view of Fig. 29.

Fig. 31 is an under side view of the selector plate, showing a plurality of selectors therein.

Fig. 32 is a side elevation of Fig. 31.

Fig. 33 is a plan view of Fig. 32.

Figure 34:
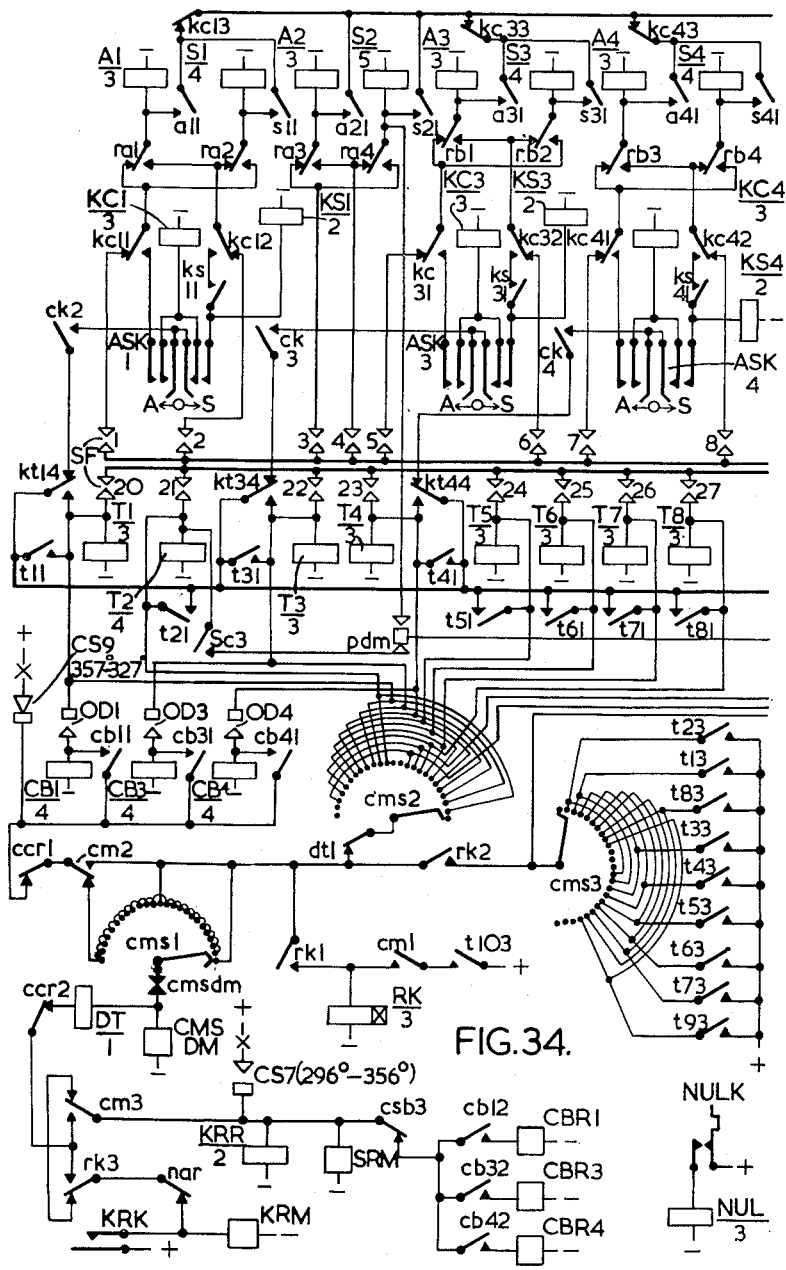
Figure 34A:
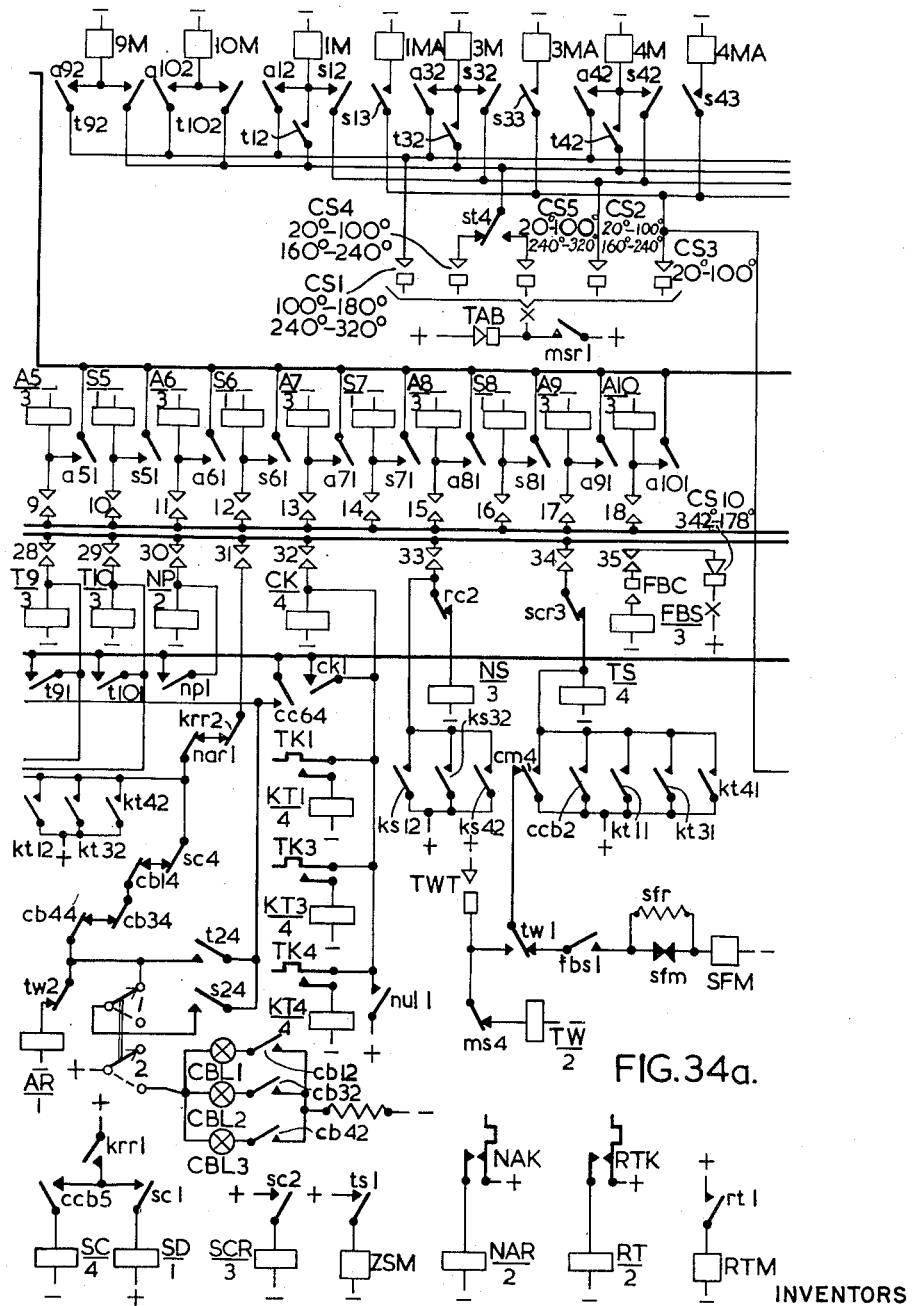

Figs. 34, 34A, and 34B are schematic diagrams of the controlling circuits.

Figure 35:
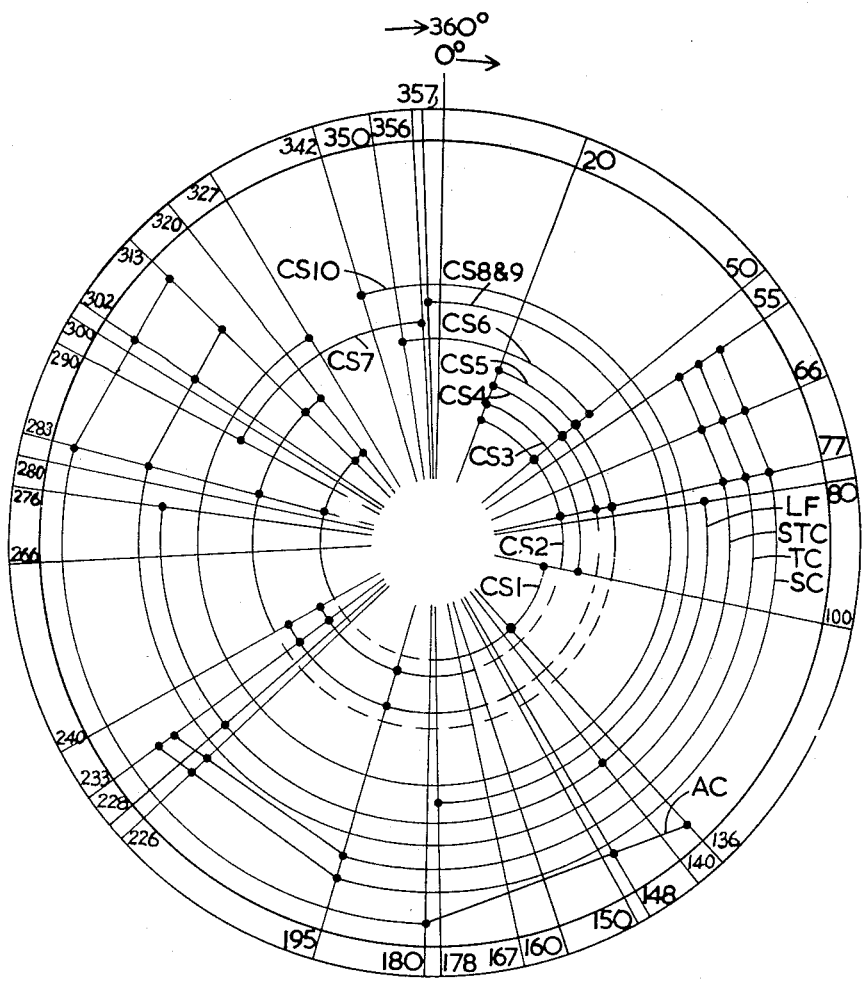

Fig. 35 is a timing diagram.

DETAILED DESCRIPTION

Framework

The mechanism of the machine embodying the invention is supported by a right frame 1 and a left frame 2 (see Figs. 3, 4, 6, 7, 15, and 21), which are mounted on a machine base 3 (Figs. 6, 7, 15, 15a, 21, and 21a), which in turn is secured to a suitable stand 4. The side frames are rigidly supported in relation to each other by means of various cross frames and rods.

The mechanism of the machine is enclosed by a casing 5, provided with runners which, in cooperation with similar runners on the frame of the traveling carriage 6, support the rear side of said carriage for transverse tabulating movement. The forward side of the carriage 6 is supported by means of rollers thereon (not shown) in cooperation with a track 7 (Figs. 21 and 21a) formed on the casing 5.

A platen roll 8, around which the record material passes, is rotatably mounted in the carriage 6 and is of the front feed construction; i. e., an arrangement which permits the record material to be readily inserted into and removed from a position in front of the platen 8 without necessitating the winding of material around the platen. The mechanism for operating such a construction is disclosed in United States Patent No. 2,441,870, issued May 18, 1948, to Raymond A. Christian.

A plurality of amount type sectors 9, a symbol sector 10, which is shown in greater detail in Fig. 13, and a plurality of date wheels 11 are provided for printing the desired data on the record material, and, after printing occurs during each machine operation, the traveling carriage 6, if desired, may be tabulated automatically from one column to the next, or it may be left in tabulated position and manually tabulated from one column to the next.

Located in front of the machine is a typewriting mechanism and keyboard, indicated generally at 12, and is of the well-known kind including a button 13 located on the front of the machine, by means of which the ribbon (not shown) can be manually shifted and its color changed.

Adjacent the typewriter keyboard are a credit return bar 14 and a debit return bar 15, by means of which the carriage can be returned from tabulated positions to predetermined columnar positions, a pair of switches 16 also being provided for connecting a motor to any suitable source of supply.

*Operating mechanism*

The machine is preferably operated by means of a start-stop electric motor 17 (see Figs. 1, 3, 4, 5, 6, and 8), of the type disclosed in United States Patent No. 2,142,341, issued June 3, 1939, to Charles H. Arnold, but having the addition of an electromagnet, which is shown in Fig. 8 and the purpose of which will be described hereinafter.

The operating motor 17 is geared to a driving member 18 (Fig. 6) of a clutch device, said driving member being rotatably mounted upon a pin 19 secured in the clutch housing 20 and cooperating with a driven clutch member 21, also rotatably mounted upon the pin 19, a shoulder on the driven member, in cooperation with a clutch release lever 22, normally maintaining the clutch member 21 out of engagement with the driving member 18, said lever 22 being loosely journaled on a stud 23 in the clutch housing 20 and integral with a control lever 24.

The lever 24 is provided with a bifurcated extension 25, which serves to embrace a stud 26 in a pitman 27, the rear end of said letter member having a slot adapted to slide on a stud 28 in the right frame 1.

A shaft 29, journaled in the frames 1 and 2, has a release plate 30, rotatably mounted thereon, which is pivotally connected at 31 to the forward end of the pitman 27.

Figure 6:
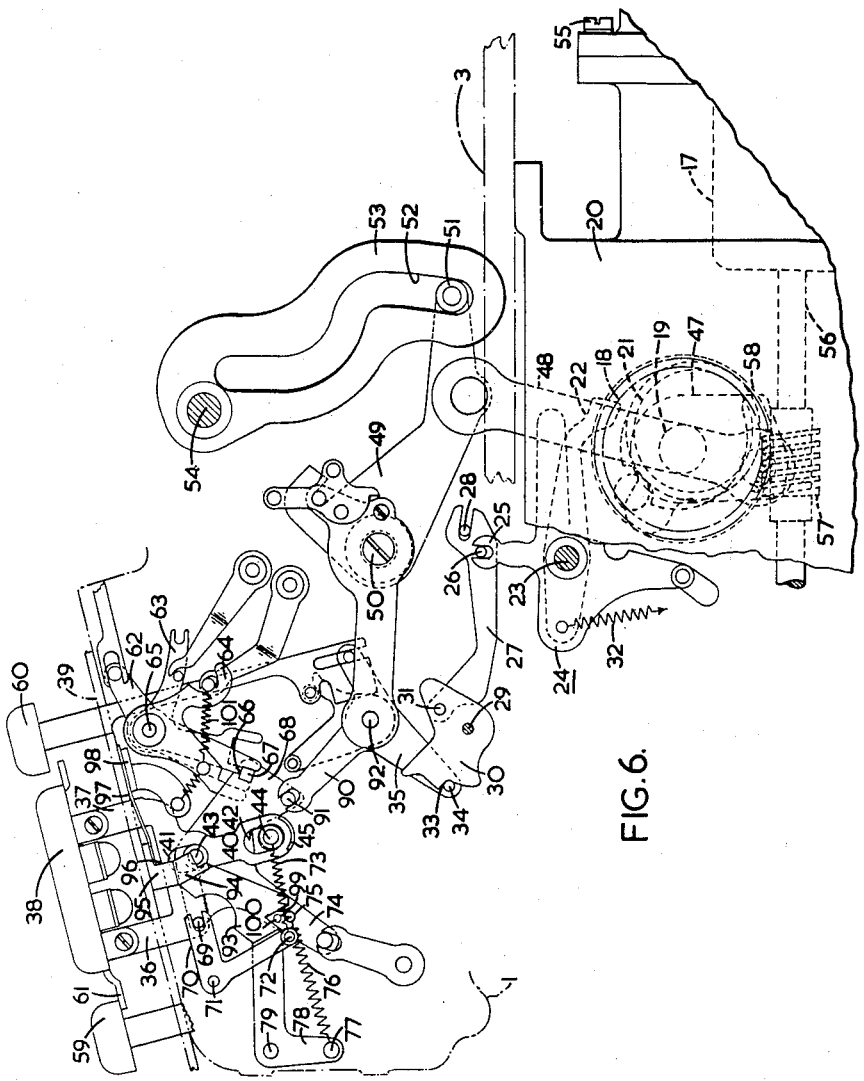
Fig. 6 is a diagrammatic view of the driving and release mechanism of the machine.

The clutch lever 22 is normally maintained in effective position, as shown in Fig. 6, against the action of a spring 32, tensioned to urge the lever 22 into non-operative position by means of a shoulder 33 on the plate 30 in cooperation with a stud 34 on a lever 35 in the frame 1.

The two arms 36, 37 of a machine starting bar 38 extend through openings in a plate 39 secured to the frames 1 and 2, the shank 40 of said bar 38 being slidably mounted within the machine by means of parallel slots 41, 42, cooperating with stationary studs 43, 44, secured in the frame 1.

The lower end of the shank 40 has an abutment portion 45, which serves, upon depression of the bar 38, to close a pair of contacts 46 (see Fig. 7), thus energizing a relay which completes a circuit for the operation of an electromagnet 80 (Fig. 8), as will be described hereinafter.

When the motor 17 is operated, as will be described hereinafter, a crank 47, integral with the clutch driven member 21 and pivotally connected by a link 48 to a lever 49 secured on a main driving shaft 50 journaled in the frames 1 and 2, is caused to transmit movement to the lever 49.

The motor 17 drives the clutch members 18 and 21 counter-clockwise, and one revolution of the driven member 21 will, through the intermediary of the crank 47 and the link 48, oscillate the lever 49, together with the main driving shaft 50, first counter-clockwise and then back to normal position through an angle of approximately 60 degrees.

The rear end of the lever 49 has a roller 51, which is adapted, in cooperation with a camming slot 52 in a plate 53 secured to the leading frame shaft 54, to rock said shaft 54 first counter-clockwise and then back to normal position.

As will be seen from Fig. 6, the motor 17 is secured to the clutch housing 20 by screws 55, the housing being attached to the under side of the machine base 3 by any suitable means.

The motor 17 has a shaft 56, on which is mounted a worm 57, which meshes with the teeth of a worm wheel 58 rotatably mounted on the pin 19 secured to the housing 20, the driving member 18 being secured to the worm wheel 58.

As in hitherto-known machines of this type, the clutch may be engaged by the depression of the starting bar 38, or a Skip Tab motor bar 59, or a vertical feed motor bar 60. As will be seen from Fig. 6, both of these latter bars are located above a lip 61 carried by the machine starting bar 38, the arrangement being such that, whenever either of these two bars is depressed, the machine starting bar 38 will be simultaneously depressed, thereby causing the motor clutch to be engaged, the circuit completed, and the machine operated.

In order to prevent a machine cycle from being initiated when the traveling paper carriage 6 is out of columnar position or "off stop," or when an amount key is in a partially-depressed condition, or when some other condition renders it undesirable to permit a machine operation to occur, a plurality of locking arms 62—64 are provided, which are pivotally mounted on a stud 65, secured in the right frame 1.

Each of the locking arms 62—64 is provided with a shoulder 66, which is adapted to overlie a stud 67 of substantially square cross-section carried by an arm 68, which is pivotally mounted on the stud 43 associated with the machine starting bar 38.

A stud 69, fast on the arm 36 of the starting bar 38, is located within the bifurcated end of a bell crank lever 70, pivoted to the stem of the Skip Tab motor bar 59 at 71, the other end of the bell crank being connected at 72 to the stud 44 by a spring 73. The arm 68 is formed with a downward extension 74, having a pin 75, serving as the anchoring means for one end of a spring 76, which is connected at 77 to a lever 78, pivoted at 79 to the side frame 1.

Upon depression of the motor starting bar 38, the pin 69 causes the bell crank 70 to rock about pivot 71 against the action of the spring 73, and it will be appreciated that, when pressure is removed from the machine starting bar 38, it will be returned to its inoperative position automatically by the action of the spring 73.

As hereinbefore stated, depression of the starting bar 38 closes the contacts 46 and, through the intermediary of a relay, completes a circuit to energize the electromagnet 80, located in the motor casing (Fig. 8).

The armature 81 of the magnet 80 is pivoted at 82 and has an upstanding portion 83, having a shoulder 84, which, when the armature moves downwardly, is adapted to contact one arm 85 of a lever 86. The lever 86 is pivoted at 87 and has the end of its other arm 88 bifurcated, said lever being shown in Fig. 8 in its depressed position.

Located within the bifurcated end of the arm 88 is a stud 89, fast on the lower end of the control lever 24, which, on depression of the arm 85, rocks the control lever 24 counter-clockwise. Counter-clockwise movement of the control lever 24 causes the pitman 27 to rock the release plate 30 about its pivot 29, the latter rocking the lever 35 by means of the stud 34.

As will be seen in Fig. 6, the lever 35 has a bifurcated arm 90, the bifurcation embracing a stud 91, fast on the arm 68, the arrangement being such that clockwise movement of the lever 35, which is pivoted at 92, will rock the arm 68 counter-clockwise, so that, if the locking arms 62—64 are in an inoperative position, the square stud 67 will be free to move. However, if, for any of the reasons stated above, the locking arm is in the path of the stud 67, the clutch will not be released.

The bell crank 78 has an angular arm 93, having a projecting portion 94 located immediately beneath a release button 95 projecting through an opening formed in the plate 39. The shank of the button 95 is cut away at 96 to form a seating for one end of a leaf spring 97, which is adapted to urge the button upwardly, the other end of the spring being maintained in contact with the under side of the plate 39 by means of a location piece 98.

As stated above, should any of the arms 62—64 be in the path of the stud 67, the clutch will remain inoperative until the condition rendering said arms operative is removed. When the condition is removed, only the arm 62 will be moved automatically to its inoperative position, but, should either of the remaining arms 63 or 64 be in operative position and the condition then removed, they will remain in that position until depression of the release button 95 by the operator.

When the button 95 is depressed, the bell crank 78 will rock about its pivot 79 against the action of the spring 76, and the arm 93 will consequently move downwardly, thus causing a camming surface 99 thereon to contact a stud 100, carried by the arm 68, and thereby rock said arm about the stud 43 and hence remove the square stud 67 from contact with the shoulder 66 of either of the two locking arms 63 or 64.

As soon as the square stud 67 is removed out of contact with the shoulders 66, the locking arms 63 and 64 will automatically be returned to their inoperative position owing to their being spring-loaded, one of the springs being indicated at 101.

Referring to Fig. 8, it will be seen that the end of the arm 85 of the lever 86 is provided with a block 102 of any suitable insulating material, which, when the clutch is inoperative, normally abuts a member 103 pivoted at 104 to an insulated block 105. The member 103 has a contact 106, which, when the arm 85, together with the block 102, is depressed, abuts a second contact 107, the member 103 moving downwardly under the action of a spring 108. Closing of the contacts 106, 107 completes the circuit to the motor 17.

A spring-loaded lever 109 is pivoted at 110 and has a pair of notches 111, which serve to maintain the control lever 24 in its operative position, a stud 112 being provided on said lever and adapted to be engaged by either of the notches 111.

For simultaneously restoring the mechanical connections and breaking the electrical circuit, a cam face 113 (Fig. 8) on the end of the crank arm 47 is adapted, when the latter is rotated, to contact a stud 114 fast on the lever 24. This partially rotates the lever 24 clockwise and thereby enables the stud 112 to move into the lower notch 111 and hold the lever 24 in its inoperative position, while the stud 89 partially rotates the lever 86 counter-clockwise, thereby causing the block 102 to rise and break the contacts 106 and 107.

A motor bar control lever 115 (Figs. 2a, 5a, and 10) projects through an opening in the plate 39 and is connected by suitable linkage to a pivoted lever 116 (Fig. 7), which, upon movement of the lever 115 to listing position, moves in the direction of the arrow. The lever 115 has three positions; i. e., firstly, when in its No. 1 or upper position, the traveling carriage 6 and the starting bars 38, 59, and 60 function in the normal manner, as explained above; secondly, when the lever 115 is in its No. 2 position, the automatic tabulation of the traveling carriage is disabled at all times, together with line-spacing of the platen; and thirdly, in its No. 3 or lower position, it disables the tabulation of the carriage 6 but permits line-spacing of the platen 8 to occur, as is well known.

However, when the lever 115 is in its No. 3 position, it rocks the pivoted lever 116 to its fullest extent, such movement allowing an abutment portion 117 thereof to close a pair of contacts (not shown but located immediately beneath the contacts 46) forming part of a spring set 118, which prepares a circuit for a relay in the "Clear Machine" feature to be described hereinafter in connection with the controlling circuits.

The pin 19, upon which the driving member 18 is rotatably mounted, is axially bored and contains a shaft 119 (Fig. 9) fast therewith, the latter being secured at one end to a portion 120 of a coupling. The other half 121 of the coupling is mounted on a cam shaft 122, journaled in bearings (not shown) carried by a box 123, which is secured to the base 3 of the machine. The cam shaft 122 has mounted thereon a plurality of cam discs 124, each of which, when the motor 17 is operated, closing a spring set 125, the sets 125 being carried by a bar 126, secured to the back of the box 123. The spring sets 125 are arranged, when closed, to operate a plurality of electromagnets and/or relays which determine the movements of the machine, as will be described hereinafter.

*Keyboard*

The accounting machine keyboard 130 of the machine, shown in Figs. 1, 2, 5, 10, and 11, includes, in addition to the motor bar assembly hereinbefore described, a plurality of amount denominational keys 131, a plurality of descriptive transaction keys 132, a release key 133, and a plate 134, detachably secured to the keyboard 130.

The plate 134 includes a plurality of control keys which are designated as follows: 135 indicates the "Total 3" key, 136 indicates the "Total 2" key, and 137 indicates the "Total 1" key. 138 indicates the "Nullify" key, and the "Non-Automatic Release" key is indicated at 139, the "Repeat" key being indicated at 140. The "Sub-Total" key is indicated at 141, the "Clear Machine" key at 142, and the "Reverse" key at 143.

The plate 134 further includes a plurality of add-subtract switch keys 144—146, which post amounts in the Nos. 1–3 totalizers, respectively, and a lamp 147, mounted thereon, which serves as a warning signal to the operator should the sensing field, to be described in detail hereinafter, not be working synchronously with the normal form bar 148.

Referring more particularly to Fig. 11, it will be seen that the heads of the control keys are mounted on key stems 149, each of which is slidably mounted in the plate 134, the control keys being spring-biased upwardly and each stem having a laterally-projecting pin 150 thereon.

The plate 134 is secured to a downwardly-extending wall 151, having two pairs of rollers 152 mounted thereon, serving as guideways for a pair of slides 153, 154. The slide 153 has a plurality of slots 155, each of which is formed with a cam surface 156 leading to a shoulder 157, the slide being biased into effective position by a spring 158 and furthermore being provided with a laterally-extending pin 159.

The other slide 154, hereinafter termed the locking slide, is located immediately adjacent the slide 153 and is also provided with a plurality of slots 160, of a shape corresponding to the slots 155 but inverted, and a downwardly-extending portion 161. The portion 161 is slotted at 162 and accommodates a pin 163 (Figs. 11 and 15a), which projects laterally from a disc 164 mounted on a shaft 165, which is indirectly coupled to the shaft 29 (Fig. 6).

Also carried by the downwardly-extending wall 151 of the control panel 134 is an electromagnet 166, the upper end of its armature 167 being adapted to contact the pin 159 projecting from the slide 153.

The lower end of each of the key stems 149 cooperates with a spring set 168, the contacts of which are normally open, the laterally-extending pins 150 of the control key stems 149 projecting through slots 169 formed in the wall 151 of the panel.

The lamp 147 is mounted in a jack of well-known type, secured to the under side of the control panel 134 by bolts 170, and has a pair of tags 171, by means of which an external circuit is connected to the lamp, the circuit being automatically closed should the sensing field not operate synchronously.

The functions of the Add-Subtract switch keys 144—146, when operated, are to supersede the carriage control over the functions of the totalizers.

When the operator depresses a selected control key, the stem 149 (Fig. 11) thereof is moved downwardly, and this movement causes its associated pin 150 to ride over the cam surface 156 of the respective slot 155 in the slide plate 153. This movement causes the plate 153 to slide between the rollers 152 against the action of the spring 158 until the pin 150 slips into the latch portion of the slot, the spring 158 maintaining the plate 153 in latched position.

When the shafts 29 and 165 (Figs. 6 and 15a) are moved, the disc 164 is adapted to oscillate, and the pin 163 thereon, due to its location in the slot 162, causes the portion 161 of the locking plate 154 to move to the right or in the direction of the arrow (Fig. 11), and this movement has the effect of sliding the locking plate 154 in the same direction to enable the pins 150 of the undepressed control keys to be locked in the latch portions of each slot 160 of the locking plate 154. By this arrangement, the accidental depression of the remaining control keys is avoided.

The key 133 is adapted, when depressed, to automatically restore any of the amount keys 131 which have been depressed, said key 133 being normally biased upwardly by a spring 172 (Fig. 15a), which is disposed about the lower end of the key stem 173 and contacts, at its lower end, a member 174 secured to the left-hand frame 1 of the machine.

A laterally-extending pin 175 on the stem 173 serves, when the key 133 is depressed, to close a pair of contacts 176 of a spring set 177 secured to the left frame 1 and thereby close a circuit to the electromagnet 166, which causes the armature 167 to move the slide 153 and release the locking pins 150 of any operated keys.

*Item counter*

The item counter for counting the number of various operations of the machine is shown in Fig. 12 and includes a frame 180, having a plurality of operation-counting wheels 181 rotatably mounted on spindles 182 journaled in the side members 183 of the frame.

The wheels 181 are moved step by step by the usual graduated tined carrying pawls 184, to which are pivoted links 185, having their other ends pivoted at 186 to arms 187, the links and the arms forming toggle connections. Each of a plurality of pins 188 is secured to the armature of a corresponding electromagnet 189 (Figs. 3 and 5a) and pass freely through the base member 190 of the frame 180, the arrangement being such that, upon energization of the required magnet, the armature moves its pin 188 outwardly from the opposite end of the base member 190.

Mounted on the side of the frame 180 is a slide member 191, provided with slots 192, in which the pivot pins 186 are located, the slide being reciprocated first to the right and then to the left by a link 193 depending therefrom, which is rocked by movement of the shaft 194, a spring 195 being provided for restoring the link and the slide.

It will be obvious that, when the slide 191 is reciprocated to the right, it will transmit movement to the pivot pins 186, tending to straighten the toggles formed by the links 185 and the arms 187. The upper ends of the links 185 have the load of the pawls 184 thereon, so that the arms freely move downward if they are unobstructed, the pivots sliding down the slots 192 in the slide 191. However, if any one of the arms 187 is obstructed from downward movement by the projection of a pin 188 under its lower end consequent upon the energization of the associated electromagnet 189, then, upon movement of the slide toward the right, the link must perforce move upwardly to operate the pawl 184 to enter a unit into the units counter wheel.

Mounted on the outer end of each spindle 182 is a knurled hand resetting wheel 196, by means of which the item counter 181 may be reset to zero when desired. Any of the item counters may be associated electrically with any one of the ten totalizers of the machine by means of a plug-and-socket board, shown diagrammatically in Fig. 34B, wherein the counters are indicated at Ic1—IC4.

*Symbol sector actuating mechanism*

The mechanism for setting the symbol sector 10 is shown in detail in Fig. 13 and operates on the same principle as that associated with the item counter.

The sector is pivoted at 201 to the shaft (not shown) carrying the amount type sectors 9 and has a link 202 connected thereto at 203, said link in turn being connected to a second link 204, which is connected at 205 to a lever 206 fast on a shaft 207, said shaft having a sector arm 208 fast on its other end.

A bar 209, which is secured to the back of the cam box 123, supports a plate 210, projecting at right angles thereto. The plate 210 has mounted on one side thereof a plurality of electromagnets 211 (Fig. 14), the armatures 212 of which are provided with pins 213, which, if desired, project through the plate 210 when the armatures are attracted. As will be seen from Fig. 14, a plate 214 is secured to the electromagnet assembly, and this serves as the mounting for a master electromagnet 215, which has a depending arm 216 secured to its armature 217.

Pivotally mounted at 218 (Fig. 13) to the plate 210 is a bell crank 219, which has its lower end connected to the lower end of the arm 216 by a spring 220, and at its upper end is formed as a hook 221, which is adapted to be engaged by a pin 222, projecting from the sector arm 208.

The symbol sector 10 has the conventional type slugs, the lowermost, 223, of which carries the "reverse" symbol, while the remaining slugs are provided with various other types, the slugs having electromagnets associated therewith. When it is desired to position a slug in the printing position, the associated electromagnet 211 is energized, as will be described hereinafter with the electrical circuits, and its pin 213 is thereby projected through the plate 210. Simultaneously, the armature 217 of the master electromagnet 215 moves the arm 216 against the action of the spring 220, and this movement causes the hook 221 to urge the pin 222 forwardly, and hence the sector arm 208 is rocked, together with the shaft 207, until movement of the sector arm is arrested by reason of its contacting the projecting pin 213.

It will be obvious that the setting of the symbol sector 10 is dependent upon the selection of the electromagnets 211 except for the setting of the "Reverse" slug 223, in which case none of the magnets 211 is energized, thus permitting full movement of the sector arm 208 to occur through the intermediary of the master magnet 215.

Totalizers

Figure 4:
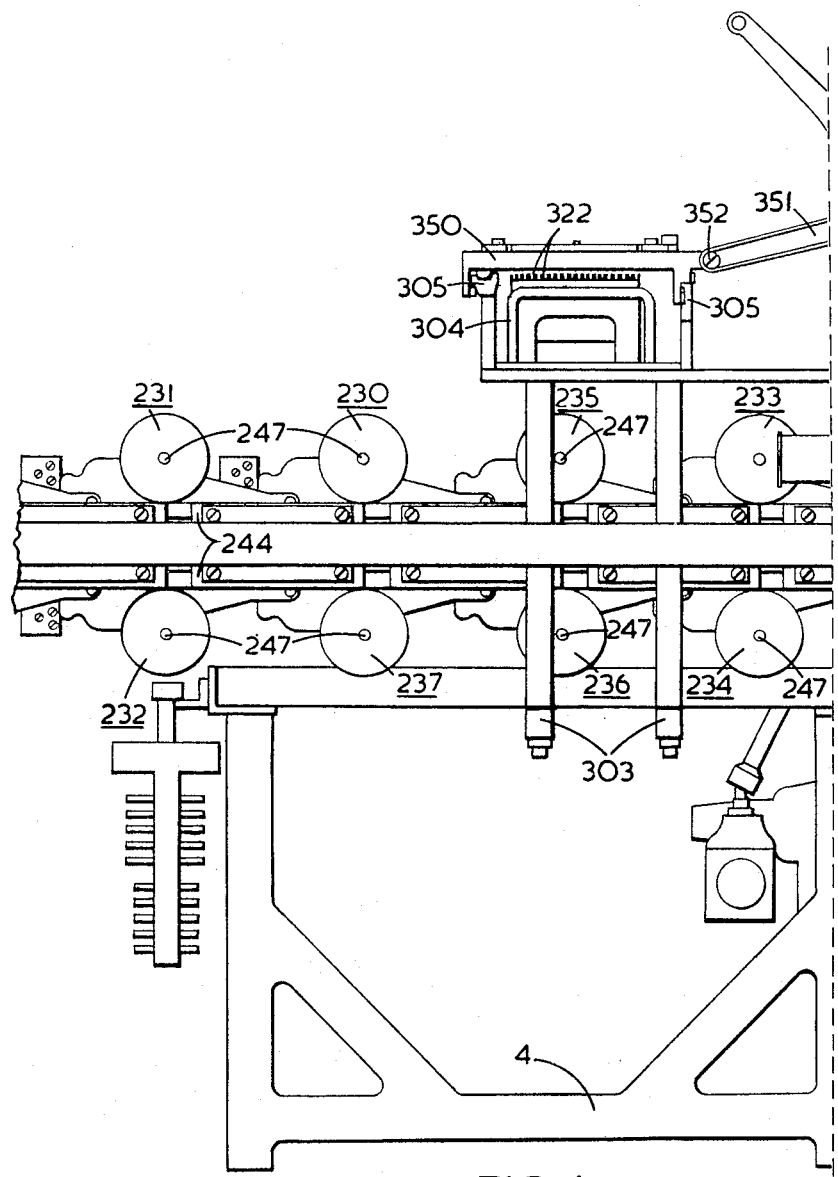

The machine has ten totalizers (not shown) of conventional type, the locations of which are indicated generally in Figs. 4 and 4a at 230—239, totalizers 230—232 and 237 being of the add-subtract kind, the former being crossfooters, from which a true overdraft or credit balance can be obtained in cooperation with totalizer 237 in a two-cycle overdraft operation, as will be described hereinafter.

Totalizers 233—236 are add only, but, if desired, they could also be employed as add-subtract totalizers, while totalizers 238 and 239 are add totalizers only.

The selected totalizer or totalizers are adapted to be operated indirectly by the main shaft 50, which is oscillated as described hereinbefore. The main shaft, as will be seen from Fig. 15, has a crank arm 240 secured thereto, provided with an adjustment slot 241, in which a pin 242 is located, said pin coupling a connecting rod 243 to the first-mentioned crank arm 240. The connecting rod 243 is secured to a plurality of toothed racks 244, which in turn are adapted to mesh with toothed discs 245, each forming part of a plurality of totalizer clutches.

Referring more particularly to Figs. 17–20, it will be seen that each totalizer clutch comprises a hollow casing 246, secured to a clutch shaft 247 by a screw 248 carried by a boss 249. The outer periphery of the casing carries a bracket 250, serving to locate a pair of leads 251 (Fig. 15) from relays, not shown.

Adjacent the boss 249 is a slot 252 (Fig. 20), through which an insulated block 253 projects, said block having terminals 254, to which the leads 251 are suitably connected, the block 253 being secured to one end of a coil 255 located within the casing and being prevented from endwise movement by a spring washer 256 (Figs. 18 and 19). The boss 249 extends into the casing 246 adjacent a second boss 257, formed on the inner face of the toothed disc 245, which is loosely journaled on the shaft 247 and which also carries a pair of dogs 258 (Figs. 18 and 20), which, when its associated relay and coil 255 are energized (as shown in Figs. 18 and 19), engage correspondingly-formed recesses 259, of which there are four, in the casing 246. Alternatively, if the coils 255 remain unenergized, the discs 245 will merely be reciprocated by their associated racks 244 without producing any clutching effect.

Mounted on the opposite end of each of the four rearmost clutch shafts 247 is a subtract clutch 260 (Figs. 2, 3a, 16a and 22), identical in construction and operation with the totalizer clutches, with the exception that their discs 261 are not toothed, and their casings carry only one pair of recesses 259 to accommodate the dogs 262, as opposed to the two pairs which the casings of the totalizer clutches carry.

The actuator mechanism for the amount keyboard 130 is substantially the same as that described in several prior United States Patents, such, for example, as United States Patent No. 2,189,851, issued February 13, 1940, to Paul H. Williams et al., wherein depression of any one of the amount keys 131 (Fig. 1) moves a square stud thereon into the path of a corresponding step on a horizontal reciprocating amount actuator 264 (Fig. 16a), a second stud on the key stem moving a control plate, so that its forward end releases a zero stop latch normally restraining the amount actuator against movement. Each actuator is pivotally connected to a reducer segment (not shown) loose on the leading frame shaft 54 journaled in the side frames 1 and 2.

Oscillation of the lever 49 (Fig. 6) in the manner expressed previously causes the roller 51, in cooperation with the camming slot 52 in the plate 53, to rock the shaft 54, carrying the leading frame first counter-clockwise and then back to normal position, the initial movement counter-clockwise of the frame carrying the segment and the actuator 264 rearwardly in unison until the step on the latter engages the stud of the depressed amount key, thereby positioning said actuator and its segment and hence, by suitable linkage, the amount type sector 9 in proportion to the value of the depressed amount key.

In adding operations, the wheels 263, only one of which is shown in Fig. 16a, of the selected totalizer or totalizers are engaged with the actuators 264 or their rack extensions after they have completed their rearward initial movement and remain engaged therewith during their forward return movement. This rotates the wheels of the selected totalizer forwardly in proportion to the amount set up on the keyboard.

When it is desired to add an amount into a totalizer or totalizers, a sensing field mechanism (to be described hereinafter) is adapted to select the relay associated with the said desired totalizer, whereupon the relay energizes the coil 255 over such portions of the timing cycle as are determined by the relevant cam 124 (Fig. 9) and spring set 125, which in turn engages the dogs 258, thus transmitting the reciprocating motion of the racks 244 to the casings 246 and hence to the shafts 247. Oscillation of the shaft 247 causes a frame 265, carrying the wheels 263 of the selected totalizer, to rock in a slotted cam plate 266 (Fig. 16), and this movement permits said toothed wheels to be engaged by their associated actuators 264.

Owing to the casings 246 of the totalizer clutches being fast with their respective shafts 247, the latter will not rock unless the discs are clutched, and, in the case of the subtract clutches, this condition is brought about by movement of any one of the add-subtract switches 144—146 (Fig. 5) to the subtract position or, alternatively, through the intermediary of the sensing field, and either of these two factors operates the relay for the solenoid controlling the required subtract clutch.

The recesses 259 (Fig. 20) of the totalizer clutches are arranged so that, at the commencement of the initial or rearward stroke of the rod 243 (Fig. 15), the clutches are engaged for total, sub-total, or subtract operations only, and after the conclusion of the rearward stroke, the clutches are engaged for add operations only. Conversely, at the commencement of the return or forward stroke of the connecting rod 243, the clutches will be disengaged for add and sub-total operations.

As the mechanism associated with each subtract clutch is substantially identical in all respects, it is considered necessary to describe only one such mechanism in detail.

When one of the upper subtract clutches 260 is energized, it rotates clockwise, as indicated by the arrows in Fig. 22, and, when one of the lower subtract clutches is energized, it will rotate in the opposite direction. Such movement of the clutches enables a bifurcated link 267, connected at one end to a pin 268 fast on the disc 261 of each clutch, to rock a bell crank 269, a stud 270 being provided on the latter which is accommodated within the bifurcated end of the lever 267.

The bell crank 269 is fast on one end of a shaft 271, so that, upon movement of the former, the shaft 271 will, through the intermediary of a bail (not shown but of the well-known type), automatically remove the add pawls out of engagement with the totalizer wheels and engage the subtract pawls in place thereof in known manner.

The lower end of the bell crank 269 has a square stud 272, which, on counter-clockwise movement of said bell crank, in the case of the upper subtract clutches, and clockwise movement, in the case of the lower subtract clutches, moves into the latch portion 273 of a lever 274 (Fig. 23), which is pivoted at 275 to the inside of the totalizer frame 276. It will be appreciated that Fig. 23 is a view of the levers 274 taken from the reverse side. The locking of the lever 274 insures that the subtract pawls will remain in their operative position throughout a subtract operation.

At the completion of a subtract operation, a rotary solenoid 277, of known type, located adjacent the right-hand side of the totalizer frame 276 (Figs. 21a and 22), is energized by a relay, as will be described hereinafter. The solenoid 277 is connected by any suitable means to a slide 278, which is provided with slots 279, through which the pivot pins 275 project, the solenoid being of the type adapted to convert its rotary movement to a longitudinal movement and transmit such movement to the slide 278 upon energization.

Projecting from the inside of the slide 278 are a pair of pins 280, only one of which is shown in Fig. 23, each of which, upon movement of the slide in the direction of the arrow, contacts the tail 281 of the latched lever 274 and thereby rocks the latter about the pin 275. This releases the stud 272 from the latch 273, and the former then moves into a detent portion 282 (Fig. 23) of the lever 274.

Unlatching of the stud 272 permits the bell crank 269 to be returned to its add position in known manner under the action of a spring 283 connected at one end to a stud 284 carried by the bell crank 269 and at the other to a pin 280, the slide being automatically returned to its original position by a spring 285 connected at one end to the slide and at the other to a stud 286 carried by the totalizer-supporting plate 287.

*Sensing field*

The sensing field, shown in detail in Figs. 25–27a, includes a base plate 300, detachably secured to a cross frame 301 by screws 302 (Fig. 26), the cross frames in turn being carried by uprights 303 (Figs. 3, 4, 21, and 22), which are secured to the stand 4 of the machine.

The base plate 300 has a pair of handles 304, by which it can be lifted from its position within the machine, and furthermore is arranged to lie between a pair of runners 305, supporting a selector carriage, to be described hereinafter, the runners being rigidly supported from the base 301. Secured to the upper surface of the base plate 300 are a pair of end mountings 306, each carrying a plurality of spring sets 307, connected by suitable leads 308 (Fig. 27a) to one half of a plurality of jacks of known type (Fig. 25a), the leads passing through apertures 310, formed in the base plate 300. As will be seen more clearly from Figs. 25a and 26, each portion 309 of the jacks is detachably connected to a second half 311, carried by the cross frame 301, and themselves connected to relays (not shown), the purpose of which will be described hereinafter.

Approximately midway between the end mountings 306 are a pair of central supports 312 and 313, which are interconnected at their ends by bridge members 314, which support spring sets 315, connected by suitable leads 316 (Fig. 27) to relays via the jacks 309 and 311.

Supported by each bridge member 314 is a comb 317, said combs being maintained in position by screws 318 securing an apertured transverse plate 319 thereto. The side edges of the plate 319 have upstanding flanges 320, serving as the mountings for a pair of spindles 321, having a plurality of contact members 322 loosely journaled thereon.

The contact members 322 are held in spaced-apart relationship by adjacent teeth 323 of the comb and have a depending portion 324, alternate ones of which carry a lug 325 (Fig. 25), on which is secured an insulated button 326, the depending portion passing through a slot 327 formed in the plate 319. Each of the buttons 326 is arranged, when its member 322 is inoperative, to maintain the lower half of each of the pairs of springsets 315 from engaging the uper half, the sets being suitably insulated from each other and held in spaced-apart relationship in the bridge members 314.

The remainder of the contact members 322 have their extreme ends provided with a lug 328 (Fig. 25), on which is secured an insulated button 329, which, when their members are inoperative, maintain the upper half of each of the pairs of springsets 307 from engaging the lower half, the contacts being insulated and held in the end mountings 306.

Each of the central supports 312, 313 is vertically bored and contains a plunger 330 projecting from its upper surface, the upper end of each of said plungers being accommodated within a recess (not shown) on the under surface of a transverse bar 331. A pin 332 in each end of the bar serves as the anchoring means for one end of a tension spring 333, the lower end of each spring being secured to an adjustable pin 334 carried by the base plate 300.

As will be seen from Figs. 25 and 27, the bar 331 is adapted to overlie a horizontally-extending lug 335, formed on the depending portion of each of the contact members 322. The lower spring of each set 315 and the upper spring of each set 307 are tensioned a predetermined amount to insure pivoting of the contact members 322 when the bar 331 is moved upwardly, and this latter movement is accomplished by means of a suitable electromagnet 336.

The armature 337 of the magnet 336 is limited in its amount of downward movement by a back-stop 338 and is provided with an adjustable bolt 339 (Fig. 25), which contacts the under side of a second transverse bar 340, which, in turn, is secured to the lower ends of the plungers 330. The bar 340 also carries an adjustable screw 341, having an insulated button 342, which is normally in engagement with a pair of closed contacts 343 associated with a resistance 344 secured to the under side of the base plate 300.

The provision of the resistance 344 insures that, when the armature 337 closes and the contacts 343 bridging the resistance are opened, the resistance will be placed in series with the coil of the magnet 336, thus preventing excessive current from flowing therethrough.

Two pairs of feet 345 (Figs. 25 and 27) are secured to the base plate 300 to enable the mechanism to be placed upon a bench for any adjustment which may be required. A condenser 346 (Fig. 25a) is secured to the under side of the base plate 300 and is wired so as to quench the spark at the contacts 343.

*Selector carriage*

The selector carriage 350, shown in detail in Figs. 28 and 28a, is adapted to travel in the runners 305 and is secured to the traveling carriage 6 by a pair of arms 351 (Figs. 2–4), connected at 352, so that corresponding movement of the selector carriage 350 is effected upon movement of the carriage 6. The selector carriage is recessed to receive a detachable selector plate 353, of substantially the same shape as the said carriage and maintained in position by a pair of bars 354, 355, the former of which is secured to the upper surface of the selector carriage 350 by screws 356 and arranged to partially project over one edge of the recess, while the remaining bar 355 projects over the opposite side of the recess.

The bar 355 is capable of being slid on the upper surface of the selector carriage 350 through the intermediary of a plurality of elongated slots 357, each of which has located therein a screw 358 secured to the selector carriage 350. A post 359, secured to the selector carriage 350, anchors one end of a tension spring 360, which is secured at its other end to a further post 361, carried by the bar 355. One end of the bar 355 is formed with a cammed surface 362 (Fig. 28a), which, when said bar is at its limit of movement in one direction, contacts a locking slide 363. The slide 363 is maintained in position on the selector carriage 350 by a pair of screws 364, each located in a slot 365.

The selector plate 353 is constituted by a rectangular frame 366 (Figs. 31–33), having mounted on one end thereof a substantially triangular plate 367, provided with a slot 368. Mounted on the other end of the frame 366 is a square plate 369, having a slot 370. A pin 371, secured to the plate 369, serves as the pivot point for an arm 372, provided with a plurality of location notches 373. The arm also has a finger portion 374 and a slot 375 adapted to embrace a shouldered screw 376, which prevents the plate 369 from lifting. A pin 377 (Fig. 28a), fast on the carriage 350, projects through the slot 370 and is adapted to be located in a selected notch 373. A spring 378 is also provided on the pin 371, which is adapted to contact a stud 379 on the arm 372 and thereby maintain said arm in its operative position.

The selector plate 353 can be adjusted to a plurality of positions by means of the location notches 373 and the pin 377, thus enabling a variety of set-ups to be embodied on the selector plate.

When the frame 366 is in position on the selector carriage 300, a pin 380 (Fig. 28) on the latter is adapted to project through the slot 368. The plate 369 has an upstanding flange 381, whereby, when the arm 372 is pivoted by means of the finger portion 374 to release the pin 377, the selector plate can be manually adjusted in relation to the carriage 350, the spring 378 automatically returning the arm 372 when the selected notch 373 is in position and pressure is removed from the finger portion 374.

A projecting flange 382 (Fig. 33) on each side of the frame 366 is toothed as at 383 (Figs. 28, 31, and 33) at a pitch corresponding to that of the tabulation of the main carriage 6.

Secured t othe upper surface of each side of the frame 366 are a pair of bars 384, 385, the former being riveted to the frame and the latter being movably mounted thereon by means of slots 386 having therein screws 387 secured to the carriage 350. When the operator slides the bar 385 in the direction of the arrow in Figs. 28 and 33, one end of each of a plurality of selector bars 388 (shown in detail in Figs. 29 and 30) can be slid under the bar 384, while the opposite end can then be dropped between the teeth 383, it being obvious that the selector bars 388 will be maintained in position by the bar 385 upon its return to normal position.

Each selector bar 388 is formed of a substantially U-shaped member, the side walls 389 of which are machined to provide a plurality of teeth 390, which correspond in number to the number of contact members 322, selected teeth 390 being removed, as indicated at 391 in Figs. 28a and 31, before the bars are placed in position in the frame.

From Fig. 28a it will be seen that the selector bars 388 are located over the contact members 322, so that, when the electromagnet 336 is energized, only those contact members in alinement with the gaps 391 in the teeth 390 will move upwardly a sufficient extent to close their associated contacts 307 and 315.

It will be seen from Figs. 25–27 that one of the contact members 322 is provided with a roller 392, which is mounted on a spindle 393, the outer end of the member being provided with a depending flange 394, which terminates in a lug 395, having an insulated button 396.

As will be seen more clearly from Figs. 25a and 27, the button 396 is adapted to abut a depending portion 397 of the lower spring of a pair of normally-open contacts 398, and, as shown in Fig. 25, the roller 392 is adapted to project above the level of the contact members 322, so that, if, during tabulating movement of the carriage, a tooth 390 contacts the roller, its associated member 322 will rock about its pivot point 321, thus canting the button 396 upwardly. Upward movement of the button 396 will cause the contacts 398 to be closed, thus completing a circuit to energize the electromagnet 336, which will operate in the manner described above. This will enable the contact members 322 of the sensing field to select the correct relay for operation.

Thus it will be seen that, as the carriage 6 travels to and fro during its tabulating movement, the selector carriage 350, due to its connection at 352 (Figs. 3, 4, and 28), will move therewith. When this occurs, any of the selector bars 388 having teeth corresponding in position to the contact member carrying the roller 392 will rock said member and thereby energize the electromagnet 336. When this occurs, it will, as stated above, permit those members in alinement with the selector bars to operate the relays, as described more fully in connection with the electrical operating circuits.

*Amount key and zero stop releasing mechanism*

Each actuator 264 has associated therewith a pivotally-mounted zero stop pawl (not shown), which, in adding and subtracting operations, is controlled in known manner, as disclosed in the United States Patent No. 2,189,851.

Upon depression of an amount key 131, the control plate (not shown, but of well-known construction) associated with each key bank is cammed toward the front of the machine to contact its zero stop, thereby rocking the latter counter-clockwise to disengage it from its actuator 264. The actuator is thus freed for movement as described earlier herein.

The "Release" key 133, shown in detail in Figs. 15 and 15a, is pivotally connected to a bar 400, slidably mounted on the left frame 2 by means of studs 401 (only one of which is shown) and slots 402. The bar 400 has a depending extension 403, provided with a pin 404, on which is pivoted a pawl 405, normally urged clockwise by a spring 406, the lower end of which is connected to the pawl at 407. The pawl 405 is limited in its clockwise movement by a tail 408, which engages an upward extension 409 of an armature 410 of an electromagnet 411.

The electromagnet 411 is energized through a suitable relay, described hereinafter, upon any total or sub-total operation, and, upon energization, the extension 409 moves downwardly out of the path of travel of the tail 408 of the pawl 405, which then moves clockwise by means of the spring 406.

Clockwise movement of the pawl 405 enables a hook 412 thereon to engage a roller (not shown) carried by a spindle 413 mounted between a disc 414 fast on the main reciprocating cam shaft 50 and the crank arm 240. Clockwise movement of the disc 414 thereby causes the bar 400 to move in the direction of the arrow, and this movement, through a suitable linkage (not shown), moves the control plate in the opposite direction, thereby disabling the zero stop pawl in a manner similar to the disabling by direct depression of an amount key.

Pivoted on a stud 415 in the bar 400 is a pawl 416, which is urged counter-clockwise by means of the tension spring 406, the upper end of which is connected at 417 to said pawl. The spring 406 normally maintains a flat surface of a hook 418 on the pawl in resilient engagement with a roller 419 carried by a pin 420 mounted between the disc 414 and the crank arm 240.

Clockwise initial movement of the reciprocating main cam shaft 50, and hence of the disc 414, disengages the roller 419 from the hook 418, whereupon the spring 406 urges the pawl 416 counter-clockwise into the path of said roller, whereby the latter will, on return movement of the disc 414, engage the hook 418 and move the pawl 416, and hence the bar 400, rearwardly. Rearward movement of the bar 400 will automatically release the depressed amount keys near the end of the adding and subtracting operations, as well as any amount keys accidentally or inadvertently depressed prior to a total- or sub-total-taking operation.

Before completion of the counter-clockwise movement of the disc 414, an upward projection 421 of the pawl 416 engages a stationary stud 422, carried by the left frame 2, which disengages the hook 418 of said pawl from the roller 419 and permits the return of the bar 400.

"Repeat" key mechanism

To prevent the above operation from occurring when it is desired to repeat the same entry a number of times, the "Repeat" key 140, when depressed, energizes an electro magnet 430 by means of a suitable relay, described hereinafter. As will be seen from Fig. 15a, when the electromagnet 430 is energized, an upward extension 431 of its armature 432 will move into the path of travel of an angle member 433 slidably mounted on the left frame 2 by means of a pin 434 and slot 435 connection. The rear end of the member 433 is pivotally connected at 436 to the pawl 416 and thus prevents counter-clockwise movement of the pawl. The hook thereby fails to engage the stud 419; consequently, at the end of the cycle, the bar 400 will not be moved, and hence the depressed amount keys will not be released.

Typewriter tabulation

The normally-open contacts 440 of the spring set 441, shown in Fig. 24, are adapted to be closed by a button 442, carried by the upper end of a lever 443, which is connected at its lower end (not shown) to the normal typewriter tabulating mechanism. Upon operation of either a typewriter key 444 or the space bar 445 (see Figs. 1, 2, and 5), the lever 443 is moved to close the contacts 440 and, through the intermediary of a relay to be described hereinafter, renders the sensing field inoperative until the motor bar 38 is operated again, whereupon the sensing field is again rendered operative.

Tabulation

The pair of normally-closed contacts 450 of the spring set shown in Fig. 24 are opened upon movement of the carriage release mechanism, the tabulating key, or the typewriter tabulating key, to release the carriage 6, and this enables the circuit to the sensing field to be broken, thus insuring that the contact members 322 will have dropped before the carriage commences to move.

Carriage synchronization

The synchronization of the selector bars 388 with the tabulating stops 460 slidably mounted on the usual carriage form bar 148 is checked electrically by circuits through spring sets 461 (Figs. 24 and 26a) and 398. The spring sets 398 are operated by a selector bar 388, as described earlier herein, through the intermediary of the roller 396, while the spring sets 461 are operated by a selected stop 460 (Fig. 5) contacting a lug 463 formed on one end of a lever 464 (Fig. 24), the latter being pivoted at 465 to the frame of the machine adjacent the accounting machine keyboard 130.

It will be seen that the opposite end of the lever 464 has an angle portion 466, which, when the stop contacts the lug 463 and the lever 464 is thereby pivoted, moves upwardly to strike a button 467 carried by the lower spring 468 of the pair of normally open contacts 461, thereby closing the latter and completing a circuit for a relay not shown but described hereinafter.

Ribbon shift

The ribbon (not shown) is shifted automatically when an electromagnet 480 (Fig. 21a) is energized through the intermediary of either the sensing field or a relay, as will be described and as will be seen from the drawing. The armature 481 of the electromagnet has a hooked extension 482, which embraces a spindle 483, indirectly coupled to the normal ribbon shift shaft (not shown). It will be apparent, therefore, that, when the electromagnet 480 is energized and the armature 481 attracted, as shown in Fig. 21, the movement of the spindle 483 will reciprocate the shaft, and thus the ribbon will be shifted in known manner. The return shift of the ribbon is accomplished mechanically, as is well known in the art.

Printer disabling

On the first cycle of a two-cycle overdraft operation, an electromagnet 490 (Fig. 21a) is actuated through a relay (not shown), which is itself energized by the overdraft mechanism to be described hereinafter. The armature 491 of the electromagnet has an extension 492, connected by a pin 493 to a saddle member 494, which carries a stud 495, serving as the pivot point for one end of a crank arm 496. The opposite end of the crank arm 496 is connected by a stud 497 to one end of the printer pitman 498. It will be apparent, therefore, that, when the armature 491 of the electromagnet 490 is attracted, corresponding movement of the crank arm 496 will disable the printer.

The circuit to the electromagnet 490 is broken on the second cycle of a two-cycle overdraft operation, and the crank arm 496 will move in the direction of the arrow, thereby permitting a spring 499, connected to the printer pitman 498, to restore the latter to normal position and permit the printer to be operated.

Secured to the outer face of the armature 491 is a spring set 500, having three contact blades, the center one 501 of which is adapted to contact either of the outer blades 502, 503. The contact blades 501—503 are located between a pair of buffers 504 and 505, carried by a strap 506 secured to the casing of the electromagnet 490, the arrangement permitting a button 507 on the blade 503 to contact the buffer 505 when the armature 491 is attracted, and thereby close the contacts of the blades 501 and 503. Conversely, when the armature 491 is released and the spring set 500 is moved therewith, thus breaking the contacts 401 and 404, a button 508 on the blade 502 will abut the buffer 504 and thus close the contacts of the blades 501 and 502. The blades 501—503, of course, perform functions as described in connection with the electrical circuits hereinafter.

Overdraft indicator

Figure 1:
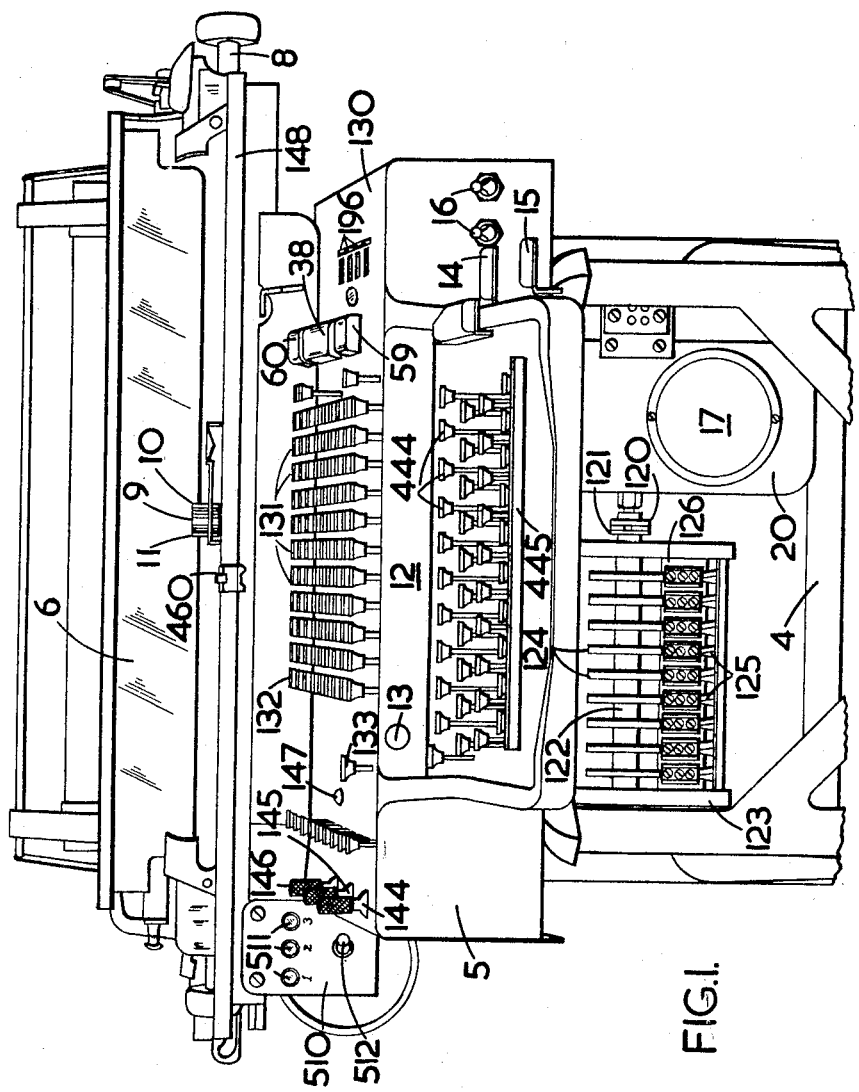
Figure 2:
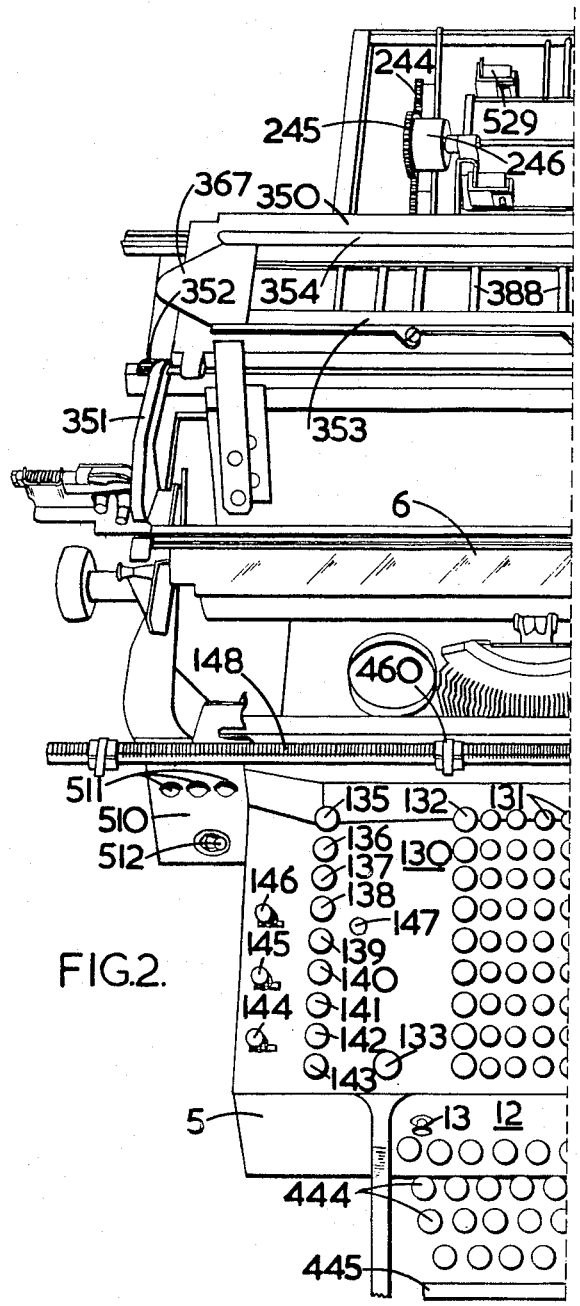

It will be seen from Figs. 1, 2, and 5 that an indicator panel 510 is provided on the left side of the machine and comprises three lamps 511, corresponding to the subtract totalizers 1, 2, and 3, and a double pole changeover switch 512, which, when moved to the left in its "locked" position, conditions the lamp supply circuits so that the lamps 511 will indicate to the operator that an overdraft exists in a particular totalizer, the machine then being caused to stop. It is then necessary to operate the motor bar 38 to start the machine on the first cycle of a two-cycle overdraft operation.

Conversely, when the switch 512 is moved to its right-hand or "automatic" position, the lamps 511 will not light, and the machine will function automatically.

Overdraft mechanism

The overdraft mechanism of the machine is of the well-known type but, as applied to this invention, is controlled electromagnetically, and, as will be seen from Figs. 16 and 16a, each mechanism comprises an overdraft shaft 520, which, when an overdraft exists in any particular totalizer, reciprocates in known manner; i. e., a lug 521 on the overdraft actuator 522 contacts an operating arm 523 fast on the shaft 520 and thereby rocks the latter.

When this occurs, an insulated roller 524, mounted on a lug 525, closes a pair of normally-open spring sets or contacts 526 secured to the frame of the machine, thereby causing these contacts to close and function as described hereinafter, the lug 525 being carried by a collar 527 detachably secured to the shaft 520 by a screw 528.

Should the amount in the totalizer revert to a positive quantity, then the shaft 520 concerned is restored in known manner.

However, should the totalizer be read on a sub-total-taking operation while in the overdrawn condition, then the shaft 520 will not be restored to normal, as it is still required to register the overdraft condition at the end of the operation.

However, should the totalizer be cleared on a total-taking operation, as will be described in connection with the controlling circuits, then the shaft 520 will be restored to normal at the end of the first machine cycle. This is accomplished by means of an electromagnet 529, whose armature 530 cooperates with a lug 531 mounted on each shaft 520 and thereby restores said shaft.

CIRCUIT DESCRIPTION

The circuit arrangements over which the machine is controlled are illustrated in Figs. 34, 34a, and 34b, and these figures should be arranged, respectively, to the right of one another in this order. The circuits are shown in the well-known detached contact style of depicting circuit layouts, in which the coils or electromagnets of the relays, and of the other electromagnetically-operated devices, which control contacts, are not shown in immediate association with the contacts which they control, but all are disposed most conveniently in the circuits concerned, so that the latter, as far as practically possible, are depicted as straight circuits between the opposite poles of a suitable direct current source of supply. These poles are indicated by the usual positive and negative signs and in the ensuing description will be referred to briefly as positive and negative. The main supply includes on and off switches 16 (Figs. 1 and 2).

In contradistinction to the prior description of the mechanical arrangements, in which the various components are designated by numerals, letters will be used in the present description for the main part, but, where correspondence exists, it will be noted accordingly.

The relays are of a well-known kind, each including an operating coil or electromagnet having cooperating therewith a pivoted armature which operates on a cantilever spring set or sets, each set including a moving spring, depicted by a short diagonal line, terminating in a solid circle representing the wiring connection. This moving spring may have associated therewith either or both of two types of fixed contacts, one being a break contact, which normally makes contact therewith but is broken when the relay operates, whereas the other is a make contact, from which the moving contact is normally separated but makes contact when the relay is operated. When a moving contact has both a break contact and a make contact associated therewith, it is most common that the former breaks before the latter makes, these being known as change-over contacts. In another type of contact set, however, all three contacts make before the break occurs, these being known as make-before-break contacts; e. g., sd1, Fig. 34b.

Each relay is designated by a major case letter surmounting a number, the latter indicating the number of sets of contacts associated with the relay, which are disposed conveniently about the drawing in the relevant individual circuits and are designated by corresponding minor case letters with an individual numerical suffix for discrimination.

The individual functions of the relays will best be understood from the detailed operation thereof given subsequently in this description.

In Fig. 34 is illustrated a rotary step-by-step switch CMS, commonly known as a uniselector, including three arcuate banks of contacts cms1, cms2, and cms3, having in each bank twenty-five contacts, over which wipers are advanced step by step on the retractive strokes of a pawl operated by an armature controlled by an electromagnet CMSDM. The armature also operates self-interrupter contacts cmsdm connected serially in the circuit of the electromagnet, causing them to open near the end of the operative stroke of the armature, to break the circuit of the electromagnet, so that the armature retracts to reclose the circuit of the electromagnet, which operation will continue as long as a positive potential is applied over the bank cms1. The wipers of banks cms2 and cms3 are of the kind which break contact with a preceding contact before making with the succeeding contact, but the wiper cms1, which is a homing wiper, is of the trailing kind, in which it makes contact with a succeeding contact before breaking with the preceding contact.

The manually-operated contact-making keys are of two main kinds; that is, locking keys, which remain in the operated position until subsequently released, and non-locking keys, which automatically restore after operation when finger pressure is removed. The former keys are, again, of two types, one type being the well-known kind which are both operated and released manually, whereas the other type, although manually operated, are locked in operated position until subsequently restored consequent upon the operation of an electromagnet. The manually-operated and -released keys are typified by ASK (Fig. 34), which are double-throw keys, operable either to position "A" or to position "S," and it will be seen that the moving contact has its extremity angled outwardly at about 45 degrees. The manually-operated and electromagnetically-released type of key, such as NULK (Fig. 34), is represented by the end of the moving spring being shaped outwardly in rectangular form.

The non-locking type of key is shown in conventional form with the moving spring straight, such as KRK (Fig. 34).

The operational functions of the various keys will be explained in the detailed description which follows hereinafter.

The various electromagnets which bring about mechanical operations on energization are shown as open rectangles.

Figure 3:
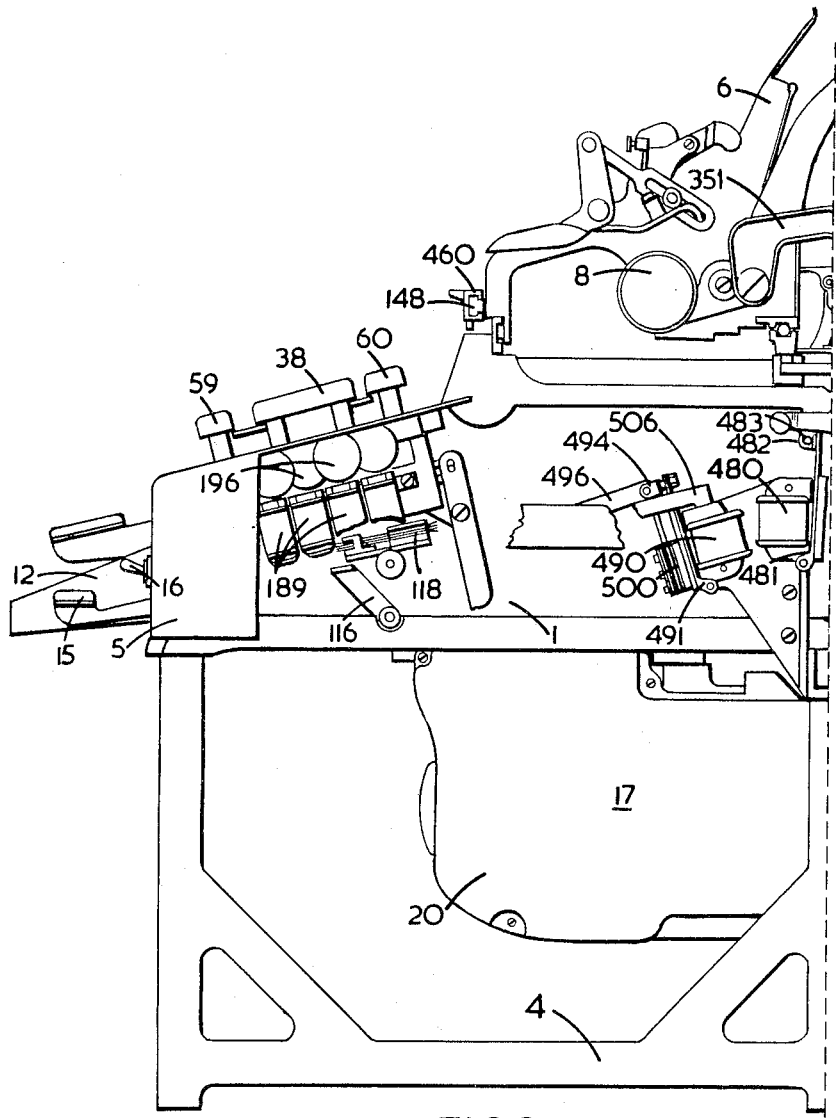
Figure 3A:
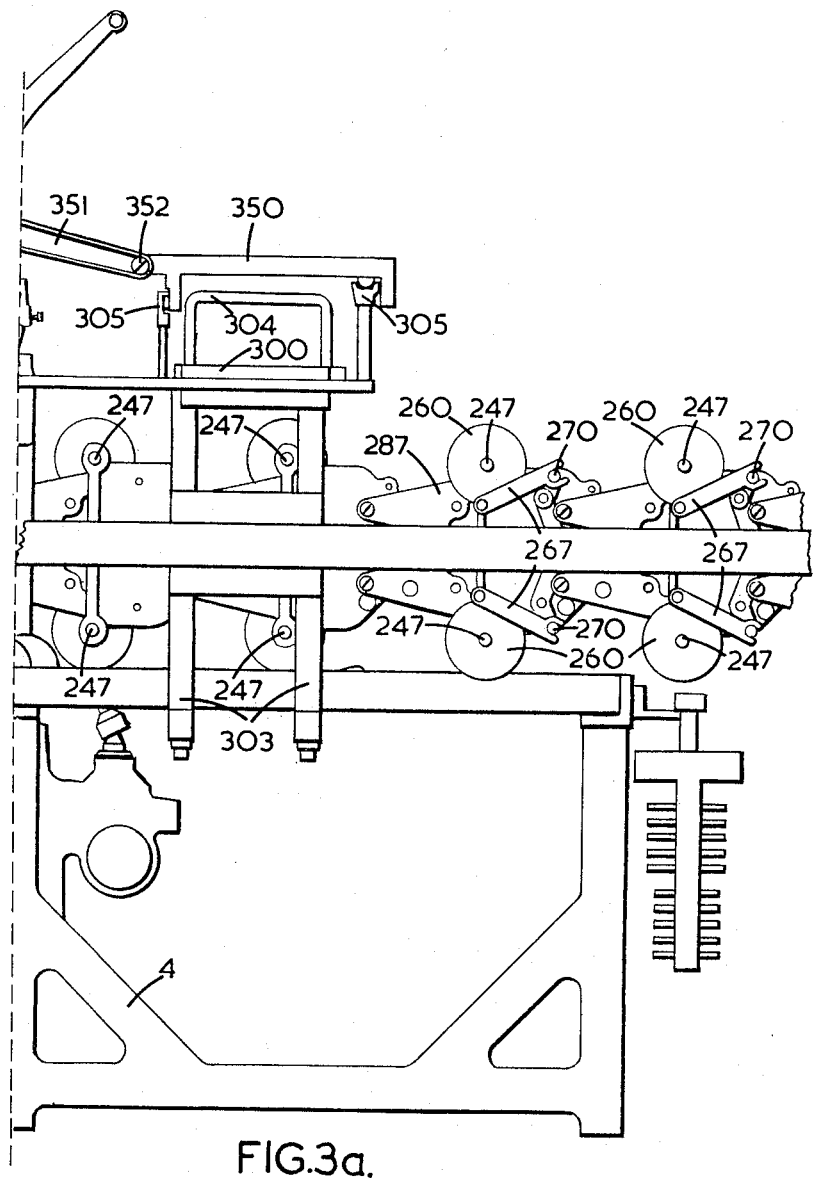
Figure 4A:
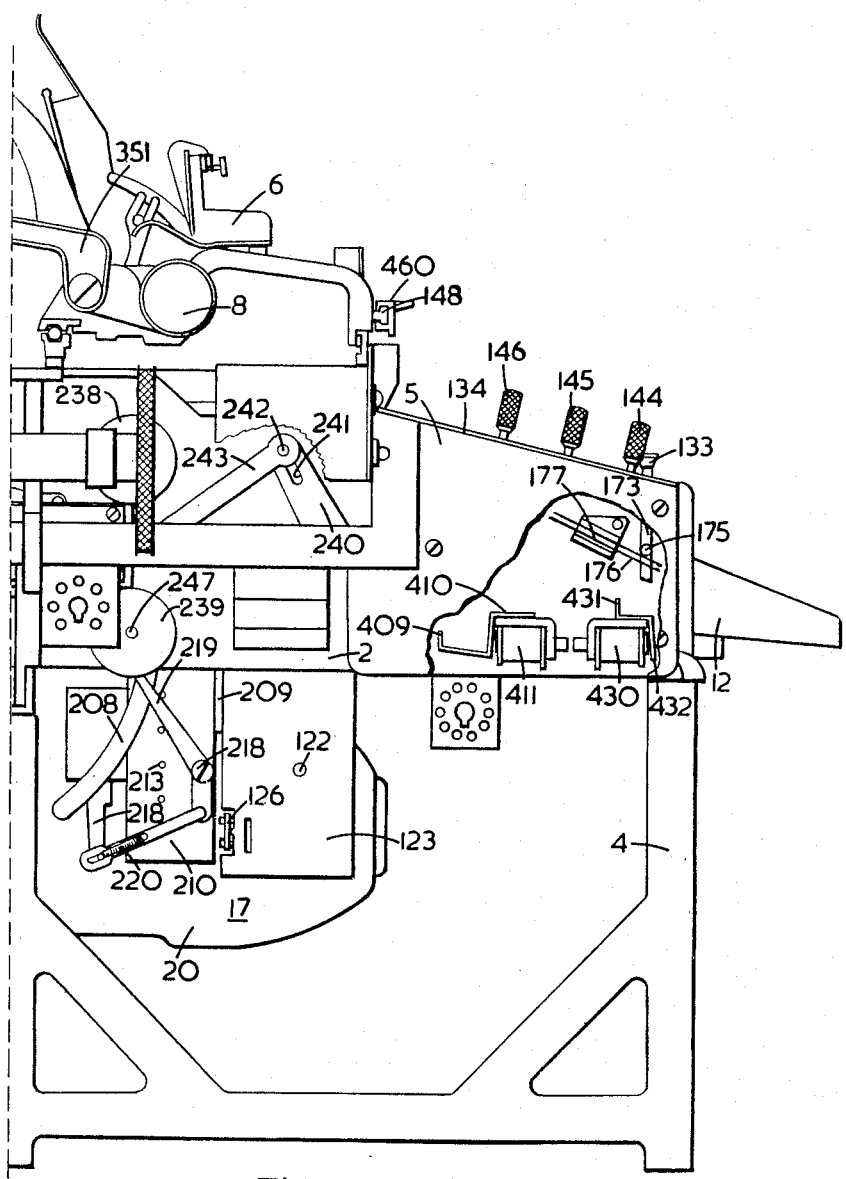
Figure 5A:
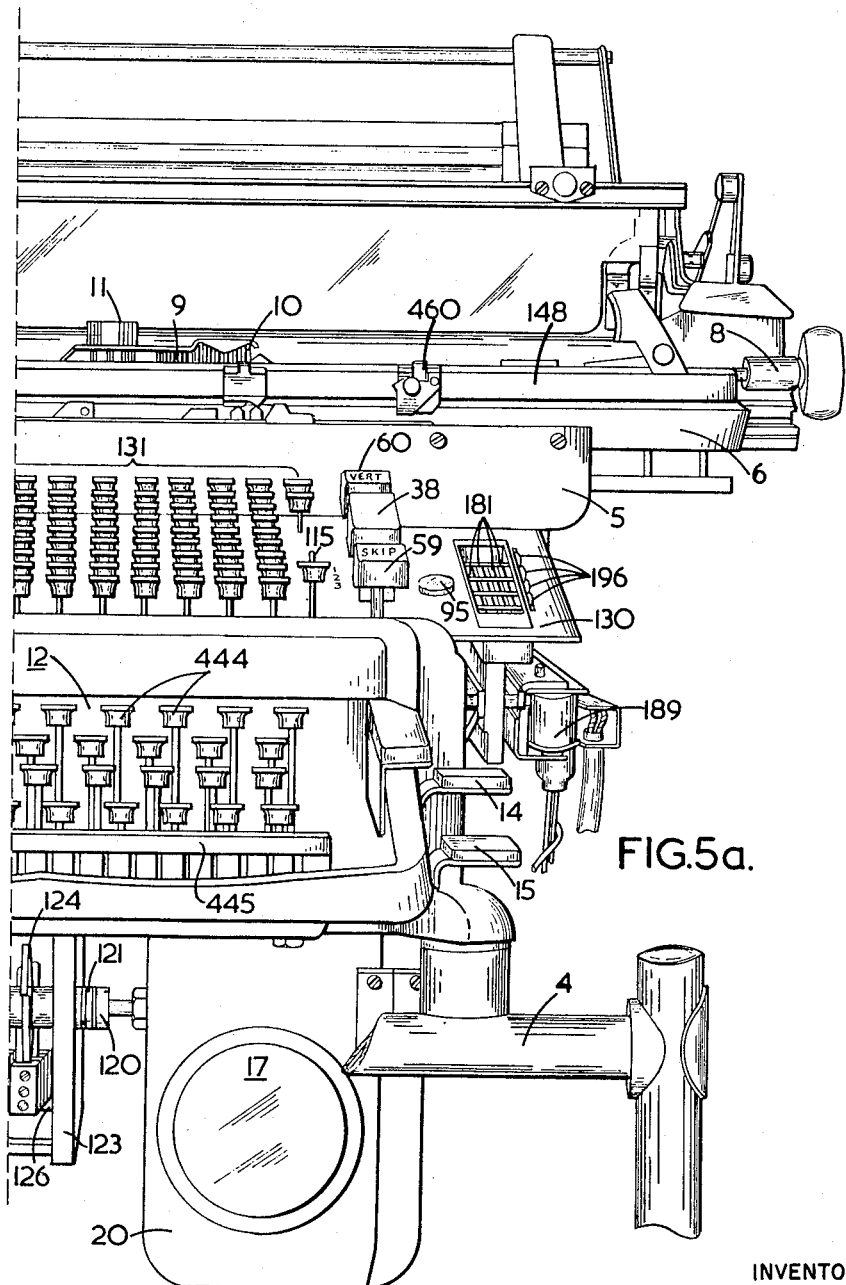

In regard to these electromagnets, the correspondence with the electromagnets referred to in the prior mechanical description is as follows, reading Figs. 34 to 34b from left to right:

| Figs. 34, 34a, and 34b | Corresponding item in previous figures |
| --- | --- |
| Key release electromagnet KRM | 166, Fig. 11. |
| Overdraft electromagnets CB1, CB2, and CB3 | 529, Figs. 2 and 16a. |
| Subtract release magnet SRM | 277, Figs. 21a and 22. |
| Sensing field magnet SFM | 336, Figs. 25a and 27. |
| Zero stop magnet ZSM | 411, Figs. 4a and 15a. |
| Repeat magnet RTM | 430, Figs. 4a and 15a. |
| Totalizer clutch electromagnets 1M to 10M, and add and subtract magnets 1MS, 2MS, and 3MS. | 245, 260, Figs. 2, 15–17 and 22. |
| Motor clutch magnet MCM | 80, Fig. 8. |
| Red-shift magnet RSM | 480, Figs. 3 and 21a. |
| Symbol-print magnets SM1, SM2, SM3, SM4, and SM5, and symbol select magnet SSM. | 211 and 215, respectively, Figs. 13 and 14. |
| Printer disabling magnet PDM | 490, Figs. 3 and 21a. |
| Item counter electromagnets IC1, IC2, IC3, and IC4. | 189, Figs. 3 and 5a. |

Further make or break contacts included in the circuit arrangements either directly or indirectly as a result of the energization of an electromagnet, or resulting from a mechanical movement, are shown as cooperating open triangles and rectangles; that is, contacts generally designated CS are cam-operated contacts operated by the cam assembly (Figs. 1, 5, and 9) as follows:

| Contacts | Angles of closure or opening |
| --- | --- |
| CS1, Fig. 34a | close at 20°–100° and 160°–240°. |
| CS2, Fig. 34a | close at 100°–180° and 240°–320°. |
| CS3, Fig. 34a | close at 20°–100° and 240°–320°. |
| CS4, Fig. 34a | close at 90°–100° and 160°–240°. |
| CS5, Fig. 34a | close at 20°–100°. |
| CS6, Fig. 34b | open at 51°–349°. |
| CS7, Fig. 34 | close at 296°–356°. |
| CS8, Fig. 34b | open at 323°–356°.[1] |
| CS9, Fig. 34 | Do.[1] |
| CS10, Fig. 34a | open at 179°–341°. |

[1] These are duplicated for simplicity of layout.

The timing of these contacts is shown clearly in the timing diagram, Fig. 35.

In regard to other contacts, contacts TAB (Fig. 34a) corresponding to 450 (Fig. 24) are closed only as and when the traveling carriage is located in a tabular position, so that the main positive potential for the operation of the various components is disconnected while the carriage is moving.

These contacts TAB are connected in common to all of the cam contacts CS, and, in order to simplify the drawing, their positions in the connections to contacts CS6, CS7, CS8, CS9, and CS10 are indicated merely by a cross. As the machine cannot operate unless these contacts are closed, it will be assumed in the ensuing description that the operation is regular, and the contacts will not again be referred to, per se, unless specifically required by the description.

The contacts TWT (Fig. 34a) corresponding to 440 (Fig. 24) are closed each time the carriage is tabulated from the typewriter keys of the machine.

The normally-open contacts OD1, OD3, and OD4 (Fig. 34) corresponding to 526 (Fig. 16) are the contacts operated from the overdraft shafts of totalizers Nos. 1, 3, and 4 and are adapted to be closed when an overdraft is registered in the related totalizer.

The contacts of the sensing field 300 (Figs. 25, 26, and 27) are shown in two horizontal rows approximately midway of the drawings and include a contact for each automatic function of the machine, the contacts being generally designated SF and numbered 1–19 in the upper row and 20–36 in the lower row.

These sensing field contacts are related to the machine functions as follows:

In the upper row, odd-numbered contacts 1 to 17 and 18 control adding operations for totalizers Nos. 1 to 10.

Even-numbered contacts 2 to 16 control subtract operations for totalizers Nos. 1 to 8. As before described, two of the totalizers, Nos. 9 and 10, are adding only and not provided with the subtract feature.

Contacts SF19 control automatic sub-total-taking feature.

In the lower row, contacts SF20–29 control total-taking operations for totalizers Nos. 1 to 10; contacts SF30 control non-print operations; contacts SF31 control automatic release of the machine; contacts SF32 enable the control of totalizers Nos. 1, 3, and 4 from the keys ASK1, ASK2, and ASK3; contacts SF33 control the printing of the negative symbol; contacts SF34 control printing of the total symbol; and contacts SF36 control ribbon shift from black to red.

As before mentioned, these sensing field contacts, with the exception of contacts SF35, are adapted to be operated by contact members 322 (Figs. 25–28), which are lifted at an appropriate instant in the machine cycle to feel the absence or presence of the teeth 390 (Figs. 29 and 30) in the selector bars 388 (Figs. 29 and 30) supported in the selector frame 366, those members whose elevation is not obstructed by the presence of a tooth bringing about the closure of the associated contacts.

In contrast, the member 322 carrying the roller 392 (Figs. 25 to 28) associated with the contacts SF35 feels for the presence of, and is depressed by, a tooth in the selector bar so as to close the contacts. These contacts are for carriage synchronization and operate serially and in conjunction with contacts FBC (corresponding to 467, Fig. 24) operated by stops on a form bar 148 attached to the front of the carriage 6 (see Figs. 1–5 and 10), so as to insure that not only is the carriage correctly located in a columnar position, but also the selector bar 388 is correctly registering with the sensing field.

The double-pole change-over switch CBS (Fig. 34A) corresponding to 512 (Figs. 1, 2, and 5) in the upper position conditions the machine for automatic overdraft operation under the control of the selector bars on the carriage, whereas in the lower position it causes the machine to stop when an overdraft is registered.

In order to assist in the full understanding of the ensuing detailed circuit description, it will be convenient now to refer to the timing of the mechanical functions of the machine as indicated by the timing curves of Fig. 35.

During an operating cycle of the machine, its differential actuators having the racks 264 (Fig. 16a) as integral parts thereof are caused to execute an initial or rearward excursion to an extent determined either by keys 131 which have been depressed in the associated key banks of the calculating machine keyboard 130 (Figs. 1, 2, 5, and 10) in add and subtract operations, or by the totalizers 230—239 in total- and sub-total-taking operations, this rearward excursion being followed by a rest period, after which the actuators return forwardly to normal. The actuators are resiliently coupled to and operated by a leading frame, in known manner, which, during an operating cycle of the machine, makes a movement timed according to curve LF; that is, it moves rearwardly through 80 degrees to 140 degrees, rests through 140 degrees to 228 degrees, and returns through 228 degrees to 276 degrees. Thus, the actuators will be moved rearwardly to different extents through the angle 80 degrees to 140 degrees of the machine cycle, and returned from the set positions to normal through 228 degrees to 276 degrees.

In sub-total operations, the respective totalizer is engaged with the racks 264 of the actuators prior to the rearward excursion of the latter, which are then set to an extent determined by the amount of standing in the totalizer and remain in such engagement until the actuators are eventually returned to normal, whereby the amoun is re-entered into the totalizer. The timing of this operation is indicated by curve STC, in which it is shown that the totalizer-engaging movement commences at 55 degrees, initial engagement occurs about 66 degrees, and full engagement occurs at 77 degrees. This is followed by engagement through angle 77 degrees to 283 degrees, where the disengaging movement commences followed by disengagement at 302 degrees, and complete restoration at 313 degrees.

It will be noted that full engagement of the totalizers 230—239 with the actuators takes place at about 77 degrees—that is, 3 degrees before the leading frame—and therefore the actuators commence the rearward excursion at 80 degrees, and also that the disengaging movement commences at 283 degrees; that is, 7 degrees after the leading frame and the racks 264 have reached normal at 276 degrees.

Total-taking operations are similar to sub-total-taking operations with the exception that the totalizer is disengaged from the actuators prior to the restoration of the latter, so that the amount taken from the totalizer is not re-entered; that is, as indicated in curve TC, the disengaging movement takes place through 195 degrees to 233 degrees, actual disengagement taking place at 226 degrees prior to the return movement of the actuators at 228 degrees.

The timing for subtract operations is similar to that for total-taking operations, as indicated by curve SC, but in this case the machine is conditioned for subtraction, so that the totalizers, if necessary, are not stopped at zero, as in total-taking, but allowed to overrun the zero position to register the complement of the minus quantity or overdraft.

In adding operations, the totalizer is engaged with the actuators only during the return movement of the latter, and it will be seen from curve AC that the engaging movement takes place through 136 degrees to 180 degrees, initially meshing at 148 degrees, whereas the disengaging movement occurs through 283 degrees to 313 degrees, actual disengagement taking place at 302 degrees.

The elements of the printer group 9—11 of the machine (Figs. 1, 2, and 5) are controlled in their settings from the actuators and are fired to effect printing during the resting period of the actuators at about 167 degrees.

A detailed description of the circuit operations will now be given, the various machine functions being described under separate headings. In the description, and in relation to each function, it will be assumed that the machine is prepared to carry out that function.

Carriage synchronization

When the carriage is tabulated correctly to a columnar position, so that the lug on the selected stop 460 (Fig. 5), carried by the front form bar 148 on the carriage 6, operates contacts FBS (Fig. 34A), and the selector bar 388 (Figs. 25–28) is correctly located, so that a tooth 390 thereon depresses contact member 322 to close contacts SF35 (Fig. 34A), the following circuit is closed: positive over cam contacts CS10, SF35, FBC, relay FBS to negative, and relay FBS operates with the consequential ensuing contact operation:

*fbs*1 establish the following circuit, positive over contacts *cm*4, *tw*1, *fbs*1, *sfm*, sensing field magnet SFM to negative. The magnet SFM energizes and, near the end of the stroke of its armature, opens the associated contacts *sfm*, thereby serially to insert the normally short-circuited resistance *sfr* into its circuit, thereby reducing current consumption, it being well known that the current necessary to hold an electromagnet energized is considerably less than that required to bring about its energization against the mechanical load imposed thereon.

*fbs*2, Fig. 34B. The circuit for the non-synchronized lamp NSL is disconnected at these contacts, and a common operating positive is applied over cam contacts CS8, contacts *rc*3, *fbs*2, *scr*2, to the lower row of sensing field contacts, and also over contacts *nul*3 to the upper row of sensing field contacts. It will be seen that, during the time the carriage 6 is not located in a synchronized position and, therefore, relay FBS is not operated, such condition will be indicated by the illumination of lamp NSL over the circuit CS8, *rc*3, and *fbs*2.

*fbs*3. These contacts prepare a point in the circuits for relays MS and MSR controlling the motor clutch.

Relay FBS will remain operated until contacts CS10 open at 178 degrees in a machine cycle, or until the carriage is moved from a synchronized position. This will be referred to subsequently.

Typewriter tabulation

On the tabulation of the carriage 6 consequent upon the depression of a key 444 of the typewriter 12 (Figs. 1, 2, 5, and 10), the contacts TWT (Fig. 34A) are closed to complete the circuit for relay TW over contacts *ms*4, and relay TW operates to close a holding circuit for itself over contacts *tw*1 and *cm*4, contacts *tw*1 also opening a point in the circuit for the sensing field magnet SFM. At contacts *tw*2, a point is opened in the circuit for automatic repeat relay AR to insure that this relay cannot operate. Relay TW remains locked up until such time as relay MS or CM is operated, as will be described.

Machine release

The machine can be released in either of three ways— that is, manual release by the motor bar 38 (Fig. 1); automatic release under control of the carriage 6; or repeated cycling under control of repeat key RTK (Fig. 34A) corresponding to 140 (Fig. 10).

In regard to manual release, the motor bar 38, when depressed, closes contacts MSK (Fig. 34B). In the assumption that relay FBS has been operated, as described in the previous section, a circuit is thereupon closed from positive over contacts *fbs*3, MAK, relays MS and MSR in parallel to negative, and both relays operate with the following contact functions:

*ms*1 close a locking circuit for relays MS and MSR from positive over contacts CS8 and *rc*3.

*ms*2 close the circuit for the motor clutch magnet MCM, from positive over contacts CS6, whereby the magnet is energized to trip the motor clutch mechanism (Fig. 8) to close the circuit for the motor 17, if of the start-stop kind, and also engage the driving and driven sides of the clutch to connect the motor drive to the main driving shaft 50 of the machine, as previously described.

*ms*3 concerns the item count operation and will be referred to under this heading.

*ms*4 opens a point in the circuit for relay TW, so that this relay cannot operate while relay MS is operated, or, alternatively, releases the relay, if previously operated by typewriter tabulation, as referred to in the preceding section, in which case contacts *tw*1 also restore to close the circuit for the sensing field magnet SFM if relay FBS is also operated.

*msr*1 (Fig. 34A). Tabulation of the carriage 6 commences at about 266 degrees in the machine cycle, and therefore the contacts TAB will open at this point; that is, before several of the functions, relaying on the positive applied over these contacts, have been completed, as will be seen from the timing diagram (Fig. 35). Therefore, to insure the operation of the circuit elements requiring to remain operated beyond 266 degrees, the contacts *msr*1 close in parallel with contacts TAB, thereby to maintain the application of the positive until 327 degrees in the machine cycle, which will be referred to later.

*msr*2 (Fig. 34B) close in parallel with contacts *rc*3, the latter functioning only when relay RC is operated in reverse operations where it is necessary to delay the application of the positive, derived over contacts CS8, to various relay commons until the machine is actually cycled, as will be fully described subsequently.

*msr*3 prepare for the operation of red shift magnet RSM to shift the ribbon to red on subtract operations.

Relays MS and MSR remain locked until 327 degrees in the machine cycle is reached, when cam contacts CS8 open to disconnect the locking circuit.

Where automatic machine release is required in any particular tabular position of the carriage, the tooth 390 of the selector bar 388 (Figs. 29 and 30) corresponding to sensing field contacts SF31 is removed, so that, when the sensing field magnet SFM is energized, consequent on the operation of relay FBS, as already described, and the contact members 322 are freed, the member 322 associated with contacts SF31 is allowed to enter the space 391, left by the removal of the tooth 390, to close the contacts. The following circuit is thereupon closed: positive over contacts CS3, *rc*3, *fbs*2, *scr*2, SF31, *nar*1, *krr*2, *sc*4, *cb*14, *cb*34, *cb*44, *tw*2, relay AR to negative, and relay AR operates, and, at contacts *ar*1, closes the circuits for relays MS and MSR, with the results previously described.

It has been arranged that automatic release is disabled if the typewriter 12 has been operated prior to the carriage 6 reaching the tabular position in which automatic release would normally occur. As previously mentioned, when relay TW is operated consequent upon the typewriter tabulating contacts being closed on typewriter tabulation, contacts *tw*2 open a point in the circuit for relay AR, so that the circuit for the latter relay cannot be closed. Further, relay TW locks over its contacts *tw*1 and remains so locked until relay MS operates to break the locking circuit at contacts *ms*4, whereby relay TW is released to permit the normal release function to occur. Therefore, it will be seen, automatic release is prevented following a typewriter tabulation, and release can be effected thereafter only by the depression of the motor bar to cause closure of contacts MSK.

It may be required to disable the automatic machine release function, in which event "Non-Auto" key NAK (Fig. 34A), corresponding to 138 (Figs. 2 and 10), must be operated before the carriage reaches the columnar position where otherwise automatic release would take place. The key, on operation, closes an obvious circuit for relay NAR, which operates its contacts as follows:

*nar*1 open in the circuit for relay AR from the sensing field contacts SF31, so that the relay cannot be operated over these contacts.

*nar*2 (Fig. 34) open in the circuit for key release magnet KRM, so that the electromagnetically-released keys will not release at the end of the machine cycle, and will remain operated unless released by the operation of key KRK to operate magnet KRM.

Adding operation

As before mentioned, the machine as illustrated is provided with ten totalizers 230–239, all of which are capable of adding, and in respect of each totalizer there is provided an adding relay A, the designations of these relays in the circuit drawing having numerical suffixes corresponding to the number of the totalizer with which they are individually associated.

As far as relays A1 to A4 are concerned, these are connected individually, and respectively, to sensing field contacts SF1, SF3, SF5, and SF7, over the contacts of various other relays for reasons referred to later in this description, whereas relays A5 to A10 are connected directly and individually to the remaining odd-numbered contacts of the upper row of the sensing field contacts.

As the adding operations are exactly similar in respect of all totalizers, it will, therefore, be necessary to describe the operations in respect of only one totalizer, and totalizer No. 1 will be selected for this purpose.

In order to select totalizer No. 1 for taking an entry, the tooth 390 of the selector bar 388 (Figs. 29 and 30), corresponding to that totalizer, will be removed to allow the appropriate contact member 322 (Figs. 25 to 28) to enter the space 391, when the magnet SFM is energized, thereby to close contacts SF1.

Therefore, when relay FBS operates, on the synchronization of the carriage 6, the following circuit is closed: positive, over contacts SC8, *rc*3, *fbs*2, *nul*3, contacts SF1, *kc*11, *ra*1, relay A1 to negative, and relay A1 operates with the following contact functions: *a*11 locks relay A1 over contacts *kc*13, *nul*2, *rc*3, and CS8; *a*12 (Fig. 34A) prepares the circuit for totalizer clutch magnet 1M from over cam contacts CS1; *a*13 (Fig. 34B) operates in the item counter circuit, as will be referred to later.

The circuit remains in this condition until the machine-operating cycle is commenced by the depression of the motor bar 38, as previously described.

At about 100 degrees in the machine cycle (see curve CS1, Fig. 35), contacts CS1 close to complete the circuit for clutch magnet 1M. As previously described, the driven member 245 of the clutch (Fig. 20) is driven in one direction during this portion of the machine operation and carries dogs 258, which are normally so positioned that they are opposite the unbroken periphery of the clutch casings 246, and, when the electromagnet is energized, the dogs 258 are magnetically attracted onto, and slide over, the said periphery through a predetermined angle before they engage with the recesses 259 in the periphery of the casing 246. This delay in engagement is to allow the flux to build up to maximum to insure complete engagement of the dogs 258, and takes place over about 100 to 136 degrees of the machine cycle. On the engagement of the clutch, the totalizer-engaging cam (not shown) commences its movement, bringing about the initial engagement of the totalizer pinions with the actuators at about 148 degrees—that is, after the leading frame has completed its rearward movement at 140 degrees—and full engagement at 180 degrees during the resting period of the leading frame and the actuators.

At about 167 degrees, the printing of the amount set up on the keyboard and entered into the machine is effected in known manner.

Contacts CS1 open at 180 degrees, and the clutch is disengaged, but the totalizer is mechanically held in engagement with the actuators during this period up to 283 degrees.

Throughout the angle 228 to 276 degrees, the leading frame and the actuators are restored, the latter additively entering the appropriate amount into the totalizer.

From 240 to 320 degrees, the contacts CS1 are again closed to complete the circuit for magnet 1M to effect the re-engagement of the clutch, the driven member 515 of which is now being driven reversely to the previous movement. The initial energization of the electromagnet and engagement of the clutch take place over 240 to 283 degrees, so that the disengaging movement of the totalizer is not commenced until the leading frame and the actuators reach normal position at 276 degrees, the initial disengaging movement taking place at 302 degrees and final restoration at 313 degrees.

The magnet 1M is de-energized at 320 degrees when contacts CS1 open, and at 327 degrees contacts CS8 open to remove holding potential from the relay A1, so that this relay releases.

From 178 to 341 degrees, contacts CS10 open to release relay FBS, and tabulation occurs at about 266 degrees, so that the relay circuit will, in any case, remain released until the next tabular position is reached, but this is immaterial at this time, as the further functioning of the machine during the remainder of the cycle is independent of this relay. The circuit of lamp NSL will be temporarily closed between the release of relay FBS at 178 degrees and opening of contacts CS8 at 327 degrees, but the period is so short that the momentary illumination is not apparent.

Over 296 to 356 degrees of the machine cycle contacts CS7 (Figure 34) close to complete the obvious circuits for relay KRR, which operates, and also subtract release magnet SRM, the positive over the contacts also passing over contacts *cm*3, *rk*3, *nar*2, key release magnet KRM, which energizes to release any of the electromagnetically-operated keys that may have been depressed. It may also be noted at this point that the magnet KRM may also be energized over an obvious circuit by the operation of the key KRK.

The energization of the magnet SRM is ineffective in adding operations, but relay KRR, on operation, has the following effects:

*krr*1 (Fig. 34A) close a point in the circuit for relay SC, but this is ineffectual in adding operations and only concerns credit balance operations, as will be described later;

*krr*2 open a point in the circuit for relay AR to insure that this relay cannot be inadvertently operated prior to the restoration of the components of the machine to normal.

The adding operations for the remaining totalizers should be obvious from the above description without further description.

Subtract operations

In the machine as before described, only the rear upper and lower pairs of the totalizers have been referred to as of the add-subtract type. However, all of the other totalizers could similarly be adapted for subtraction, although in the drawing this is illustrated as applied only to totalizers Nos. 1 to 8.

For controlling subtract operations, there is a subtract relay S in respect of each of the totalizers Nos. 1 to 8, although the full subtract facilities are illustrated only in regard to totalizers Nos. 1 to 4. Each designation of the individual subtract relays S is suffixed by a numeral corresponding to the number of their respective totalizer.

The subtract operations are similar in respect of all the totalizers; therefore it will be necessary only to give a detailed circuit description of only one of them, and this will be given in respect of totalizer No. 2, with which subtract relay S2 is associated.

In the event of the subtract facility being required in respect of any totalizer, the tooth 390 (Figs. 29 and 30) of the selector bar 388 corresponding to the subtract facility for that particular totalizer is removed, so that the appropriate contact member 322 can enter into the remaining notch 391 and so operate the associated contacts of the sensing field. Also, the tooth corresponding to contacts SF33 will be removed, so that these contacts will be operated.

Assuming that the tooth 390 appropriate to totalizer No. 2 has been removed, the elevation of the contact member associated with sensing field contacts SF4 will bring about the closure of those contacts, whereupon a circuit will be closed from positive, over contacts CS8, *rc3*, *fbs2*, *scr2*, *nul3*, SF4, *ra4*, relay S2 to negative, and relay S2 will operate its contacts as follows:

*s21* close a locking circuit for relay S2 over contacts *nul2*, *rc3*, and CS8;

*s22* (Fig. 34B) prepare a point in the circuit for clutch magnet 2M for bringing about the engagement of totalizer No. 2 with the actuators;

*s23* prepare a point in the circuit for auxiliary magnet 2MA, which, on energization, conditions totalizer No. 2 for subtraction;

*s24* (Fig. 34A), included in a circuit for relay AR, are involved in credit balance operations and will be referred to under that heading;

*s25* (Fig. 34B) are included in the item count circuit and will be referred to later.

Also, as contact SF33 will be closed, an obvious circuit for relay NS (Fig. 34A) will be closed over contacts *rc2*. This relay operates, and its contacts *ns1*, *ns2*, and *ns3* prepare for the printing of the negative symbol, as will be described.

The circuit remains in this condition until the machine operation is commenced consequent upon the operation of relays MS and MSR by the depression of the motor bar 38.

In the cycle of machine operation, the contacts CS2 close between 20 and 100 degrees, open between 101 and 159 degrees, reclose between 160 and 240 degrees, and then open again. Also contacts CS3 close between 20 and 100 degrees.

Therefore, at 20 degrees, the following circuit is completed: positive over contacts TAB and *msr1* in parallel, contacts CS2, *s22*, clutch magnet 2M to negative, whereupon the flux builds up therein so that the dogs of the clutch complete engagement, and the totalizers are pulled into engagement with the actuators over 50–77 degrees just prior to the rearward excursion of the actuators at 80 degrees. The circuit for the magnet 2M is opened at 100 degrees, but the totalizers are mechanically held in engagement with the actuators.

Also, at 20 degrees the following circuit is closed: positive over contacts TAB and *msr1* in parallel, contacts CS3, *s23*, magnet 2MA to negative, and the latter energizes, with negligible delay, to move the arm 269 (Fig. 22) to operate the subtract shift bar (not shown) of the totalizer to condition the latter for subtraction, the arm 269 being locked over by the subtract detent lever 274 (Figs. 22 and 23). Contacts CS3 open at 100 degrees to open the circuit for magnet 2MA.

Between 80 and 140 degrees, the actuators make their rearward excursion to enter the amount set up on the calculating machine keyboard 130 subtractively into the totalizer.

At 160 degrees and up to 240 degrees, the contacts CS2 again close to re-complete the circuit for the magnet 2M, and between 195 and 240 degrees the dogs of the clutch are engaged and the totalizer is pulled out of engagement with the actuators and completely restored to disengaged position, the actual disengagement taking place at 226 degrees before the actuators commence their return movement at 228 degrees, which thus restore without effect upon the totalizers.

The contacts CS7 close between 296 and 356 degrees to operate relay KRR, to effect release of any operated control key as before referred to in connection with add operations, and also to energize the subtract release magnet SRM. The latter, on energization, pulls the bar 278 (Figs. 22 and 23) forwardly to effect detachment of the detent lever 274 from the arm 269, which prepares the latter and, therefore, the subtract shift bar, to which it is attached, for restoration at the beginning of the next machine cycle.

The machine is thus restored in preparation for executing a further cycle.

Complex set-ups

It will be appreciated that, as with all machines of the kind to which the present invention relates, complex set-ups, whereby amounts are added into more than one totalizer, or added into one or more and subtracted from another or others, simultaneously, can be arranged for by the removal of the appropriate teeth from the selecting bar.

Total-taking or resetting operations

As is well known, when a totalizer is registering a positive quantity, total-taking operations are similar to subtract operations, except that the totalizer is not conditioned for subtraction, and, therefore, the actuators are allowed to excurse rearwardly only to an extent necessary to restore the associated totalizer wheels to zero, after which disengagement is effected, so that the actuators freely restore to normal positions, leaving the totalizer zeroized.

In the circuit arrangements, there is provided a total relay T in respect of each totalizer, the individual relay designations including a numerical suffix indicating the number of the respective totalizer, these relays being wired individually to sensing field contacts SF20 to SF29.

Assuming that totalizer No. 1 is to be totaled or reset in the particular columnar position of the carriage, then the tooth 390 of the selector bar 388 (Figs. 29 and 30) corresponding to the total position for that totalizer is removed, and, in consequence, when the sensing field magnet SFM is energized to release the contact members 322, the contact member associated with contacts SF20 rises to close those contacts.

Also, the tooth of the selecting bar corresponding to contacts SF34 will also be removed.

When the carriage is synchronized, resulting in the operation of relay FBS, as before described, the following circuit is closed: positive over the contacts CS8, *rc3*, *fbs2*, *scr2*, SF20, relay T1 to negative, and the relay operates, with the consequent contact operation:

*t11* close a locking circuit for relay T1 over contacts *rc3* and CS8;

*t12* (Fig. 34A) prepare for the operation of clutch magnet 1M from over cam contacts CS4;

*t13* (Fig. 34) apply positive to a contact in the bank *cms3* of the stepping switch CMS and are effective only in automatic resetting operations, as will be described later under that heading.

In addition to the operation of relay T1, an obvious circuit will be closed over contacts SF34 and *scr3* for total symbol relay TS (Fig. 34A), which operates to control the printing of the total symbol at contacts *ts2*, *ts3*, as will be described later, to open a point in a circuit for red shift magnet RSM at *ts*4, whereas at contacts *ts*1 closes an obious circuit for zero stop magnet ZSM (Fig. 34A), which energizes to disable the zero stops and thus release the actuators to permit movement thereof.

When the machine is released, as by the operation of the motor bar 38, or automatically as before described, the following operations ensue.

At 20 degrees in the machine cycle, cam contacts CS4 close to complete the circuit for clutch electromagnet 1M, previously prepared at contacts *t*12. As in subtract operations, the clutch is engaged and the totalizer is pulled into mesh with the actuators throughout the angle 50 to 77 degrees prior to the commencement of the rearward excursion of the actuators at 80 degrees. At 100 degrees, contacts CS4 open to release the magnet 1M, but the totalizer is mechanically retained in engagement with the actuators, so that the latter are permitted to make movements dependent on the amount required to return their related totalizer wheels to zero during the backward movement of the leading frame through 80 to 140 degrees. Thus the actuators are set consistent with the amount standing in the totalizer to set the printer group of the machine, which is fired at about 167 degrees during the resetting period of the leading frame and the actuators.

At 160 degrees, the contacts CS4 are again closed to re-complete the circuit for magnet 1M, with the result that the totalizer clutch is re-engaged and the totalizer is disengaged from the actuators between 195 degrees and 226 degrees before the commencement of the return movement of the leading frame and the actuators, at 228 degrees.

Contacts CS4 open at 240 degrees to release magnet 1M, contacts CS8 open at 327 degrees to release relay T1, and contacts CS7 close between 296 and 356 degrees to effect release of the keys, as before described.

Sub-total-taking or read operations

As is well known, sub-total-taking or read operations, in effect, consist of a combination of a subtract operation during the first portion of a machine cycle, to zeroize the totalizer and print the amount extracted, followed by the re-entering of the amount in an adding operation during a later part of the machine cycle.

Where it is required that a totalizer should be sub-totaled in a columnar position, the tooth of the selector bar corresponding in position to total contacts SF related to that totalizer, together with the tooth corresponding to sub-total contacts SF19 (Fig. 34B) and also contacts SF34 for the relay TS, are removed, so that the contact members associated with these contacts are permitted to rise and operate them when the contact members are freed consequent upon the energization of the magnet SFM.

Assuming that totalizer No. 1 is to be sub-totaled in a particular column, relay T1 will be operated, as described in the previous section of the description.

In addition, relay ST is operated from positive over contacts CS8, *rc*3, *fbs*2, *scr*2, *nul*3, SF19, relay ST to negative, its contacts functioning as follows:

*st*1 locks relay ST over contacts CS8 and *rc*3, independently of contacts SF19;

*st*2 (Fig. 34B) closes a point in the circuit for credit sub-balance relay CSB and will subsequently be described in detail under that heading;

*st*3 prepare for the operation of the sub-total symbol-printing magnet SM3 and will be dealt with later under the heading "Symbol Printing";

*st*4 changes over the common positive connection to the clutch magnets from cam contacts CS4 to CS5.

When the machine is released in the manner before described, the following operations ensue.

At 20 degrees in the machine cycle, contacts CS5 close to establish the following circuit: positive over contacts TAB and *msr*1 in parallel, contacts CS5, *st*4, *t*12, magnet 1M to negative, and the latter energizes exactly as in total-taking operations, the magnet 1M being de-energized at 100 degrees, while the totalizer is mechanically held in engagement with the actuators during the rearward excursion of the latter, so that the totalizer is restored to zero position.

However, in contradistinction to total-taking the totalizer is not disengaged from the actuators before the return of the latter to normal, so that the amount is re-entered into the totalizer.

Referring to the timing diagram (Fig. 35), the actuators are restored at some time during the restoration of the leading frame LF between 228 and 276 degrees. At 240 degrees, the contacts CS5 are re-closed to establish the circuit of the magnet 1M, and the dogs of the clutch engage at 283 degrees; that is, seven degrees after the leading frame and the actuators have been restored to normal position, the totalizer being disengaged from the actuators at about 302 degrees, whereas the magnet circuit is opened at 320 degrees.

Between 327 and 357, contacts CS8 open to release all operated relays, and contact CS7 is closed to release any electromagnetically-released keys.

Overdraft or credit balance operations

It will be appreciated that, in those totalizers of the add-subtract type, it is possible to register a negative total where the totalizer has overrun zero in a subtract operation. This negative total is registered as the tens complement of the true amount, and therefore, in total-taking, it is preferable that the complementary amount be converted to the true negative amount, so that the latter will be printed.

In the present machine, this is accomplished in a two-cycle overdraft operation, and the full circuit arrangements are shown in association with totalizers Nos. 1, 3, and 4, which also involves totalizer No. 2, by which the complementary amount is converted to the true negative figure when associated with either of the other totalizers in the operation.

It will be recollected in connection with Fig. 16 that, when a totalizer is registering a negative total, the overdraft shaft 520 is rotated to cause the roller 524 on the lug 525 to close contacts 526. These contacts for totalizers Nos. 1, 3, and 4 are designated OD1, OD3, and OD4, respectively, in the circuit drawing (Fig. 34).

As the overdraft operations for totalizers Nos. 1, 3, and 4 are similar, a detailed description of the operations will be given only in respect of totalizer No. 1, it being assumed that the machine is conditioned for automatic cycling by switch CBS being in its upper position.

Thus, when totalizer No. 1 is overdrawn, contacts OD1 will be closed, and, when sensing field contacts SF20 close to commence total operations, relay T1 operates as before described. Also a parallel circuit is completed over contacts OD1, relay CB1 to negative, and relay CB1 also operates.

Contacts *t*11, *t*12, and *t*13, respectively, close the locking circuit for relay T1, prepare the circuit for clutch magnet 1M, and prepare for a circuit to a contact in bank *cms*3 of the uniselector, as before described.

When relay CB1 operates, the following contact operation ensues:

*cb*11 close a locking circuit for relay CB1 over contacts CS9 independently of the operating and holding circuit for relay T1;

*cb*12 (Fig. 34A) close in the circuit for lamp CBL1, so that when the machine is conditioned for non-automatic release, as will be referred to, this lamp will light to indicate that the totalizer is registering a negative total;

*cb*13 (Fig. 34B) complete a circuit from positive thereover relays CCB and CCR in parallel to negative, and both of these relays operate;

*cb*14 (Fig. 34A) open a point in the circuit for relay AR over the sensing field contacts SF31, and the relay is made dependent for operation on the operation of relays involved in the credit balance operations, as will be referred to.

When relays CCB and CCR operate, their contacts function as follows:

ccb1 (Fig. 34B) close a locking circuit for relays CCB and CCR over contacts sd1;

ccb2 (Fig. 34A) close an obvious circuit for relay TS, which operates. The contact functions of this relay will be described following those of relay CCR hereunder;

ccb3 (Fig. 34B), serially with contacts scr1, close a circuit for printer disabling magnet PDM, corresponding to magnet 490 (Fig. 21), which energizes to prevent the firing of the printer group during the first cycle of the machine and also to change-over contacts pdm (Fig. 34), corresponding to 502, Fig. 21;

ccb4 (Fig. 34A) complete the following circuit: positive over contacts CS8 (Fig. 34B), rc3, ccb4, pdm, subtract relay S2, for totalizer No. 2, to negative. Therefore relay S2 operates, as described, to prepare totalizer No. 2 for subtract operations. These contacts are also concerned in the release of the machine, as will be referred to later;

ccb5 prepare for the operation of relay SC;

ccr1 (Fig. 34) open a point in the stepping and homing circuit for the switch CMS;

ccr2 open a point in a further energizing circuit for stepping magnet CMSDM of the switch CMS over relay DT;

ts1 close an obvious circuit for zero stop magnet ZSM, corresponding to magnet 411 (Fig. 15), which energizes to release the zero stops to permit movement of the actuators, as previously described;

ts2 and ts3 (Fig. 34B) will be referred to later under symbol printing;

ts4 open a point in the circuit for red-shift magnet RSM should contacts ns1 be closed for any reason.

The circuit remains in this condition; that is, with totalizer No. 1 conditioned for total-taking, by relay T1 being operated, and totalizer No. 2 conditioned for subtract by relay S2 being operated, until the machine is released, which may be accomplished either manually or automatically, the latter in this case not being under carriage control; that is, through contacts SF31, as referred to previously.

In order to determine the particular type of release required, there is provided a double-pole change-over switch CBS (Fig. 34A), corresponding to 512 (Fig. 1). When the switch is in its lower position, as indicated by the broken lines, the machine remains in this condition until the motor bar is depressed, when cycling will take place, as will be referred to later under manual total-taking, in which case the lamp CBL1 will be illuminated over the circuit from positive, contacts CBS2, lamp, contacts cb12, resistance, to negative, thus indicating that the totalizer holds a negative total. When the switch is in its upper position, as indicated by full lines, the following circuit is established: positive on the lower common lead from contacts CS8, over contacts ccb4, over which, it will be remembered, relay S2 was operated, s24, CBS1, tw2, relay AR, to negative, and relay AR operates to operate relays MS and MSR to effect cycling of the machine as before described.

In any event, when the machine is released, the actuators are set in accordance with the complementary total standing in totalizer No. 1, which amount is simultaneously subtracted from totalizer No. 2, which, therefore, will be set to the complement of the complement, which is the true negative figure.

Between 296 to 356 degrees of the first cycle, contacts CS7 close to complete the circuit for relay KRR, release magnet KRM, and the subtract release solenoid SRM, as before described, the positive also being extended over contacts csb3, cb12, credit balance release magnet CBR1 (corresponding to 529, Fig. 16), to negative.

The solenoid SRM, on energization, restores the totalizers to the condition for adding, and, furthermore, magnet CBR1, which, through its armature, restores the overdraft shaft 520 (Fig. 16) to normal, and which, in turn, restores its actuator, and the transfer of the highest order wheel of the totalizer.

When relay KRR operates, the circuit for relay SC (Fig. 34A), previously prepared at contacts ccb5, is closed over contacts krr1, and relay SC operates with the following contact operation:

sc1 prepare the circuit for relay SD, but this relay remains short-circuited, and thus prevented from operating, so long as contacts krr1 remain closed. At 356 degrees in the machine cycle, contacts CS7 open to release relay KRR, so that the short circuit is removed from relay SD, which operates in series with relay SC over contacts ccb5 and sc1;

sc2 close an obvious circuit for relay SCR, which operates, its contact functions following that of the SC relay contacts below;

sc3 prepare a circuit for the total relay T2;

sc4 open a further point in the circuit for relay AR to guard against the restoration of contacts cb14, which will take place before the end of the cycle, thus to insure a continuation of the prevention of automatic release, by inadvertent operation of relay AR over contacts SF31, throughout the remainder of the operation;

scr1 change-over to disconnect the circuit for magnet PDM, so that contacts pdm restore, and close the circuit for symbol magnet SSM, as will be referred to later;

scr2 disconnect the positive potential, derived over contacts CS8, from the commons serving the sensing field contacts and connect the positive to ribbon shift magnet RSM, which energizes on the reclosure of contacts CS8 at 357 degrees to shift the ribbon in preparation for a red print during the second machine cycle, as described in connection with magnet 480, Fig. 21, previously referred to under the heading "Ribbon Shift."

As before described, at 327 degrees contacts CS8 and CS9 open and release relays T1, S2, CB1, and AR, the contacts re-closing at 357 degrees.

When relay SD operates its make-before-break contacts sd1 (Fig. 34B), these contacts change over after the operating period of the relay, so that the holding positive for relays CCB and CCR is thereupon derived over contacts CS8 on their reclosure at 357 degrees. It is to be noted that, through the small lag in the operation of relay SD, contacts sd1 do not effect their break action until after contacts CS8 re-mark at 357 degrees, contacts sd1 being essentially of the make-before-break type to insure the continuous application of positive to relays CCB and CCR.

It is to be noted that tabulation of the carriage is suppressed in known manner during this first cycle.

Thus, the condition at the end of the first cycle of operation is that totalizer No. 1 has been cleared, and the complement of the complement, as originally registered in totalizer No. 1, has been transferred into totalizer No. 2 as a true negative figure. Also, relays SC, SD, SCR, CCB, and CCR are operated.

On the reclosure of contacts CS8, the positive thereover is extended through contacts rc3, ccb4, pdm, sc3, total relay T2, to negative, and the relay operates, its contacts operating as follows:

t21 locks relay T2 to contacts CS8;

t22 prepares the circuit for clutch magnet 2M;

t23 apply positive to a contact in bank cms3 for a purpose later described;

t24 apply the positive at contacts ccb4, over contacts tw2 to operate relay AR.

In consequence of the operation of relay AR, the machine executes a second, but a normal total-taking operation, in which the actuators reset the totalizer to normal and thereby assume a position corresponding to the true negative total, which is printed in red, at about 167 degrees in the machine cycle, as before described.

At 357 degrees, contacts CS8 open and thereby release relays T2, AR, MS, MSR, CCB, and CCR. Contacts ccb5 open in the circuit for relays SC and SD, and these relays release, the former releasing relay SCR, thus restoring the circuit to normal.

*Sub-total overdraft or credit balance*

If a sub-total instead of a total is to be taken from the totalizer in the particular columnar position, then the tooth of the selecting bar corresponding to sensing field contacts SF19 will be omitted; therefore relay ST will operate, together with the total relay T1, as before described, and also relay S2, if the totalizer is registering a negative balance.

In the latter case, relay CB1 is operated in parallel with relay T1 over contacts OD1, and therefore, as relay ST is also operated, the positive over contacts sd1 (Fig. 34B), and cd13, which operated relays CCB and CCR, is extended over contacts st2, relay CSB, to negative, and relay CSB operates with the following contact functions:

csb1 lock relay CSB independently of contacts st2;

csb2 prepare for the operation of the symbol-printing magnet SM5, as will be referred to later;

csb3 (Fig. 34) open a point in the circuit for magnet CBR1, so that this magnet will not be energized when contacts CS7 close, as in total-taking operations, as the operation, being a sub-total-taking operation, requires that the overdraft shaft shall remain in its operated position.

Therefore, under these conditions, totalizer No. 1 will be sub-totaled during the first cycle of machine operation, as in normal sub-total-taking operations, while the overdraft will be entered subtractively into totalizer No. 2, leaving the true negative figure therein, the operation of relay ST being ineffective as far as totalizer No. 2 is concerned, and the relay being released on the opening of contacts CS8 near the end of the machine cycle. During the second machine cycle, the total is taken from totalizer No. 2, and the correct negative value is printed in red, as will now be understood.

*Manual total-taking or resetting*

It is desirable, under certain circumstances, to be able to take a total voluntarily from a totalizer under manual control. In the present machine, this facility is illustrated in association with totalizers Nos. 1, 3, and 4, and associated with each of these totalizers is a manually operated electromagnetically-release key, designated TK1, TK3, and TK4, respectively (Fig. 34A), corresponding to keys 137, 136, and 135 (Fig. 2), each key having individually associated therewith a relay designated KT1, KT3, and KT4, respectively.

The selecting bar corresponding to the columnar position in which the voluntary total-taking facility is required has removed therefrom only the tooth corresponding to sensing field contacts SF32, so that, when the carriage reaches the particular columnar position and the sensing field magnet SFM energizes, the selecting lever associated with contacts SF32 will be permitted to rise to operate these contacts.

In consequence of this, the positive on the common connection to the lower set of sensing field contacts SF, and derived over contacts CS8, is extended over relay CK to negative, and relay CK operates with the following contact functions:

ck1 locks relay CK to contacts CS8 independently of the sensing field contacts and applies the locking positive potential from the lower holding lead to the upper contacts of keys TK1, TK3, and TK4, in parallel with that applied over SF32;

ck2, ck3, and ck4 do not enter into the present operations and will be referred to in the next section, referring to the manual control of totalizers.

It will be usual that the key TK relating to the particular totalizer is not operated until the carriage has reached the particular columnar position.

When the particular key TK—say TK1—is operated, the positive over contacts SF32 and ck1, in parallel, is extended over the key, relay KT1 to negative, and the relay operates and locks so long as contacts ck1 remain closed. The contacts of relay KT1 operate as follows:

kt11 close an obvious circuit for relay TS, for the printing of the total symbol, as will be described;

kt12 close a circuit from positive thereover, contacts sc4, cb14, cb34, cb44, tw2, automatic release relay AR to negative, and relay AR operates automatically to release the machine, as before described;

kt13 (Fig. 34B) close a point in the item count circuit, as will be described;

kt14 (Fig. 34) close a circuit from positive on the lower holding conductor, derived from contacts CS8, relay T1, to negative, and the relay operates.

As the machine has been released by the operation of relay AR, and as relay T1 is operated, totalizer No. 1 will be totaled, and all relays and keys will be released at the end of the machine cycle, in the manner before described.

The operations involved in totaling totalizers Nos. 3 and 4 are similar and therefore need not be further described.

As before mentioned, if any totalizer is registering an overdraft, the relevant relays CB will be operated to open a point in the circuit of relay AR from the sensing field contact SF31, and, further, if the machine is conditioned for manual control of overdraft operations by the operation of switch CBS to its lower position, a point in the possible alternative circuit for relay AR is also opened at contacts CBS1. Thus, in the latter case, the machine will stop, indicating the condition to the operator, and will remain so until the motor bar is operated to close the circuits for relays MS and MSR, thus initiating the machine operation exactly as previously described under "Overdraft Operation."

If sub-total or sub-total overdraft operations are required, relay ST is also operated by the depression of key STK simultaneously with the required total key, which modifies the total-taking operations in a manner which will be understood without further description.

*Manual control of add-subtract totalizer functions*

Facilities are provided by which the add-subtract feature of the totalizers may be manually controlled and which take precedence over any set-up on the selecting bar of the carriage. This facility is illustrated in association with totalizers Nos. 1, 3, and 4, in respect of which there is individually provided a key ASK1, ASK2, and ASK3, corresponding to keys 144 to 146 (Fig. 2).

Each of these keys ASK is a double-throw key, being thrown to the left, as indicated at "A," for the add facility, and to the right, as indicated at "S," for the subtract facility.

It is to be noted that this manual control of the totalizers is not used with the automatic release facility, and therefore, if the selector bar is conditioned to permit contacts SF31 to close, then the "Non-Auto" key NAK should be operated on the previous cycle to disable the automatic operation.

In any columnar position where manual control may be desired, the tooth of the selecting bar associated with that position, and corresponding to sensing field contacts SF32, is removed, which, as described in the previous section, will result in the operation of relay CK when the carriage reaches the columnar position, the relay locking at contacts ck1, and, at contacts ck2, ck3, and ck4 (Fig. 34), preparing circuits for relays KC1, KC2, and KC3, respectively.

Assuming that manual control of totalizer No. 1 for adding is to be effected, then key ASK1 will be thrown to the left, whereupon a circuit is closed from the positive on the lower holding conductor, derived over contacts CS8, over the left-hand moving and middle springs of the key, relay KC1 to negative, and the relay operates with the following contact operation:

*kc*11 transfer the connection to relay A normally existing from sensing field contacts SF1, to the outer left-hand contact of key ASK1, and, in consequence, the positive derived over contacts *ck*2, which operated relay KC, is extended over contacts *ra*1, relay A1, to negative, and relay A1 operates, thus conditioning the machine to add into the No. 1 totalizer;

*kc*12 similarly transfer the connection normally existing from relay S1 to sensing field contacts SF2, to contacts *ks*11, for connection to the outer right-hand contact of key ASK1 when contacts *ks*11 close, but relay S1 cannot, in any case, operate at this time, as key ASK1 is thrown to the left;

*kc*13 open a point in the normal holding circuits for relays A1 and S1, which also have the effect of releasing either of these relays if previously operated over the sensing field contacts before the operation of the key ASK1.

Therefore, the condition is such that relays A1 and S1 have been disconnected from the sensing field contacts and the add relay A1 operated, so that, on the manual release of the machine, the amount set up on the keyboard will be entered additively into totalizer No. 1, the relays CK and A1 being released on the opening of contacts CS8 at 327 degrees in the machine cycle, as before mentioned.

If the key ASK1 had been operated to the right, instead of the left, the positive derived over contacts *ck*2 would pass over the outer right-hand contact of key ASK1, relay KS1 to negative, resulting in the operation of the relay, whereby contacts

*ks*11 would extend the positive over contacts *kc*12, *ra*2, relay S1 to negative, so that relay S1 would operate to condition the totalizer No. 1 for subtract operations;

*ks*12 (Fig. 34A) close an obvious circuit for relay NS for controlling the printing of the negative symbol.

On the release of the machine, a subtract operation will be executed to subtract the amount set up on the keyboard from totalizer No. 1.

It will be appreciated that, if it is required to total the totalizer while the key ASK1 is operated—say following an add or subtract cycle—the key TK1 will be operated, resulting in the operation of relay KT1, and the operation of relay T1 and release of relay A1 or S1, at contacts *kt*14, whereupon total-taking operations will ensue on the release of the machine.

The manual control of totalizers Nos. 3 and 4 is substantially similar to that for totalizer No. 1 and should be understood without further detailed description.

Nullify feature

In the event of its being required to nullify a set-up of add or subtract relays which may have been operated either over the sensing field contacts SF or over the manual control keys ASK, the key NULK (Fig. 34), corresponding to 138 (Fig. 2), is operated to close an obvious circuit for, and operate, relay NUL, whereby contacts.

*nul*1 (Fig. 34A) close an obvious circuit for relay CK, which, if one or more of keys ASK1, ASK2 are operated, causes the operation of relay KC1, KC2, and/or KC3, at contacts *ck*2, *ck*3, and *ck*4. Contacts *kc*13, *kc*33, and *kc*43 open the holding circuits for relays A and S, 1, 3, and 4, should any of these be operated, so that they release;

*nul*2 disconnect the positive derived over contacts CS8 from the upper holding conductor, so that any A or S relays previously operated over the sensing field, and held over this conductor, will be released immediately on the operation of

*nul*3, which disconnect the positive on the upper middle common conductor supplying the sensing field and derived over contacts CS8.

Thus, during the ensuing machine cycle, no A or S relays will be operated, and, near the end of the machine operation, key NULK will be released consequent upon the energization of magnet KRM over contacts CS7 at 296 degrees.

Repeat function

If it is required to make a multiple entry of an amount set up on the keyboard of the machine, key RTK (Fig. 34A), corresponding to 140 (Fig. 2), is operated to close an obvious circuit for relay RT, which, at contacts

*rt*1 closes an obvious circuit for magnet RTM, corresponding to magnet 430 (Fig. 15), whose armature, it will be remembered, is imposed into the path of member 433 to stop movement of this member and thus prevent the hook 418 of the pawl 416 from engaging the stud 419 between the disc 414 and the crank arm 240, so that the bar 400 will not be moved to release the operated keys;

*rt*2 close the circuit for the motor start relays MS and MSR, so that these relays operate to initiate the machine cycle.

The key RTK is restored near the end of the machine operation by the operation of magnet KRM, but this does not occur until after the point in the machine cycle at which the amount keys, operated to make the entry, are normally released—that is, until the roller 419 has passed beneath the nose 418 of the pawl 416—and thus the amount keys remain operated. As many entries as desired can be made by the repeated operation of key RTK.

Reverse feature

It may occur that it is necessary to cancel an entry made manually into the machine and entered in accordance with a set-up of the selecting bars. Such cancellation is simple where the entry involves one totalizer only, as it requires only an additional entry into the totalizer in the opposite algebraic sense, although this necessitates the operator's being fully conversant with the individual functions of the selecting bars. However, such reversal of entries is not simple in the case of a complete set-up, wherein entries into several totalizers in various algebraic senses are involved, and which in normal circumstances, would necessitate an individual reversal of the entry into each totalizer concerned.

The reverse feature of the present machine enables the complete and automatic reversal of a simple or complex entry, previously made under control of a selecting bar, quite independently of the operator's knowledge of the individual functions of the selecting bar, and is effected merely by the operation of the 1 reverse key RVK (Fig. 34B) corresponding to 143 (Fig. 2).

In the machine illustrated, the reverse feature is shown as being applied to totalizers Nos. 1, 2, 3 and 4, but it will be appreciated that it could equally well be applied to all add-subtract totalizers.

In order to facilitate the description, it will be best to assume a combined automatic function of the selecting bar, and it will be assumed that an amount is to be added simultaneously into totalizers Nos. 1, 2, and 4 and subtracted from No. 3; that is, +1, +2, —3, +4.

For this purpose, the teeth of the selecting bar corresponding to sensing field contacts SF1, SF3, SF6, and SF7 will be removed, so that, on the carriage reaching the particular columnar position and relay FBS and sensing field magnet SFM operating in consequence, relays A1, A2, S3, and A4 will operate. On the ensuing machine cycle, the amount set up on the keyboard will be entered into the several totalizers, and the machine cycle will be terminated in the manner which will now be fully understood.

In the event of its being required to cancel this entry, the carriage, if it has tabulated to another position, is restored to the original columnar position, the same amount is entered on the amount keyboard, and key RVK is operated to close obvious parallel circuits for relays RA, RB, and RC, which operate, their contacts functioning as follows:

*ra*1 and *ra*2 reverse the normal connections from sensing field contacts SF1 and SF2, so that the former contact becomes connected to relay S1 and the latter to relay A1;

*ra*3 and *ra*4 similarly reverse the normal connections from contacts SF3 and SF4, so that they become connected to relays S2 and A2, respectively;

*rb*1 and *rb*2 similarly reverse the normal connections from sensing field contacts SF5 and SF6, so that they become connected to relays S3 and A3, respectively;

*rb*3 and *rb*4 similarly reverse the normal connections from sensing field contacts SF7 and SF8, so that they become connected to relays S4 and A4, respectively;

*rc*1 (Fig. 34B) prepare a point in the circuit for symbol printing magnet SSM, as will be described later;

*rc*2 (Fig. 34A) open a point in the circuit of negative symbol relay NS;

*rc*3 (Fig. 34B), being merely break contacts, operate much faster than the contacts of relays RA and RB and open in the positive connection for operating and holding relays A and S from over contacts CS8, whereby these relays are either prevented from operating, or, alternatively, released if they become inadvertently operated before the contacts of relays RA and RB execute their break operation.

Following the operation of relays MS and MSR by the motor bar, contacts *msr*2 again apply positive, from over contacts CS8, to the operating and holding conductors for relays A and S, resulting in the operation of the following relays:

Relay S1 operates over contacts SF14, *kc*11, *ra*2, and locks over contacts *s*11 and *kc*13 to condition totalizer No. 1 for a subtract entry;

Relay S2 operates over contacts SF3 and *ra*4, and locks over *s*21, to condition totalizer No. 2 for a subtract operation;

Relay A3 operates over contacts SF6, *kc*32, and *rb*1, and locks over *a*31 and *kc*33, to condition totalizer No. 3 for an adding operation; and Relay S4 operates over contacts SF7, *kc*41, and *rb*4, and locks over *s*41 and *kc*43, to condition totalizer No. 4 for a subtract operation.

Therefore, in the ensuing machine cycle, the amount will be entered into the several totalizers in a sense reverse to that in the previous operation, and a reverse symbol will be printed adjacent the printed amount, as will be described.

The reverse key RVK is restored consequent on the energization of the magnet KRM from contacts CS7 at 296 degrees to 356 degrees of the machine cycle, as will also the operated relays A and S, as will be fully understood.

Symbol printing

Briefly referring back to Figs. 13 and 14, the symbol sector 10 has type slugs for printing symbols in respect of the following functions—Subtract, Total, Sub-Total, Credit Balance, Sub-Credit Balance, and Reverse—the sector being coupled over a linkage to the sector arm 208, which is resiliently coupled to the extension 218 of the armature of the electromagnet 215, the latter being designated SSM in Fig. 34B. In operation, the sector arm 208, in being set to print any one of the symbols except the "Reverse" symbol 223, is permitted to execute a variable degree of movement, to set the type sector accordingly, dependent on which pin 213 of the number of such pins has been projected into its path, the pins in turn being individually controlled by electromagnets 211, which, in Fig. 34B, are designated SM1 to SM5. The symbol sector is locked mechanically at 85 degrees in known manner.

The individual control for printing the various symbols will be referred to separately.

Negative symbol

It will be remembered that in subtract operations relay NS (Fig. 34A) was operated over contacts SF33 with the following contact operations:

*ns*1 prepare a circuit for the red shift magnet RSM from contacts CS3 (Fig. 34A);

*ns*2 similarly prepare the circuit for magnet SSM;

*ns*3 apply the positive at the back of contacts *scr*2 over *st*3 and *ts*3 to magnet SM1, which energizes to position the related pin 213 into the path of the symbol-setting linkage.

At 20 degrees in the machine cycle, contacts CS3 (Fig. 34A) close and apply positive over the prepared circuits to red shift magnet RSM and magnet SSM, the former energizing to shift the ribbon to red, whereas the latter operates the symbol sector linkage until it is arrested by the pin projected by magnet SM1, whereby the negative symbol slug will be brought into position for printing, which will take place at about 167 degrees of the machine cycle when the printer sectors are fired.

It will also be seen that relay NS will be operated over either of the contacts *ks*12, *ks*32, or *ks*42 should either of the relays KS1, KS3, or KS4 be operated in subtract operations under control of the related manual selecting keys ASK1, ASK3, or ASK4, so that the negative symbol will be printed.

Total symbol

As previously referred to, in columnar positions of the carriage where total operations are required to be effected automatically, the tooth of the selecting bar corresponding to contacts SF34 is removed, so that the contacts will be closed when the carriage reaches the tabular position, resulting in the closure of an obvious circuit over contacts *scr*3 for relay TS, whose contacts, except *ts*1, which close the circuit for the zero stop magnet ZSM, as described, function as follows:

*ts*2 prepare for the energization of magnet SSM;

*ts*3 apply positive from the back of contacts *scr*2 and over *st*3 to magnet SM2, which energizes to position the related pin in the path of the symbol-setting linkage;

*ts*4 open in the connection between contacts *ns*1 and *scr*2 to insure that there will be no extension of the positive in either direction over this connection.

As in the case of the negative symbol, contacts CS3 close between 20 and 100 degrees of the machine cycle and extend positive over the previously-prepared circuit for magnet SSM, which energizes to move the symbol-setting linkage until the latter is arrested by the pin projected under control of magnet SM2, and thus the total symbol will be printed when the symbol sector is released.

Sub-total symbol

In sub-total-taking, both relays TS and ST are operated, as before described. The operations are similar to those in total-taking, except that contacts *st*3 change over to disconnect magnet SM2 and connect magnet SM3, which projects the pin appropriate for the setting of the symbol sector to bring the sub-total slug to printing position.

Credit balance symbol

It will be remembered in connection with credit balance operations that, consequent upon the operation of one of the contacts OD from the overdraft shaft of the related totalizer, the associated relay CB will operate to close the circuit for relay CCB to close an obvious circuit for relay TS at contacts *ccb*2, and for magnet SM4 at contacts *ccb*3 over contacts *csb*2. The magnet SM4 energizes to project the associated pin into the path of the symbol-setting linkage, so that, on the energization of magnet SSM, prepared at *ts*2, when contacts CS3 close at 100 degrees, the linkage will be set to adjust the symbol sector so that the slug bearing the credit balance symbol is brought into printing position.

Sub-credit balance symbol

The operations are similar to those for credit balance, except that relay CSB will also be operated and at contacts csb2 disconnect the magnet SM4 and connect the magnet SM5, which, upon energization, together with the magnet SSM, will adjust the symbol-setting linkage to bring the symbol sector to a position for printing the appropriate symbol.

Reverse symbol

When relay RC is operated from key RVK in a reverse operation, contacts rc1 prepare the circuit for magnet SSM, which is consequently energized from contacts CS3. In this operation, no pin is projected into the path of the symbol-setting linkage, which therefore moves its fullest extent to bring the type slug bearing the symbol relating to a reverse operation into printing position.

Item count

It will be seen at the bottom of Fig. 34B that each add relay has a make contact connected individually to a contact in the lower row of contacts of an interconnecting field ICF, and, also, the subtract relays S of totalizers Nos. 1, 2, 3, and 4 have contacts connected in parallel with the contacts of their associated add relays.

Also the make contacts of motor start relay MS and manual total relays KT are connected in parallel to another contact.

The magnets controlling the item counters are designated IC1, IC2, IC3, and IC4, correspond to electromagnets 189 (Fig. 3), and are connected individually to the four upper contacts of the interconnecting field ICF.

It will be remembered from the previous description that, when an item counter electromagnet is energized, its armature projects its pin beneath the lower arm of a toggle linkage, so that, when the linkage is straightened, the upper link is caused to move upwardly to operate the operating pawl associated with the units wheel of the item counter, whereas, if the electromagnet is not energized, the lower arm of the linkage moves freely downward against the load of the pawl, so that the latter is not operated.

Thus it will be seen that, by suitable interconnection of the upper and lower terminals of the interconnecting field ICF, an item count can be had of add operations of any totalizer, including subtract operations in the cases of totalizers Nos. 1, 2, 3, and 4, and a combined total of the total-taking operations and number of cycles of the machine.

Clear machine operations

These operations are effected when it is required to clear amounts from any and all totalizers and to leave them zeroized, and consist in repeated totaling operations through all the totalizers in succession.

Figure 2A:
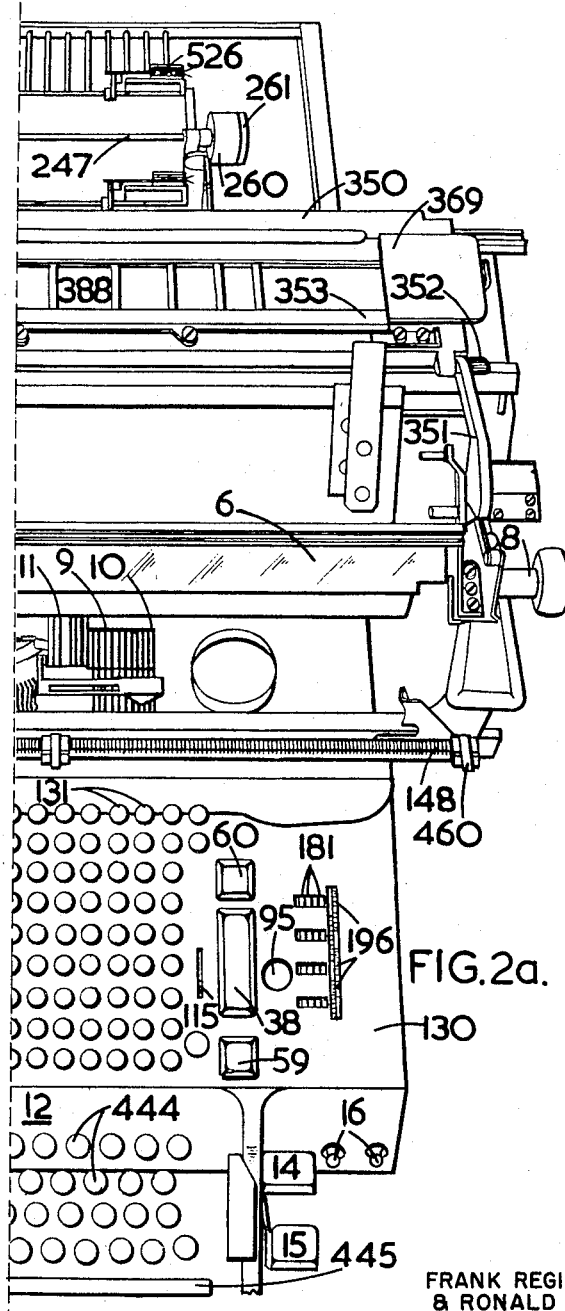

In the machine illustrated, particularly in Fig. 2a, there is provided a lever 115 adjacent the motor bar, the particular purpose of which is to effect control of the carriage operations. In one position—that is, the listing position—this lever, while disabling any tabulating movements of the carriage, enables the platen of the carriage to line-space at each machine operation. When the lever is brought into this position, it is caused to close contacts LLK (Fig. 34B).

Therefore, assuming that the selector plate 353 is located in the "clear machine" position and that the lever 115 is operated to the listing position to close contacts LLK, then, on the operation of the "Clear Machine" key CMK, an obvious circuit is closed for relay CM, which operates with the ensuing contact functions:

cm1 (Fig. 34) prepare a circuit for relay RK;

cm2 close in a circuit from positive over contacts CS9, ccr1, cm2, first contact and wiper of arc cms1, interrupter contacts cmsdm, magnet CMSDM, to negative, the magnet energizing to operate its armature thereby to open contacts cmsdm and disconnect its own circuit, whereupon the armature relapses and, in so doing, advances the wipers of the switch one step on to the second contacts in their respective banks;

cm3 disconnect the circuit to key release magnet KRM, so that the key CMK cannot be released until the completion of clear operations, and prepare a circuit for magnet CMSDM, which is closed later in the ensuing machine cycle;

cm4 (Fig. 34A) close an obvious circuit for relay TS and open a point in the circuit for the sensing field magnet SFM, so that this cannot be energized.

When the wipers of switch CMS moved on to the second contacts in their banks, the positive over contacts cm2 is extended over contacts dt1, wiper and second contact of bank cms2, relay T2 to negative, and this relay operates and locks at contacts t21, prepares the circuit for clutch magnet 2M over contacts t22, st4, and CS4, and at contacts st23 extends a positive over the second contact and wiper cms3, sc4, cb14, cb34, cb44, tw2, relay AR to negative.

Relay AR operates automatically to release the machine, which executes a total-taking operation in respect of totalizer No. 2 in the manner previously described.

At 296 degrees in the machine cycle, cam contacts CS7 close and apply positive over contacts cm3, ccr2, relay DT, and magnet CMS to energize the latter and operate relay DT in series. Contacts dt1 open in the operating circuit for the total relays over bank cms2 until such time as the switch CMS has again stepped and in order to insure that relay T2 will not be held or reoperated over this circuit.

Relay T2 is released at 327 degrees when contacts CS8 open to release relay AR at contacts t23.

At 356 degrees, contacts CS7 open in the energizing circuit for magnet CMSDM, which de-energizes and thereby steps the wipers of the switch on to the third contacts in their respective banks. On the opening of this circuit, relay DT also releases, and, when contacts dt1 eventually restore, the positive over contacts CS9, ccr1, and cm2 is extended over the third contact and wiper of bank cms2, relay T1 to negative, and this relay operates and locks at contacts t11, prepares the circuit for clutch magnet 1M at contacts t12, and recloses the circuit for relay AR over contacts t13 and the third contact of bank cms3 and the contact chain previously described.

The machine therefore performs a total-taking cycle to clear totalizer No. 1, and, at the end of the cycle, switch CMS is again stepped, as before described.

The operations proceed in this manner to clear totalizers Nos. 3 to 9 in succession, after which the wipers of the switch will stand on the eleventh contacts in their respective banks, to bring about the operation of relay T10 when relay DT releases, as will be understood.

When relay T10 operates, it locks over contacts t101, prepares for the operation of clutch magnet 10M at contacts t102, and closes an obvious circuit for slow-to-operate relay RK over contacts cm1. Relay RK operates and locks to positive over contacts rk1, cm2, ccr1, and CS9, extends this positive over contacts rk2 and the previously-mentioned relay chain to relay AR, which operates to initiate the machine cycle, and at rk3 prepares the circuit for key release magnet KRM. It is to be noted that relay RK is made slow to operate to insure that relay T10 is fully operated before the positive is extended over contacts rk2 to operate relay AR to initiate the machine cycle.

At 296 in the machine cycle, contacts CS7 close to connect positive to magnet KRM over contacts cm3 and rk3, the magnet energizing to release key CMK and, in consequence, relay CM. Also, the positive is extended over contacts ccr2, relay DT, magnet CMS to negative, and relay DT operates and the magnet energizes, in the manner described before. At 356 degrees, contacts CS7 open to release magnet CSM, whereby the wipers of the switch are stepped on to the twelfth contacts in their respective banks, which is a second home position for the switch, all connections thereto having a double appearance in the banks.

At 327 degrees in the machine cycle, contacts CS8 open to release relay T10, so that the circuit arrangements and machine are restored to normal, with all totalizers cleared and in the zeroized condition.

It will be appreciated that, if any one of totalizers Nos. 1, 3, or 4 is registering a credit balance, causing the relevant contacts OD to be closed, the appropriate relay CB will be operated in parallel with the total relay T, so that credit balance operations will ensue. As will be remembered, any one of the relays CB, on operation, will operate relay CCR, which, at contacts ccr1, disconnects the positive from the wiper of bank cms2 to remove the operating positive for the total relays and, at contacts ccr2, opens a point in the circuit for energizing magnet CMSDM when contacts CS7 close in the first cycle. Relay CCR is released on the opening of contacts CS8 at 327 degrees in the second cycle, and, therefore, as contacts CS7 remain closed until 356 degrees, the energizing circuit for magnet CMSDM will be completed and the switch will be stepped on the opening of those contacts.

Also, as relay TS is maintained operated throughout the whole sequence of "clear machine" operations, the total symbol will be printed at each printing operation of the machine in respect of totalizers having a positive total, and the credit balance symbol if either totalizers Nos. 1, 3, or 4 are in an overdrawn condition.

If for any reason relay CM should release before the conclusion of the "clear machine" operation, or should switch CM be moved from its home position at any time, a homing circuit for the switch will be closed from positive over contacts CS9, ccr1, common connection to contacts, and wiper of bank cms1, contacts cmsdm, magnet CMSDM to negative, whereupon the switch will self-step until the wiper of bank cms1 reaches a home contact, where the homing circuit will be broken.

While the form of mechanism shown and described herein is admirably adapted to fulfill the objects primarily stated, it is to be understood that it is not intended to confine the invention to the one embodiment disclosed herein, for it is susceptible of embodiment in various other forms.

What is claimed is:

1. In a machine of the class described, having an add-subtract totalizer, said machine capable of performing cycles of operation in which the totalizer is selected and conditioned for adding or subtracting functions, the combination of actuators for the totalizer; means including a shaft to engage and disengage the totalizer and the actuators; means including a reciprocating rack with an invariable movement to operate the shaft; a clutch-driven member fast on one end of the shaft; a clutch-driving member free on said one end of the shaft and operatively connected to the rack; electromagnetic means integral with the clutch-driven member and effective upon being energized to connect said driven member to the driving member to cause the rack to operate the shaft and the engaging and disengaging means; a second clutch-driving member fast on the other end of the shaft; a second clutch-driven member free on said other end of the shaft; connecting means between the second clutch-driven member and the totalizer to condition said totalizer for a subtract operation; electromagnetic means integral with the second clutch-driven member and effective upon being energized to connect said second driven member to the second driving member to operate the connecting means; subtract relays to control the energization of the electromagnetic means; and control means to render the relays operable to condition the totalizer for a subtract operation and to cause said totalizer and the actuators to be engaged and disengaged in subtract timing.

2. In a machine of the class described, having a traveling carriage and a totalizer, said machine constructed and arranged to perform cycles of operation in which the totalizer is selected and conditioned for various functions, the combination of actuators for the totalizer; means including a shaft to engage and disengage the totalizer and the actuators; means including a regularly-excursioned rack to operate the shaft; a clutch driven member fast on the shaft; a clutch driving member free on the shaft, and operatively connected to the rack; electromagnetic means integral with the clutch driven member and effective upon being energized to connect the driving member to said driven member to operate the shaft and the engaging and disengaging means; relays to prepare the circuit for the electromagnetic means; sensing means controlled by the traveling carriage in preselected columnar positions thereof to operate the relays to prepare the circuits to the electromagnetic means; and means controlled by the sensing means to make and break the flow of electrical energy to the electromagnetic means in proper timing in relation to the operation of the rack to cause the totalizer and the actuators to be engaged and disengaged in proper timing to effect the desired function.

3. In a machine of the class described, having an add-subtract totalizer and tens transfer mechanism normally in adding position, but shiftable from said adding position to subtracting position, said machine constructed and arranged to perform cycles of operation in which the totalizer is selected and conditioned for adding and/or subtracting functions, the combination of actuators for the totalizer; means including a shaft to engage and disengage the totalizer and the actuators; means including a reciprocating rack with an invariable movement to operate the shaft; a clutch driven member fast on one end of the shaft; a clutch driving member free on the shaft and operatively connected to the rack; electromagnetic means integral with the clutch driven member and effective upon being energized to connect the driving member to the driven member to cause the rack to operate the shaft and the engaging and disengaging means; a second clutch driving member fast on the other end of the shaft; a second clutch driven member free on the shaft; connecting means between the second clutch driven member and the shiftable transfer mechanism to condition said transfer mechanism for a subtract operation; electromagnetic means integral with the second clutch driven member and effective upon being energized to connect the second clutch members to operate the connecting means; subtract relays to control the energization of the electromagnetic means; and control means to render the relays operative to cause the totalizer and the actuators to be engaged and disengaged in subtract timing, and to cause the tens transfer mechanism to be shifted from add position to subtract position.

4. In a machine of the class described, having an add-subtract totalizer and tens transfer mechanism normally in adding position but shiftable from said adding position to subtracting position, said machine constructed and arranged to perform cycles of operation in which the totalizer is selected and conditioned for adding and/or subtracting functions, the combination of actuators for the totalizer; means including a shaft to engage and disengage the totalizer and the actuators; means including a reciprocating rack with an invariable movement to operate the shaft; a clutch driven member fast on one end of the shaft; a clutch driving member free on the shaft and operatively connected to the rack; electromagnetic means integral with the clutch driven member and effective upon being energized to connect the driving member to the driven member to cause the rack to operate the shaft and the engaging and disengaging means;

a second clutch driving member fast on the other end of the shaft; a second clutch driven member free on the shaft; connecting means between the second clutch driven member and the shiftable transfer mechanism to condition said transfer mechanism for a subtract operation; electromagnetic means integral with the second clutch driven member and effective upon being energized to connect the second clutch members to operate the connecting means; subtract relays to control the energization of the electromagnetic means; control means to operate the relays to cause the totalizer and the actuators to be engaged and disengaged in subtract timing and to cause the tens transfer mechanism to be shifted from add position to subtract position; means to latch the tens transfer mechanism in subtract position during subtract operations; and electromagnetic means effective near the end of the subtract operation to release the latching means to restore the tens transfer mechanism to adding or normal position.

5. In a machine of the class described, having a traveling carriage and a totalizer, said machine constructed and arranged to perform cycles of operation in which the totalizer is selected and conditioned for various functions, the combination of actuators for the totalizer; means including a shaft to engage and disengage the totalizer and the actuators; means including a regularly-excursioned rack to operate the shaft; a gear free on the shaft and meshing with the rack; a normally-disengaged clutch mounted on the shaft and operable to connect the shaft to the gear; electromagnetic means to engage the clutch; relays to prepare the circuit for the electromagnetic means; control elements carried by the traveling carriage and located in relation to columnar positions thereof; sensing means coacting with the control elements; and means including relays, operable under control of the sensing means to make and break the circuit to the electromagnetic means in proper sequence to cause the clutch to be rendered effective and ineffective in proper timing to engage and disengage the totalizer and the actuators according to the function being performed therein.

6. In a machine of the class described, having a plurality of totalizers, said machine constructed and arranged to perform cycles of operation in which the totalizers are selected and conditioned for various functions, the combination of positionable printing means to print a symbol to identify the functions being performed in the totalizers; means comprising an arm connected to the printing means; yieldable means coacting with the arm to urge the printing means in a positioning direction; electromagnetic means coacting with the yieldable means and effective upon energization to urge the printing means to move from a normal or home position in a positioning direction; stop pins coacting with the arm; separate electromagnetic means for moving each stop pin from a normal ineffective position into the path of the arm; relays associated with the electromagnets to close the circuits thereto; and means including a plurality of operable function control elements for the totalizers, each of which is effective upon operation to render operative the relay for the electromagnetic means for the yieldable means and the relay for the electromagnetic means for the stop pin corresponding to the operated control element, to urge the arm and the printing means to move in a positioning direction, and to simultaneously move said corresponding stop pin into the path of said arm to interrupt the movement of said arm and thereby position the printing means to print a symbol indicative of the function represented by the operated control element.

7. In a machine of the class described, having a totalizer, said machine capable of performing cycles of operation in which the totalizer is selected and conditioned for various functions, the combination of actuators for the totalizer; means including an operable shaft to engage and disengage the totalizer and the actuators for various functions; a rack having an invariable pattern of movement to operate the shaft; means including an electromagnetically-operated clutch mounted on the shaft for connecting the rack to said shaft; and means including a plurality of control elements for determining the type of function to be performed in the totalizer, and relays operated by said control elements to control the operation of the clutch to connect the shaft to the rack in proper timing to select and condition the totalizer for the desired function.

8. In a machine of the class described, having a totalizer, said machine capable of performing cycles of operation in which the totalizer is selected and conditioned for various functions, the combination of actuators for the totalizer; means including an operable shaft to engage and disengage the totalizer and the actuators for said various functions; a rack having an invariable pattern of movement to operate the shaft; a gear free on the shaft and meshing with the rack; an electromagnetically-operated clutch mounted on the shaft for connecting the gear to said shaft; and means including a plurality of control elements for determining the type of function to be performed in the totalizer, and relays operated by the control elements to control the operation of the clutch to connect the shaft to the gear in proper timing during the operating cycle of the machine to cause the desired function to be performed in the totalizer.

9. In a machine of the class described, having an add-subtract totalizer and tens transfer mechanism normally in adding position but shiftable from said adding position to subtracting position, said machine constructed and arranged to perform cycles of operation in which the totalizer is selected and conditioned for adding or subtracting operations, the combination of actuators for the totalizer; means including a shaft to engage and disengage the totalizer and the actuators; means to operate the shaft; a clutch-driven member fast on one end of the shaft; a clutch-driving member free on said one end of the shaft and operatively connected to the shaft-operating means; electromagnetic means integral with the clutch-driven member and effective upon being energized to connect said driven member to the driving member to cause the shaft-operating means to operate the shaft and the engaging and disengaging means; a second clutch-driving member fast on the other end of the shaft; a second clutch-driven member free on said other end of the shaft; connecting means between the second clutch-driven member and the shiftable transfer mechanism to condition said transfer mechanism for a subtract operation; electromagnetic means integral with the second clutch-driven member and effective upon being energized to connect said second driven member to said second driving member to cause the shaft to operate the connecting means; subtract relays to control the energization of the electromagnetic means; and control means to render the relays operative to cause the totalizer and the actuators to be engaged and disengaged in subtract timing and to cause the tens transfer mechanism to be shifted from add position to subtract position.

References Cited in the file of this patent

UNITED STATES PATENTS

| | | |
|---|---|---|
| 1,259,311 | Steele | Mar. 12, 1918 |
| 1,899,936 | Bricken | Mar. 7, 1933 |
| 2,222,373 | Rauh | Nov. 19, 1940 |
| 2,228,830 | Kniehahn | Jan. 14, 1941 |
| 2,270,614 | Anderson | Jan. 20, 1942 |
| 2,501,444 | Gollwitzer | Mar. 21, 1950 |
| 2,612,315 | Anderson | Sept. 30, 1952 |